US012791156B2

(12) United States Patent
Schnuckle

(10) Patent No.: US 12,791,156 B2
(45) Date of Patent: Nov. 10, 2026

(54) ARTICLE WITH RANDOMIZED MOTION

(71) Applicant: L&L Candle Company, LLC, Brea, CA (US)

(72) Inventor: Gary Schnuckle, Altadena, CA (US)

(73) Assignee: L&L Candle Company, LLC, Brea, CA (US)

( * ) Notice: Subject to any disclaimer, the term of this patent is extended or adjusted under 35 U.S.C. 154(b) by 0 days.

(21) Appl. No.: 19/066,816

(22) Filed: Feb. 28, 2025

(65) Prior Publication Data

US 2025/0389401 A1 Dec. 25, 2025

Related U.S. Application Data

(63) Continuation of application No. 18/677,638, filed on May 29, 2024, now Pat. No. 12,241,601, which is a (Continued)

(51) Int. Cl.
*F21S 10/04* (2006.01)
*F21S 9/03* (2006.01)
(Continued)

(52) U.S. Cl.
CPC ............... *F21S 10/046* (2013.01); *F21S 9/03* (2013.01); *F21V 9/08* (2013.01); *F21V 14/02* (2013.01);
(Continued)

(58) Field of Classification Search
CPC ...... F21S 8/061; F21S 9/08; F21S 10/04–046; F21V 9/08; F21V 14/00–085;
(Continued)

(56) References Cited

U.S. PATENT DOCUMENTS 7,178,941 B2 * 2/2007 Roberge ............... H05B 47/198 362/240
7,261,455 B2 * 8/2007 Schnuckle .............. F21S 6/001 362/555
(Continued)

FOREIGN PATENT DOCUMENTS

CN 203273713 U 11/2013
CN 207674336 U 7/2018
(Continued)

OTHER PUBLICATIONS

International Search Report and Written Opinion for International Patent Application No. PCT/US2022/018718, mailed Jun. 8, 2022 (10 pages).
(Continued)

*Primary Examiner* — Jason M Han
(74) *Attorney, Agent, or Firm* — Ashurst Perkins Coie US LLP

(57) ABSTRACT

A pendant lighting fixture can include an outer casing, a hollow body positioned within the outer casing, a motion generator positioned within the hollow body, and an illumination assembly within a chamber formed by a cover. An upper part of the hollow body is configured to be coupled to a hanging mechanism, and a lower part of the hollow body is removably coupled to the cover. The motion generator comprises a container, a magnetic coil configured to generate a magnetic field, and an object movably responsive to the magnetic field move within the container so that a movement of the object of the motion generator by the magnetic field affects an illumination effect of the illumination assembly.

14 Claims, 69 Drawing Sheets

Related U.S. Application Data continuation-in-part of application No. 18/548,746, filed as application No. PCT/US2022/018718 on Mar. 3, 2022.

(60) Provisional application No. 63/155,875, filed on Mar. 3, 2021.

(51) Int. Cl.

| | |
|---|---|
| ***F21V 9/08*** | (2018.01) |
| ***F21V 14/02*** | (2006.01) |
| ***F21Y 113/00*** | (2016.01) |
| ***F21Y 115/10*** | (2016.01) |

(52) U.S. Cl.
CPC ........ *F21Y 2113/00* (2013.01); *F21Y 2115/10* (2016.08)

(58) Field of Classification Search
CPC .......... F21V 33/0024–0056; F21V 35/00–006; F21V 99/00; F21W 2121/00; F21Y 2113/00; F21Y 2115/10; H02K 41/00–031; H02K 2201/18
See application file for complete search history.

(56) References Cited

U.S. PATENT DOCUMENTS

| | | | |
|---|---|---|---|
| 7,334,910 | B1 | 2/2008 | Blackstock |
| 7,837,355 | B2 | 11/2010 | Schnuckle |
| 8,070,319 | B2 | 12/2011 | Schnuckle et al. |
| 8,258,644 | B2 | 9/2012 | Kaplan |
| 8,342,712 | B2 | 1/2013 | Patton et al. |
| 9,133,992 | B2 * | 9/2015 | Lee ........................... F21L 4/04 |
| 9,719,643 | B1 | 8/2017 | Cheng |
| 11,027,036 | B2 * | 6/2021 | Li ............................. A61L 9/03 |
| 2010/0079999 | A1 | 4/2010 | Schnuckle |
| 2011/0019422 | A1 | 1/2011 | Schnuckle et al. |
| 2011/0110073 | A1 | 5/2011 | Schnuckle et al. |
| 2011/0127914 | A1 | 6/2011 | Patton et al. |
| 2011/0311951 | A1 | 12/2011 | Piontek |
| 2013/0127178 | A1 | 5/2013 | Indig |
| 2014/0211499 | A1 | 7/2014 | Fong et al. |
| 2014/0268663 | A1 | 9/2014 | Yang |
| 2016/0263613 | A1 | 9/2016 | Lin |
| 2016/0298816 | A1 | 10/2016 | Fang |
| 2018/0306396 | A1 | 10/2018 | Patton |
| 2022/0221119 | A1 | 7/2022 | Jacobson et al. |
| 2024/0035634 | A1 | 2/2024 | Wu |
| 2024/0318797 | A1 | 9/2024 | Schnuckle |

FOREIGN PATENT DOCUMENTS

| | | | |
|---|---|---|---|
| WO | 2017122094 | A1 | 7/2017 |
| WO | 2017147898 | A1 | 9/2017 |
| WO | 2022187494 | A1 | 9/2022 |

OTHER PUBLICATIONS

Extended European Search Report for European Patent Application No. 22764057.0, mailed Jan. 8, 2025 (11 pages).

International Search Report and Written Opinion mailed Jun. 8, 2026, in International Patent Application No. PCT/US26/16564, 10 pages.

* cited by examiner

ARTICLE WITH RANDOMIZED MOTION

CROSS-REFERENCE TO RELATED APPLICATION(S)

This patent document is a continuation of U.S. patent application Ser. No. 18/677,638, filed May 29, 2024, which is a continuation-in-part of U.S. application Ser. No. 18/548,746, filed Sep. 1, 2023, which is a national stage application of and claims the benefit of priority to PCT Application No. PCT/US2022/018718, filed Mar. 3, 2022, which claims the benefit of priority to U.S. Provisional Application No. 63/155,875, filed Mar. 3, 2021. The contents of the above-noted applications are incorporated herein by reference in its entirety.

TECHNICAL FIELD

The present technology relates generally to a motion generator and an article that may be stimulated or motivated by the motion generator. More particularly, the present technology relates to an apparatus that generates a magnetic field that may alter the position or orientation of a magnetically responsive object that is confined in a restricted space or boundary. The position or orientation of the object may be altered in an ever-changing movement pattern in both direction and velocity, and may be coupled with one or more associated articles to impact randomized motion thereto with or without physical connection being present.

BACKGROUND

In the past, magnetic fields have been utilized to cause adjacent or nearby magnetically responsive objects to spin or otherwise move. By way of example, many variations and iterations of electric motors have been devised to angularly displace a central shaft. These electric motors have incorporated one or more stators and one or more rotors to cause the rotor and attached central shaft to spin about a confined axis with a predictable angular momentum. Additionally, magnetic fields have also been utilized to levitate objects and to linearly move objects along a predictable path. By way of example, trains have used sets of magnets to elevate the train above the track and move the elevated train along the track. On a smaller scale, linear actuators and solenoids use magnetic fields to systematically linearly actuate a rod or core between fixed positions. These prior devices attempt to reduce or eliminate random motion by limiting the degrees of freedom of movement of the magnetically responsive object.

Over the years artificial fireplaces and candles have attempted to mimic the random flicker of a flame. Flexible filaments have been incorporated into these structures to simulate the appearance of a flame. Attempts have been made to actuate the filament using various mechanical and electrical devices. However, these prior devices create systematic predictable movement that does not realistically replicate the unpredictable, random flicker and flutter of a flame. The present technology provides a low power device capable of randomizing an object's displacement. The present technology may further utilize the self-randomizing displacement of the object to randomize motion of articles responsive to the object.

SUMMARY

Embodiments according to aspects of the invention provide a source of randomized, non-linear displacement and motion. The motion generator or source may be further used to actuate, stimulate, or otherwise influence the motion of other coupled articles. The source may generate a magnetic field that acts upon a bounded or confined magnetically responsive object to displace the object along several degrees of freedom. Without limitation intended, the object may have magnetic, ferromagnetic, or ferrimagnetic characteristics. By way of example, the object may be constructed of or include iron, cobalt, nickel, magnetic alloys or other materials exhibiting magnetic properties. To stimulate or move the object, the source of the magnetic field may be one or more electromagnet coils. The coils may include a core having magnetic properties or may have air, for example, as its core. An electromagnet having air as its core typically creates a lower strength magnetic field, however, the field strengths may be sufficient for certain applications. Also, the stimulating current of the electromagnetic coil may be continuous, intermittent, or varying by intensity and/or direction within the coil to further randomize the behavior of the associated object.

In some embodiments, a source of a magnetic field may be one or more magnets that are mechanically moved to alter the associated magnetic polarity orientations, such as to alternate magnetic polarity orientations in a manner that creates a magnetic field suitable to stimulate or move the object, as desired.

The confinement or boundary of the object may itself move or change when the position of the object within the confinement or boundary is altered. A moveable confinement or container adds to the degrees of freedom of movement of the object. As will be described in greater detail below, in certain embodiments the confinement may be mounted to one or more pivot axes, such as with the use of one or more gimbals, or may float in a liquid to further randomize movement of the object retained within the confinement. In some embodiments, the moving object may move the container (confinement) as its mass shifts within the container, which further randomizes the motion of the object. In other embodiments, the movable container may be moved by a mechanical, electro-mechanical, and/or electromagnetic mechanisms. The shape of the container in such embodiment may induce movement to the object when the container is moved by the mechanical, electro-mechanical, and/or electromagnetic mechanisms. Consequently, these embodiments according to aspects of the invention also provide a means to alter magnetic characteristics of the object, such as its magnetic moment, which may also affect the imparted motion to associated articles.

Particular embodiments of the invention may include an object confined in a void formed in a housing. When the void within the housing is sized only slightly larger than that of the object, it is accordingly confined to some extent within the housing. The confinement may reduce the degrees of freedom of movement of the object. In some embodiments, the object may be permitted to freely rotate about one or more axis in a rotational movement, but restricted from translational movement. Other embodiments may permit certain translational movement while restricting others. Applying a magnetic field to the object may cause the magnetically responsive object to move from its rest orientation in some fashion. Additional magnetic fields may be applied to further stimulate the object. The magnetic flux of the multiple applied magnetic fields may be aligned offset from each other. In this manner, generation of magnetic fields from two magnetic field generators allows multi-directional actuation of the object.

To create multidirectional motion of the object, the void may be enlarged so that movement of the object may include both rotational and translational motion. When gravity acts on an object contained in a void of the housing, applying a single magnetic field to the housing may result in motion of the object within the housing with several degrees of freedom. Those skilled in the art will appreciate that the housing and the object may be constructed from known suitable materials to reduce the amplitude of sound generated as the object is actuated or moves within the housing, as well as to affect frictional interaction between the object and the housing. In certain embodiments of the invention, the object may be spherical, elliptical, disc, toroidal or otherwise shaped to facilitate a rolling, spinning, or tumbling of the object within the confined space. Additional alternative embodiments may confine an object having both buoyant and magnetically responsive properties within a container of liquid. Applying a magnetic field may cause the object to randomly move within the liquid.

Other embodiments of the invention may include a magnetically reactive object, a base having a dish shaped interior, and an electromagnetic coil in proximity to an exterior of the base. The object is contained or confined to the dish of the base. To trigger, activate, displace, stimulate or otherwise set the object in motion, electrical power is transmitted to the electromagnetic coil either continuously or discontinuously. The coil is electrically energized to create a magnetic field that stimulates the object into motion from its rest position or orientation. This magnetic field interacts with the object's magnetic properties and causes the object to move while restricted by the container and gravitational forces. The electricity supplied to the coil generates a relatively weak electromagnetic field that acts upon the magnetic properties of the object causing the object to move within the boundaries defined by the base in an unpredictable, ever-changing pattern of motion.

The object, base and coil are configured so that with the coil de-energized, the object will come to rest at a position and/or orientation that ensures movement of the object upon re-energization of the coil. In some embodiments, the interior contour and side walls of the base are such that gravity will return the object to a rest position of the base. A spherical neodymium magnet is particularly well suited to return itself to the rest position of the base, due to its low rolling resistance. Alternatively, a magnetic body may be embedded within the object body. Although the magnetic moments of the various embodiments may have different properties, the shape and center of gravity of the object dictates how the object reaches the rest location and orientation, and how the object activates/moves from the rest location and orientation upon re-energization of the coil. So long as the polar axis of the electro-magnetic coil(s) is misaligned with the object's magnetic poles when at the rest location/orientation, energization of the coil causes the object to move from its rest location/orientation.

In some embodiments, the polar axis of the electromagnetic coil may be aligned with a protuberance of the base that prevents the object from coming to rest at a position/orientation that magnetically aligns with the polar axis. The intersection between the sidewalls and bottom of the container may be blended such that the motion of the object is gradually reversed as it nears the sidewall or boundary of the container. The actuation or stimulation of the magnetically reactive object together with gravity, traction, inertia, and the shape of the object all contribute to movement of the object within the container in an ever-changing random pattern.

In other embodiments, the invention may utilize the motion generator to activate or stimulate associated articles. Additional articles may be configured and/or positioned so as to be responsive to the driven object, in some cases so that the driven object itself may be moved in an ever-changing pattern of motion. By way of example, the motion generator (including an electromagnetic coil, a container and a magnetically responsive object) may be combined with an artificial flame assembly and light source to thereby actuate the artificial flame in a highly randomized manner to create a realistic flicker and flutter of a flame.

An example artificial flame assembly includes a screen, wire loop, pivot object, pivot disk, two disc magnets and a magnet holder. The wire loop couples all the parts together and is sufficiently rigid to transfer the motion of the magnet to the screen. The wire loop inserts through a slot in the screen, through the pivot object, though the pivot disk, through the magnet holder, and is fixed between the two magnets. The artificial flame assembly is held in place adjacent the container of the motion generator by a joint that allows the flame assembly to pitch, yaw, and roll with several degrees of freedom. The artificial flame assembly may be further oriented in relation to the motion generator such that disc magnets combine together with their poles aligned parallel to the top plane of the container.

The magnetic assembly may be encased in fluid to dampen the motion of the screen. Dampening the motion forces the screen to bend and attenuates the activity. The specific gravity relationship of the screen and the fluid, and the center of gravity of the magnetic assembly are selected such that the longitudinal axis of the magnetic assembly rests vertical or perpendicular to the top plane of the container. The distance between the motion generator and the artificial flame assembly may be adjusted to increase or decrease the rate of the ever-changing pattern of motion.

When randomized displacement of an article is desired, the orientation of the magnetic field emanating from the motion generator may be utilized to displace a variety of magnetically responsive articles. Those skilled in the art will appreciate that the shape and size of the container and the shape of the object may be designed to create unique appearances, simulations, animations, or illusions. Further, the motion generator may be incorporated into other devices having magnetically responsive articles to further compound the animation or illusion. By way of example, and without limitation intended, a motion generator may be incorporated into an aquarium tank. Buoyant artificial fish-shaped objects may traverse through liquid in the tank, wherein the objects may have magnetically responsive properties. When a magnetic field is applied to the tank or a magnetic field is produced by an adjacent motion generator, the objects are displaced within the tank in random directions creating an appearance that the artificial fish are swimming within the aquarium.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

BRIEF DESCRIPTION OF THE DRAWINGS

In the various figures, which are not necessarily drawn to scale, like numerals throughout the figures identify substantially similar components.

DETAILED DESCRIPTION

Figure 1:
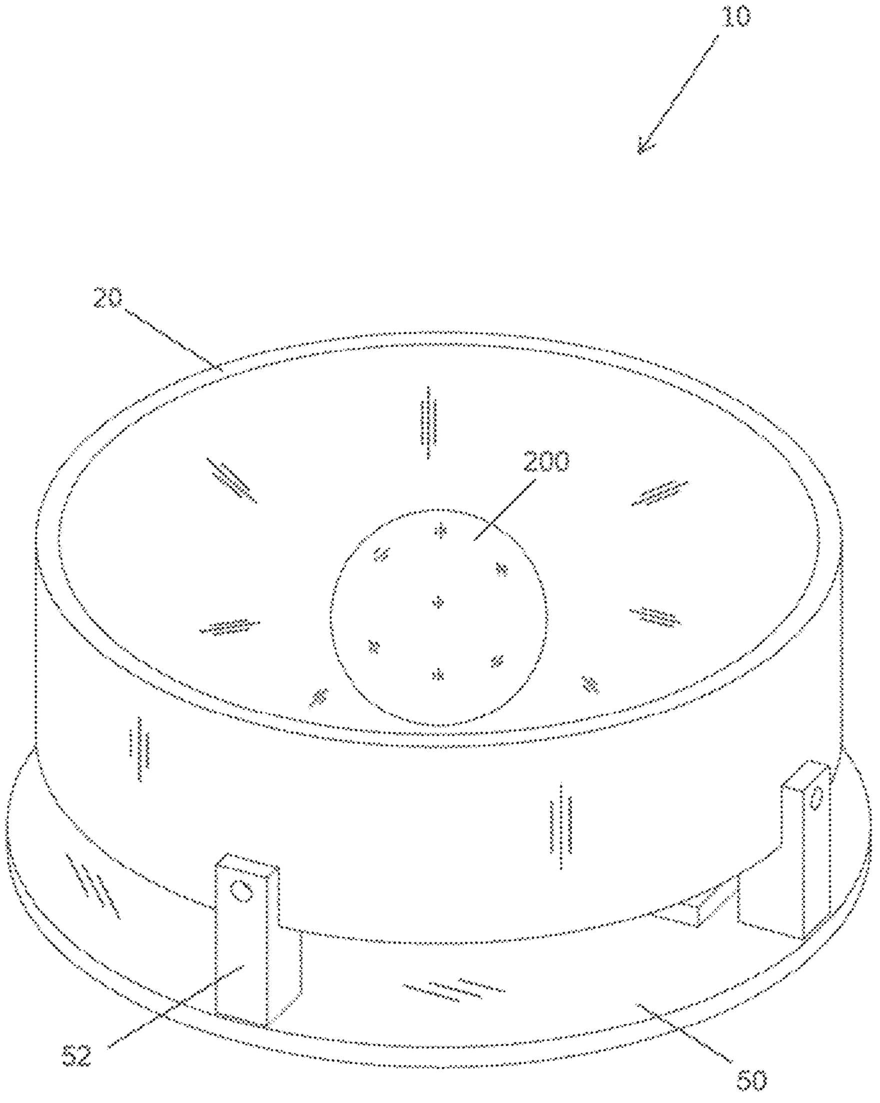
FIG. 1 is a top perspective view of a motion generator embodiment of the present technology shown with stationary confinement.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present technology without departing from the scope or spirit of the invention. By way of example, those skilled in the art will recognize that features illustrated or described as part of one embodiment, may be used in another embodiment to yield a still further embodiment. Thus, it is intended that the present technology also cover such modifications and variations that come within the scope of the appended claims and their equivalents.

The various apparatus and methods of embodiments of the present technology are particularly well suited to generate randomized motion of a magnetically responsive object. When the object itself exhibits magnetic properties, the motion generator generates magnetic fields that act upon the object in a way that consequently shifts the magnetic pole alignment of the object. When an object is free to move within a bound space, the change in pole alignment of the object may move the object within the boundary of confinement. The shifting magnetic pole alignment is further particularly well suited for creating a randomized motion or actuation of a magnetically responsive object. The various features of the motion generator and associated methods are further illustrated in the figures.

Generally, the motion generator of the present technology includes an electromagnet, a magnetically responsive object, and a confinement or container for the object. At least one electromagnet is positioned adjacent or near the container such that a magnetic field of the electromagnet acts upon or affects the magnetically responsive object contained by the container. The container confines the movement of the magnetically responsive object but also permits movement of the object with multiple degrees of freedom within the container. The container may include a parabolic, elliptical, concave or otherwise curved surface or structure that confines the rolling or tumbling of the object while urging the object to return under the force of gravity to a rest position. Movement of the object within the container may be responsive to gravitational and magnetic forces. The container may be static or may include flexible or pivotable mounting to allow for a wobble or rocking motion of the container as the position of the object bounded by the container fluctuates. The position of the magnetically reactive object bounded by the container may be used to drive or compel movement of other articles that may be in some way coupled to the magnetically responsive object. Example modes of coupling include magnetic, electrical, and physical. Alternatively, an article may be located adjacent to the container such that as the object moves bounded the container, the magnetically responsive object may arbitrarily or randomly contact the adjacent paired article.

Alternative embodiments of the invention may combine the motion generator and one or more paired articles with a light source intended to illuminate at least a portion of one or both of the motion generator and the paired article. The container may include reflectors that reflect the light source to create an appearance that the light source is moving, particularly in embodiments employing a movable container. Alternatively, the light source may be combined with the motion generator in a manner to direct light towards a target, such as a moving target that moves in response to the motion generator. The light may be modulated in intensity, color, focus, etc. For example, a light blocker may move in and out of the light beam to modulate the light intensity and the characteristics of the beam. Alternatively, the light blocker may be made of a multi-colored material such that as the light blocker moves through the light beam, a modulating color would be generated and perceived. Further, alternatively, one or more of the object, articles, and apparatus may be constructed of materials, configured and located to reflect, diffuse and/or create shadows from the light source. Further, the light source may be reflected by a concave mirror to direct a beam of light towards a screen assembly. The light source and/or other components may block some of the emitted light to create a varying light intensity in the beam or shadows displayed on the screen. In some embodiments, the shadow may provide the appearance of a candle wick at the base of the screen that receives the light.

Other embodiments of the invention may encase portions of the motion generator and/or the paired articles within a viscous fluid. By way of example, and without limitation intended, one or more of the magnetically responsive object, container and paired articles may be partially or fully immersed in a liquid. The viscosity of the liquid may be selected to affect the rate of displacement of moving bodies within the liquid. Also, the fluid may be used to affect thermal-management, optics, acoustics, electrical conductivity, and physical wear on the moving parts. When selecting the fluid the user may consider many properties of the fluid including the index of refraction, viscosity, clarity, specific gravity, coefficient of friction, coefficient conductivity, freezing point and (non)toxicity.

With reference to the Figures, various embodiments and components of the motion generator according to aspects of the invention will be described in greater detail. FIGS. 1-4 illustrate a motion generator 10 that confines a magnetically reactive object 200 within a boundary of a container, base or housing 20. In this embodiment the container 20 is shown fixed to supports 52 extending from a container mounting base 50. Recesses 54 formed in supports 52 provide a stable inner ledge on which the container 20 rests. These inner ledges restrict side to side and up and down movement of the container 20. The container 20 includes a sidewall 24 that extends between a lower or bottom portion 28 and an upper top ledge 26 of the container. An interior surface 34 of sidewall 24 extends between the upper top ledge 26 and a nonplanar and curved bottom portion 30. The transition between upper top ledge 26 and bottom portion 30 may be chamfered or otherwise curved to provide a gradual curved intersection 36. Further, bottom portion 30 may curve upward and outward from a center region 40 of bottom portion 30 to form a raised center region with respect to bottom portion 30. Alternatively, the non-planar bottom portion 30 may include an upward extending bump 42 positioned in the center region 40 of the bottom portion 30 of interior surface 34. It is to be understood for all embodiments described herein that various modifications from the example configurations are contemplated as being useful in the present technology. For example, it is contemplated that certain embodiments of the invention may involve planar portions for the interior surface of the container.

Figure 2:
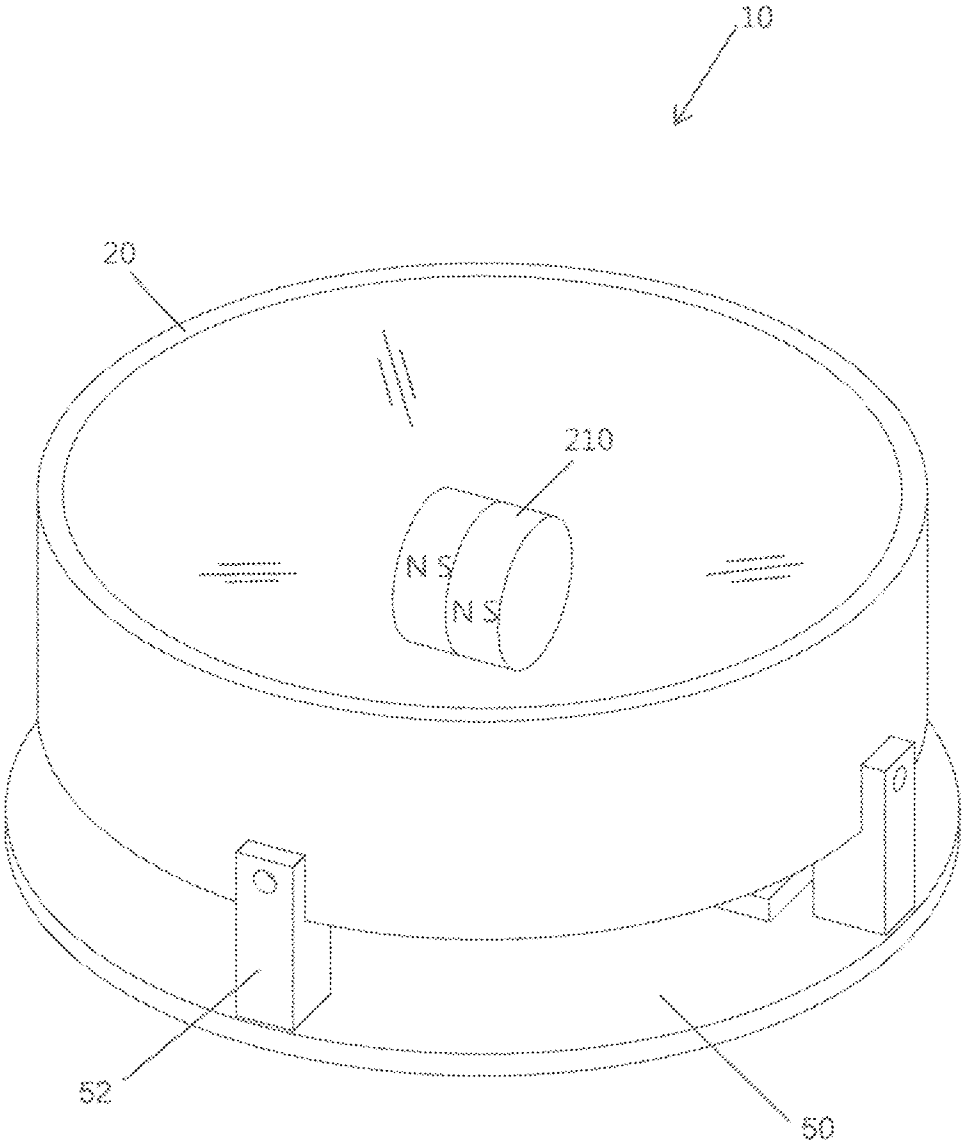
FIG. 2 is a partial sectional perspective view of a motion generator of the present technology of the type shown in FIG. 1.
Figure 3:
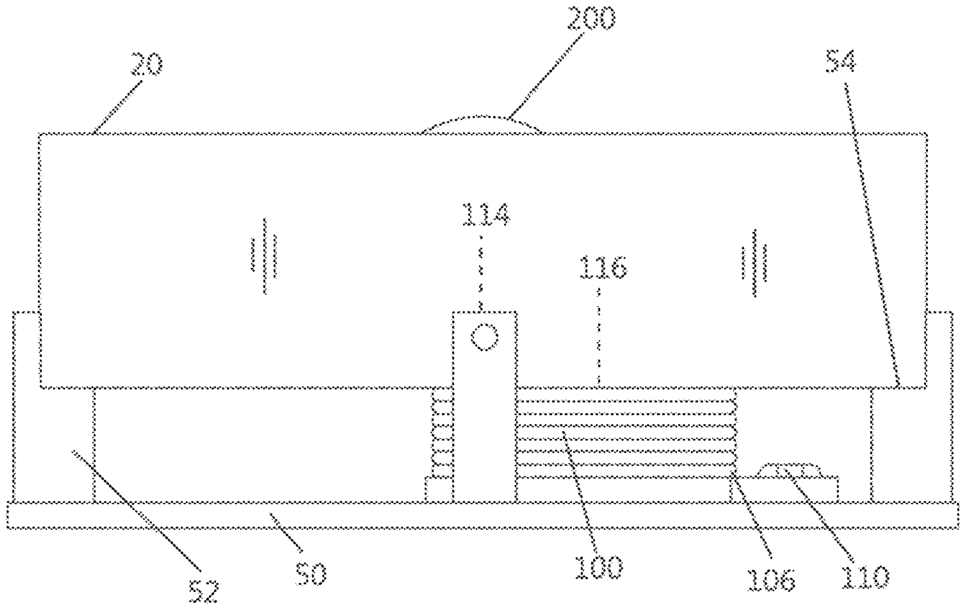
FIG. 3 is a side perspective view of a motion generator of the present technology of the type shown in FIG. 1.
Figure 4:
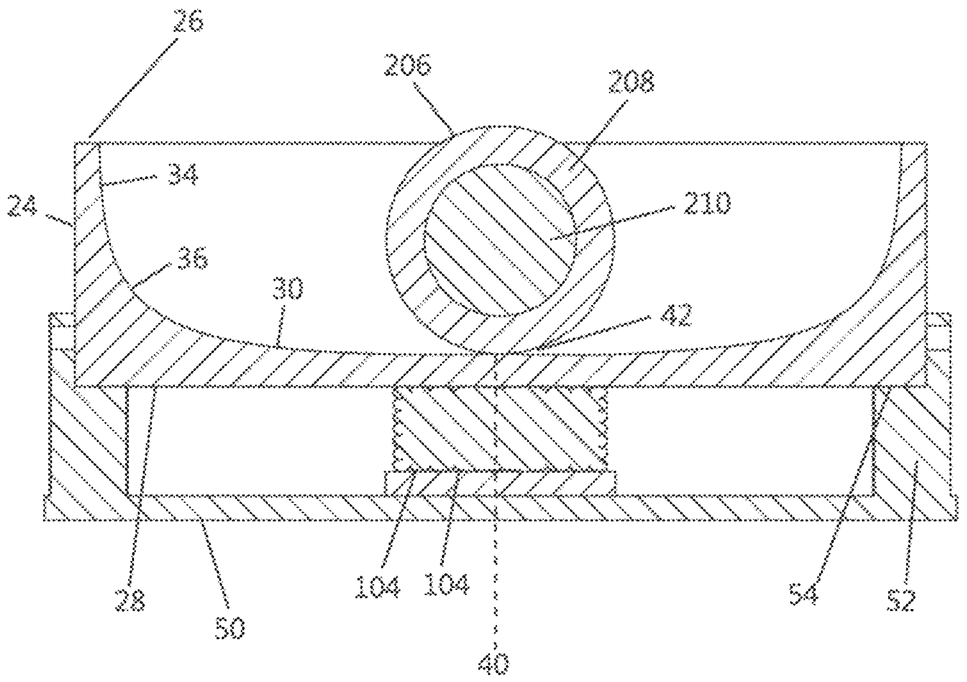
FIG. 4 is a partial sectional side view of a motion generator of the present technology of the type shown in FIG. 1.
Figure 5:
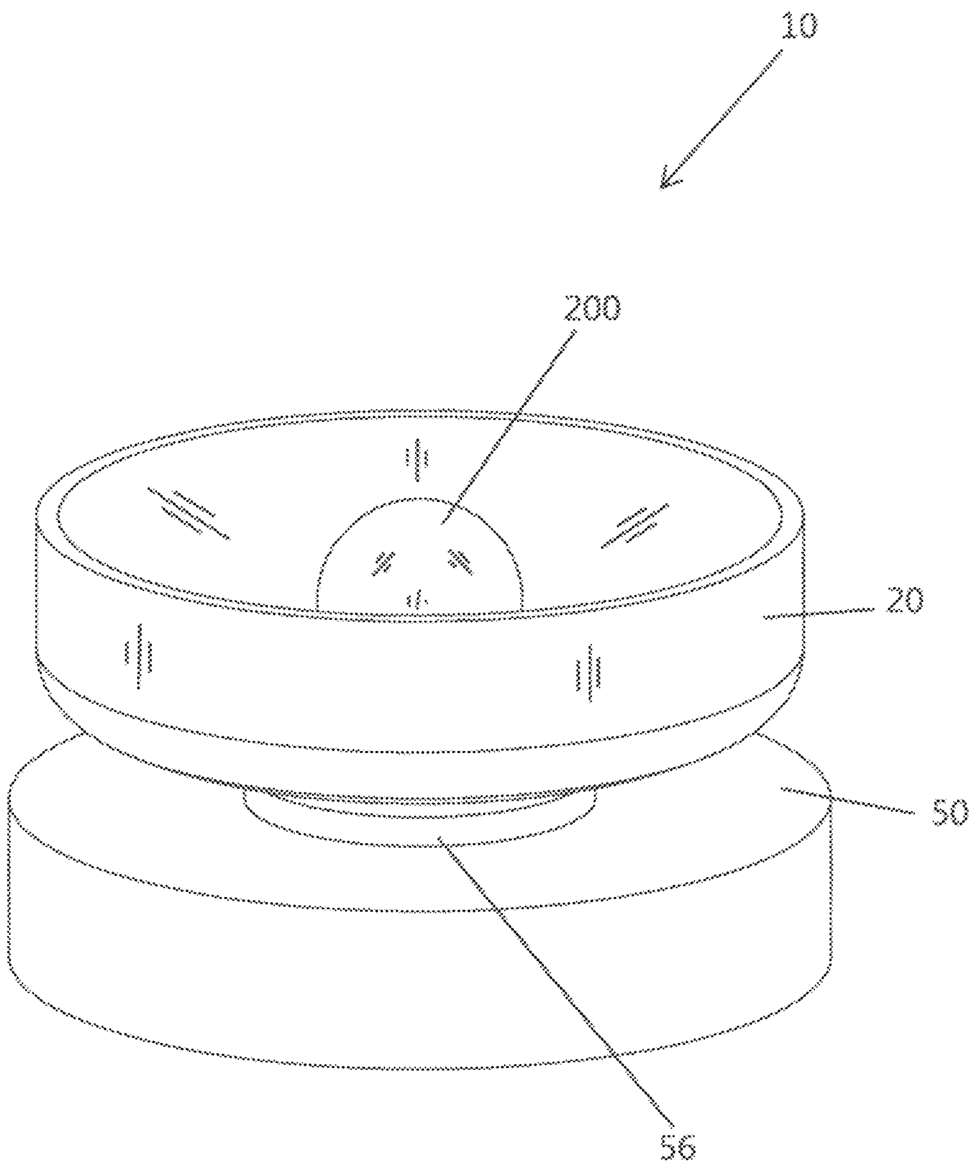
FIG. 5 is a top perspective view of a motion generator embodiment of the present technology shown with moving confinement.
Figure 6:
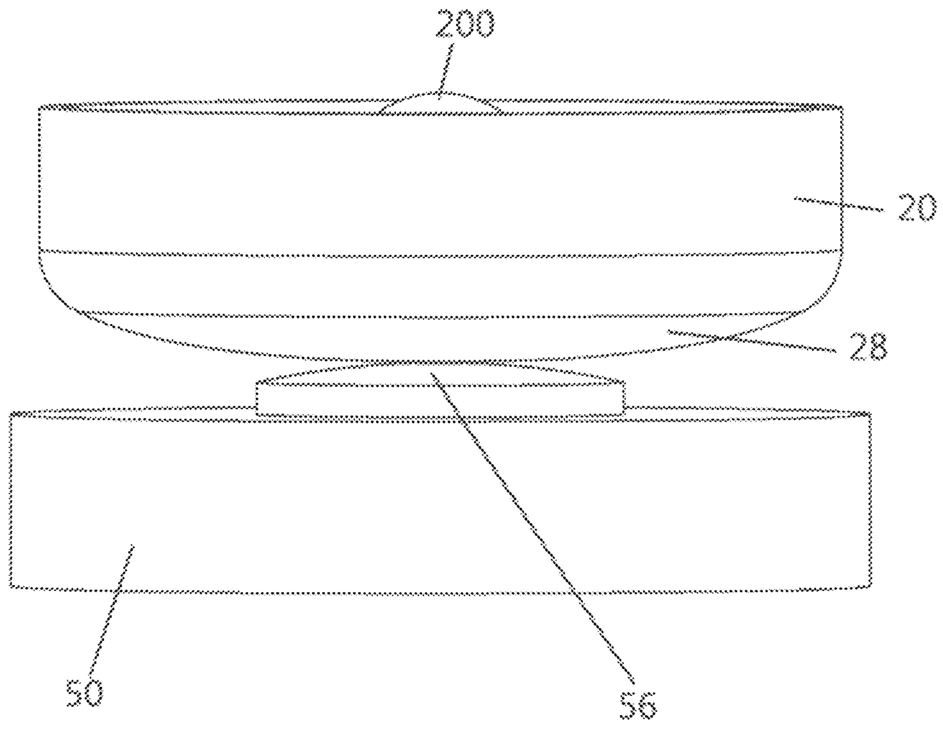
FIG. 6 is a side perspective view of a motion generator of the present technology of the type shown in FIG. 5.
Figure 7:
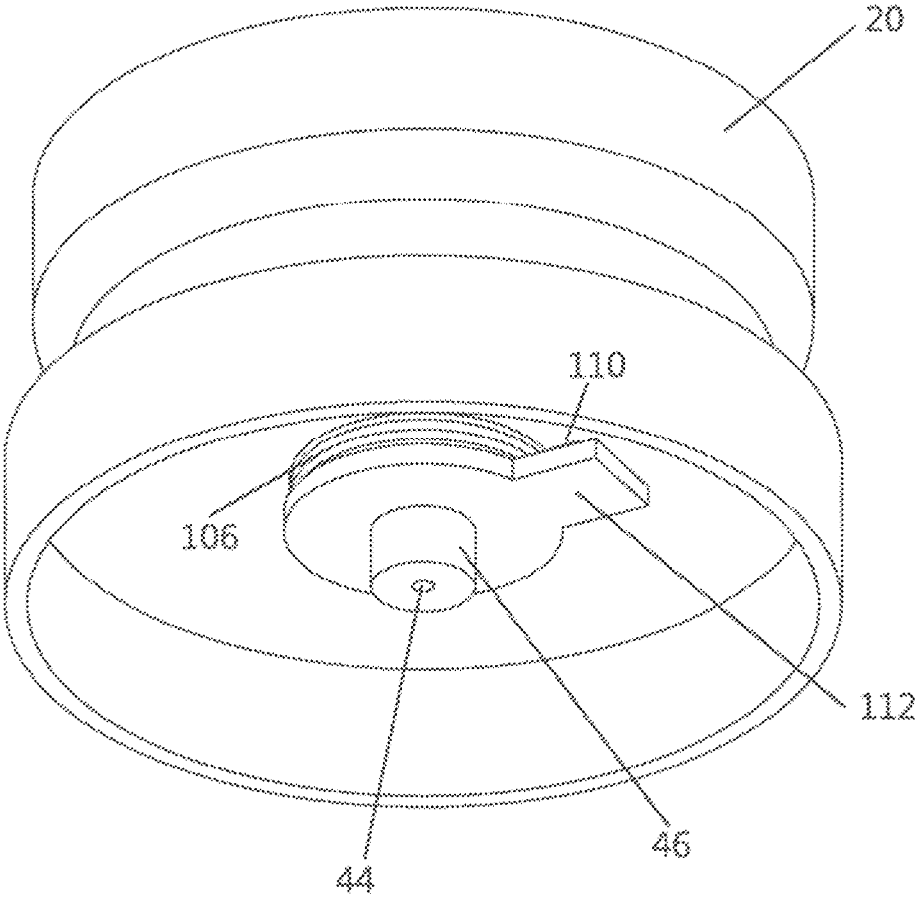
FIG. 7 is a bottom perspective view of a motion generator of the present technology of the type shown in FIG. 5.
Figure 8:
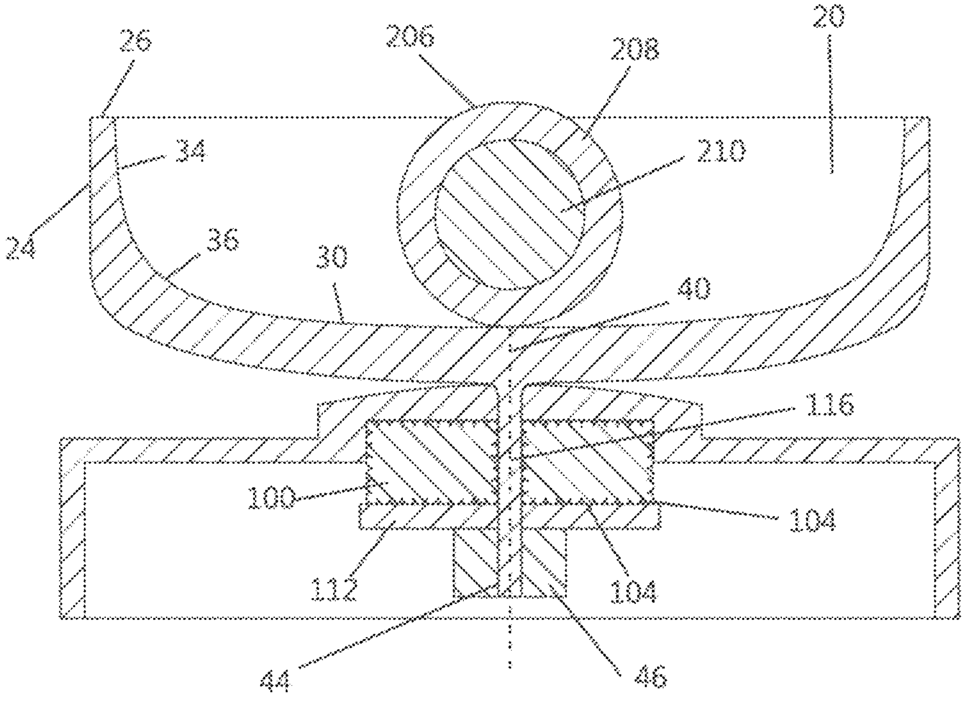
FIG. 8 is a partial sectional side view of a motion generator of the present technology of the type shown in FIG. 5.
Figure 62:
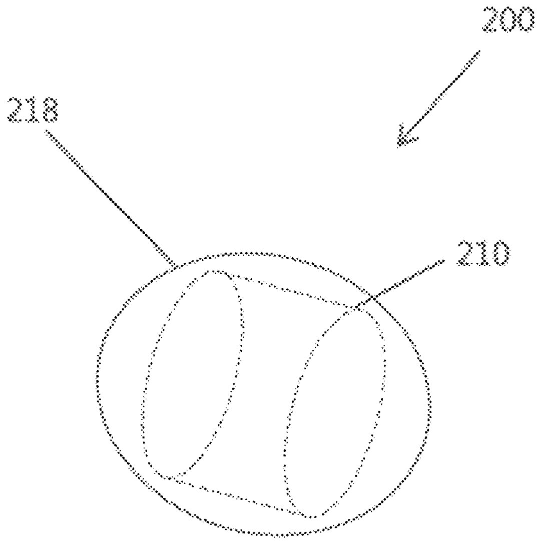
FIG. 62 is a perspective view of an elliptical object suitable for use with the motion generator of the present technology.

This embodiment of the random motion generator 10 includes a single electromagnetic coil 100. The coil includes several windings 104 of a continuous wire 106. The ends of the coiled windings 104 are coupled to electrical contact or conductor pads 110. A low voltage power supply may be electrically coupled to the pads to thereby cause a flow of electrons through the coil windings 104. When electrons flow through the coil a magnetic field is established. A central core of the windings 104 may be hollow or filled with air. The center or central axis 116 of the coil windings 104 of the continuous wire 106 may be offset or mis-aligned with respect to a central axis 40*a* of the housing 20 (see FIG. 3), such that magnetic flux from windings 104 may have an axis that is spaced from central axis 40*a*. The object 200 may have a spherical outer surface 206. FIGS. 2 and 4 illustrate a disc magnet 210 that may be embedded in an encasement 208 having a spherical outer surface 206. Alternatively, the object may have a spherical shape and made from a permanent magnetic material or may be made from a material having magnetically responsive properties (see FIGS. 1 and 3). Those skilled in the art will appreciate that the various embodiments described herein utilizing a spherical object 200 may instead utilize an elliptical object 218 (see FIG. 62) or other shape made of magnetic material or having disc magnets embedded therein as illustrated in FIG. 4. In some embodiments, object 200 has an exterior surface that facilitates movement with respect to surface 34, driven by magnetic interaction between electromagnetic coil 100 and magnet 210. Outer surface 206 may therefore be rounded to facilitate a rolling motion when responding to magnetic field generated by electromagnetic coil 100.

The shape of the object together with the shape of the container 20 and/or surface 34 and gravitational forces may cause the object 200 to come to rest at a rest location 40 of the container 20 when no magnetic field from the coil 100 is present, or the magnetic field is insufficient to cause motion to object 200. When electricity passes through the coil windings 104, a magnetic field results that acts upon the magnetically responsive object 200 and displaces the object 200 from the rest position 40 of the container 20. The inner surface 34 of container 20 may be configured to randomize motion of the object 200 within a boundary defined by container 20 when the object is responding to the applied magnetic field. If the object 200 exerts a magnetic field of its own, the magnetic moment of the object 200 and the magnetic moment of an active electromagnetic coil 100 may interact, further urging the object 200 to move upon surface 34 of the container 20, preferably in an ever-changing pattern of motion. Depending upon the direction of the current through the electromagnetic coil 100 and the orientation of the magnetic moment of the object 200, the object 200 may be attracted toward or pushed away from a polar axis 116 of the coil 100. As the object 200 moves along surface 34, the orientation of the magnetic moment of the object 200 may be ever-changing, which further contributes to the randomized motion of the object 200. Also, the randomness of motion is further compounded by the gravitational forces acting upon the object 200 as it moves about on the curved inner surface 34 of the container 20.

Referring next to FIGS. 5-8 a motion generator 10 is illustrated having a container, base or housing 20 that confines a magnetically responsive object 200 within a boundary defined by the container. In this embodiment the container 20 is shown supported by a dome 56 extending upward from the mounting base 50. The container 20 includes an elastic stem 44 extending from the bottom of the container. The stem extends through an aperture in the dome

56, and a free end of the elastic stem 44 is fixed to a retainer 46 positioned under the base or board of coil 100. The elastic stem 44 may be tensioned so that the bottom 28 of the container presses against the dome 56 but remains flexible enough to allow the container to see saw, wobble, or rock about the dome with multiple degrees of freedom. Movement of container 20 with respect to mounting base 50 may be driven by movement of object 200 along surface 34 in response to an applied magnetic field. The weight of object 200 having a gravitational vector that is spaced from an axis of elastic stem 44 causes the movement of container 20 with respect to mounting base 50. The container 20 includes an exterior sidewall 24 that extends between a lower or bottom portion 28 and an upper top ledge 26 of the container. An interior surface 34 extends between the upper top ledge 26 and a nonplanar and curved bottom portion 30. Inner surface 34 may be chamfered or otherwise curved to provide a gradual curved profile between upper top ledge 26 and bottom portion 30. Further, the bottom portion 30 of surface 34 may curve upward at a center region 40.

Electromagnetic coil 100 may be fixed to the mounting base 50 under the container 20 and held in place under the tension of the elastic stem 44. The coil 100 may include several windings 104 of a continuous wire 106. The ends of the coiled windings 104 are coupled to electrical contact or conductor pads. A low voltage power supply may be electrically coupled to the pads to thereby cause a flow of electrons through the coil windings 104. When electrons flow through the coil 100, a magnetic field is established. A central core of the windings may be hollow or filled with air. The center or central axis of the coil windings 104 of the continuous wire 106 may be aligned with the center of the housing 20.

Figure 9:
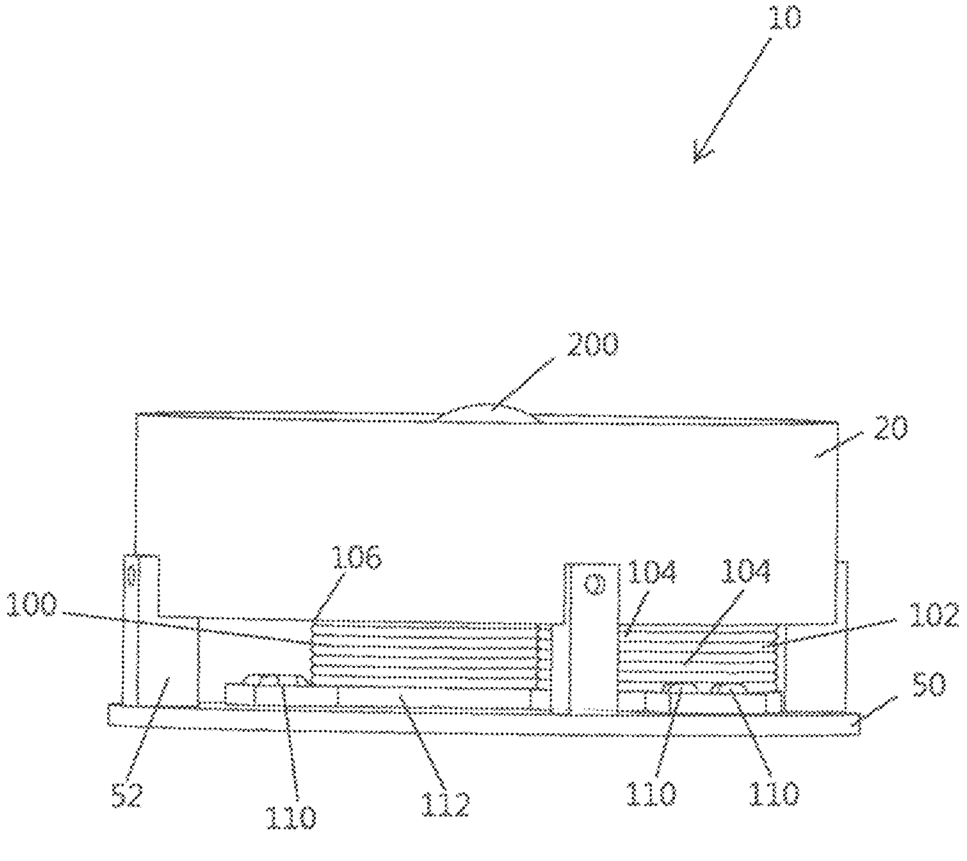
FIG. 9 is a side perspective view of a motion generator embodiment of the present technology having two electromagnets positioned under a positional confinement.
Figure 10:
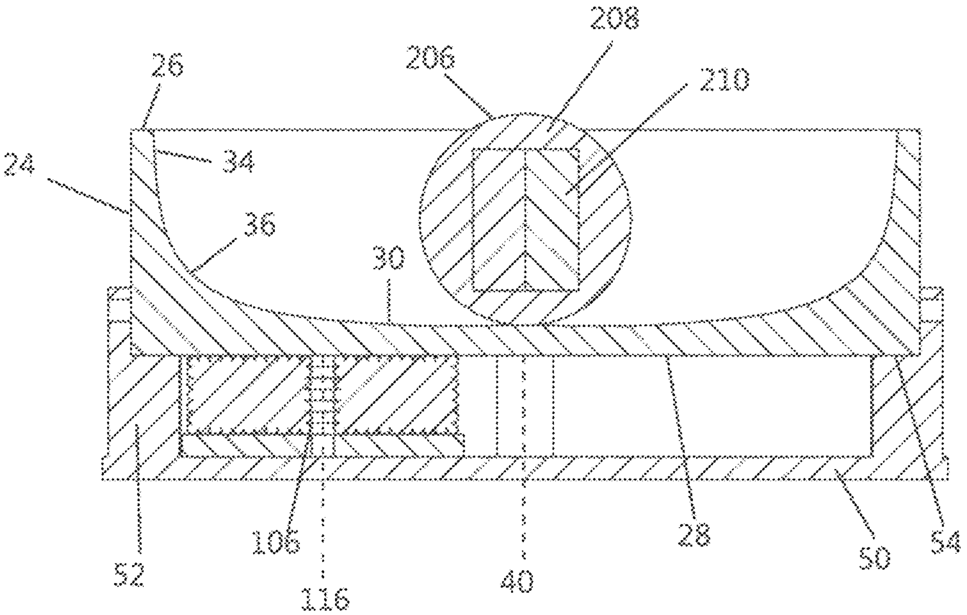
FIG. 10 is a partial sectional side perspective view of a motion generator of the present technology of the type shown in FIG. 9.
Figure 11:
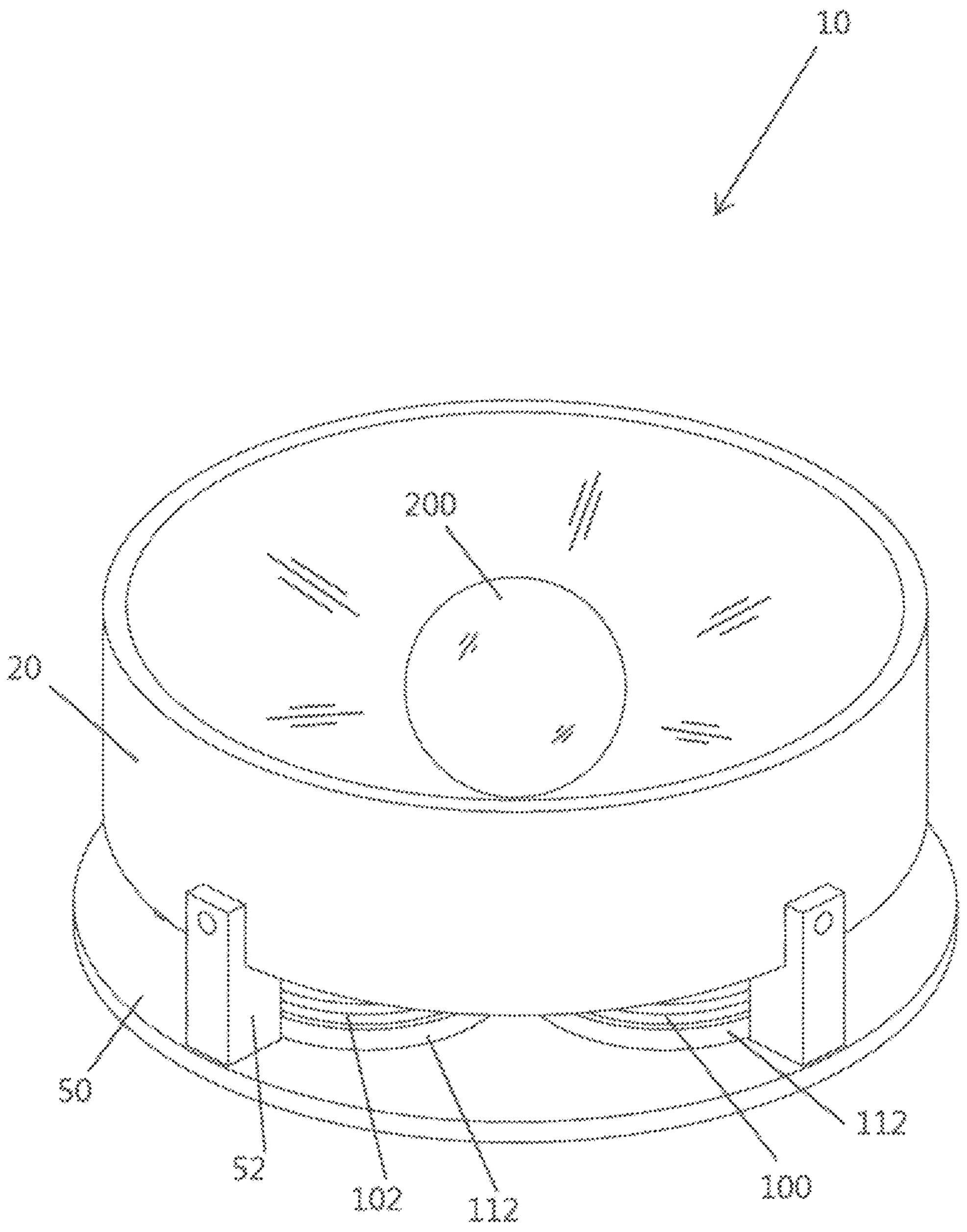
FIG. 11 is a top perspective view of a motion generator embodiment of the present technology shown with positional confinement.
Figure 12:
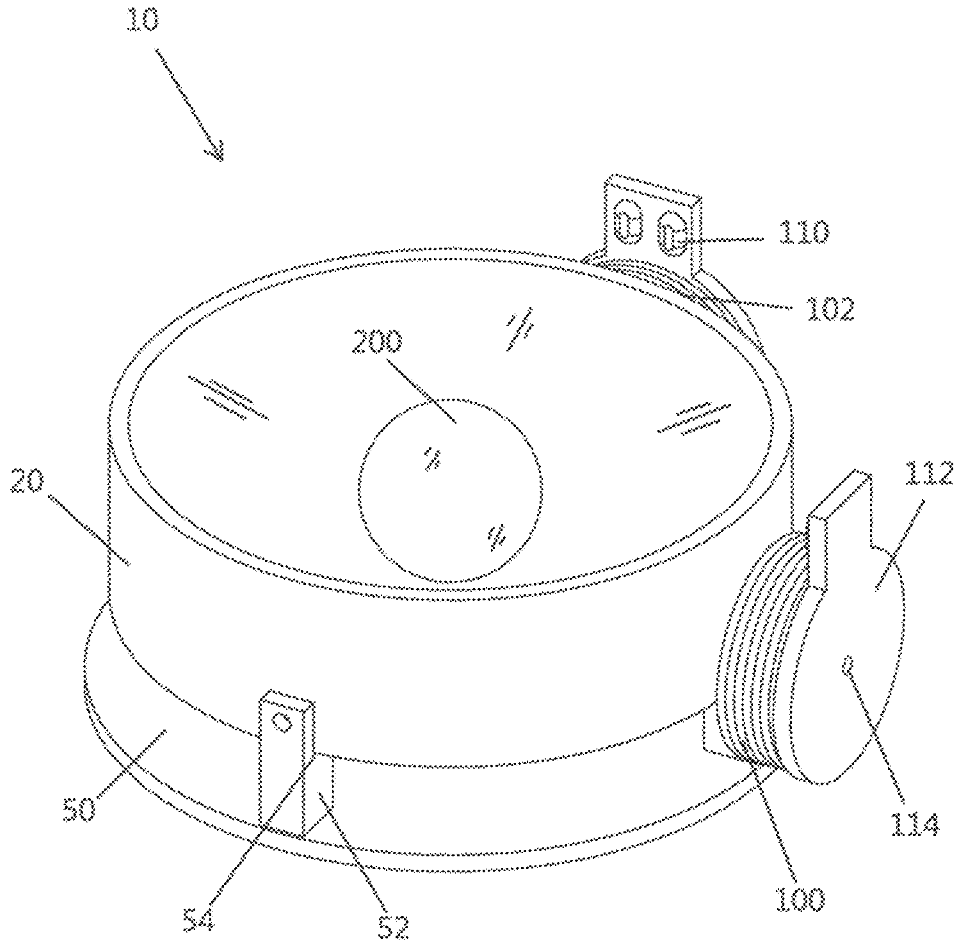
FIG. 12 is a top perspective view of a motion generator embodiment of the present technology having two electromagnets positioned on sides of a positional confinement.

Referring next to FIGS. 9-11 a motion generator 10 is illustrated that confines a magnetically responsive object 200 within a boundary defined by container, base or housing 20. In this embodiment the container 20 is shown fixed to supports 52 extending from a container mounting base 50. Recesses 54 formed in supports 52 provide a stable inner ledge on which the container 20 rests. These inner ledges restrict side to side and up and down movement of the container 20. The container 20 includes an exterior sidewall 24 that extends between a lower or bottom portion 28 and an upper top ledge 26 of the container. An interior surface 34 extends between the upper top ledge 26 and a nonplanar and curved bottom portion 30. Surface 34 may be chamfered or otherwise curved between the upper top ledge 26 and the bottom portion 30. Further, the bottom portion 30 may curve upward at center region 40. Alternatively, the non-planar bottom portion 30 may include an upwardly extending bump positioned in the center region 40 of the bottom portion 30.

This embodiment of the motion generator 10 may include two or more electromagnetic coils 100 positioned underneath the container 20. Each coil 100 includes several windings 104 of a continuous wire 106. The ends of the coiled windings 104 are coupled to electrical contact or conductor pads 110 formed on board 112. A low voltage power supply may be electrically coupled to the pads to thereby cause a flow of electrons through the coil windings 104. Power may be supplied to the two coils simultaneously or may alternate between the two coils 100. When electrons flow through the coil a magnetic field is established associated with each coil. The object 200 may have a spherical outer surface 206. FIG. 10 illustrates a disc magnet 210 that is embedded in an encasement 208 having a spherical outer surface 206. Alternatively, the object may have a spherical shape and made from a permanent magnetic material or may be made from a material having magnetically responsive properties (see FIG. 9).

The shape of the object together with the shape of the container 20 and/or surface 34 and gravitational forces may cause the object 200 to come to rest at a rest location of the container 20 when no magnetic field from the coils 100 is present, or the magnetic field is insufficient to cause motion to object 200. When electricity passes through the coil windings 104, a magnetic field results that acts upon the magnetically responsive object 200 and displaces the object 200 from the rest position 40 of the container 20. The inner surface 34 of container 20 may be configured to randomize motion of the object 200 within a boundary defined by container 20 when the object is responding to the applied magnetic field. If the object 200 exerts a magnetic field of its own, the magnetic moment of the object 200 and the magnetic moment of an active electromagnetic coil 100 may interact, further urging the object 200 to move upon surface 34 of the container 20, preferably in an ever-changing pattern of motion. Depending upon the direction of the current through the electromagnetic coil 100 and the orientation of the magnetic moment of the object 200, the object 200 may be attracted toward or pushed away from a polar axis 116 of the coil 100. As the object 200 moves along surface 34, the orientation of the magnetic moment of the object 200 may be ever-changing, which further contributes to the randomized motion of the object 200. Also, the randomness of motion is further compounded by the gravitational forces acting upon the object 200 as it moves about on the curved inner surface 34 of the container 20.

Referring next to FIGS. 12-16 a motion generator 10 is illustrated that confines a magnetically reactive object 200 within a boundary defined by a container, base or housing 20. In this embodiment the container 20 is shown fixed to supports 52 extending from a container mounting base 50. Recesses 54 formed in supports 52 provide a stable inner ledge on which the container 20 rests. These inner ledges restrict side to side and up and down movement of the container 20. The container 20 includes an exterior sidewall 24 that extends between a lower or bottom portion 28 and an upper top ledge 26 of the container. An interior surface 34 extends between the upper top ledge 26 and a nonplanar and curved bottom portion 30. Surface 34 may be chamfered or otherwise curved between the upper top ledge 26 and the bottom portion 30. Further, the bottom portion 30 may curve upward from the center region 40.

Figure 13:
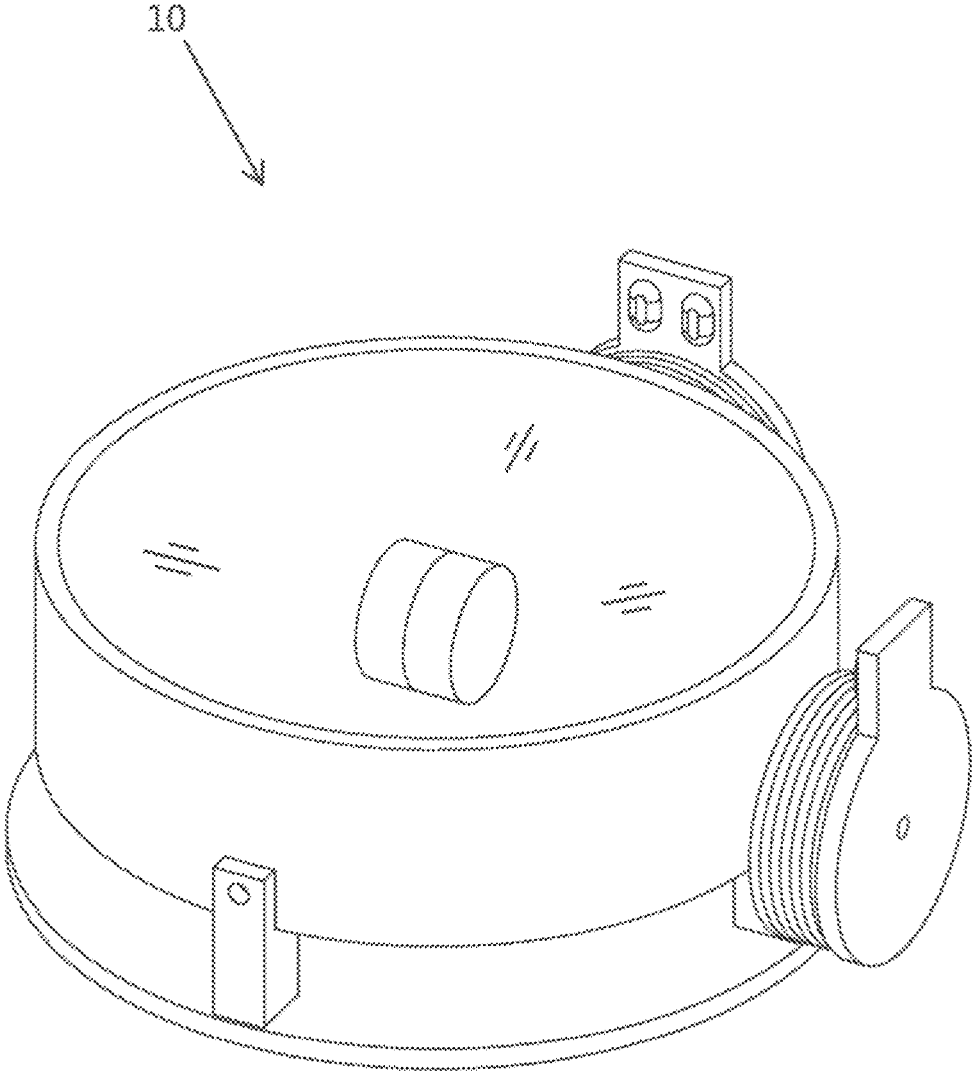
FIG. 13 is a partial sectional top perspective view of a motion generator embodiment of the present technology having two electromagnets positioned on sides of a positional confinement.
Figure 14:
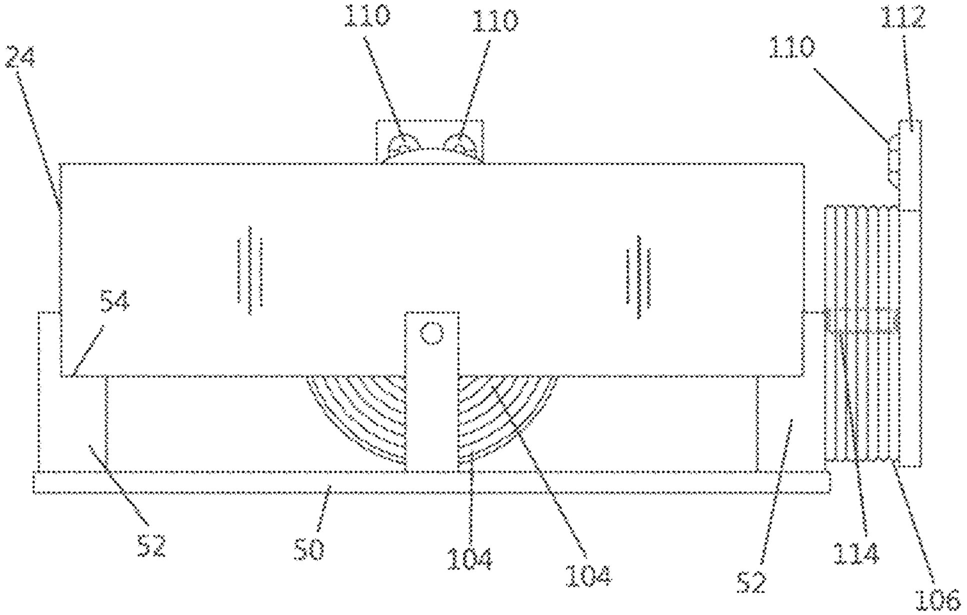
FIG. 14 is a side view of a motion generator of the invention of the type shown in FIG. 12.
Figure 15:
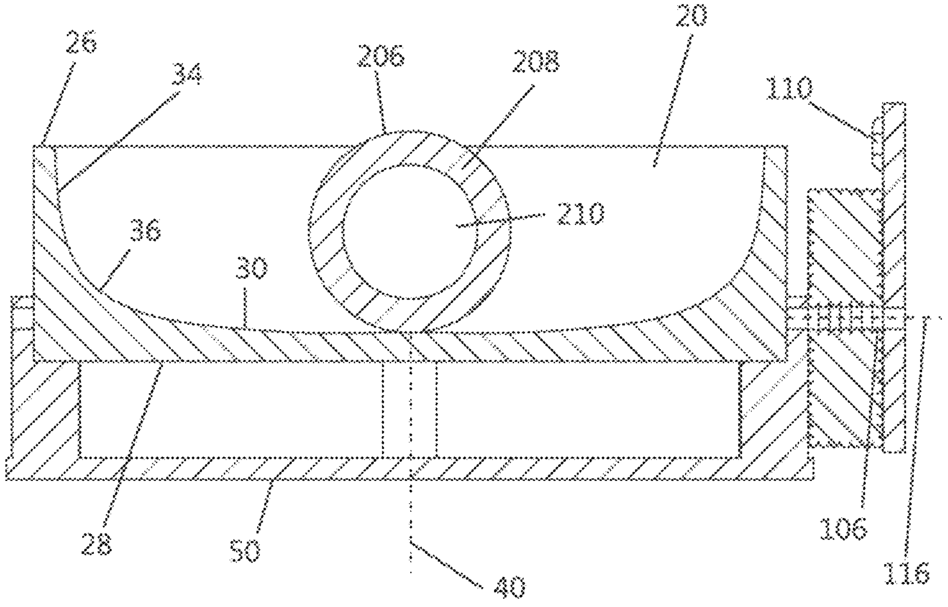
FIG. 15 is a partial section right side view of a motion generator of the present technology of the type shown in FIG. 12.
Figure 16:
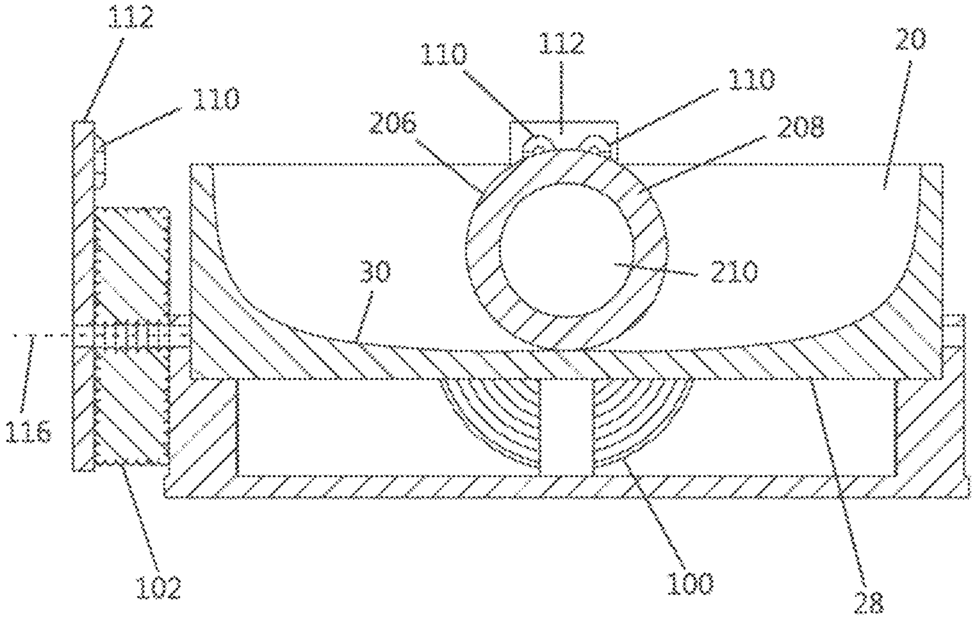
FIG. 16 is a partial sectional left side view of a motion generator of the present technology of the type shown in FIG. 12.

This embodiment of the motion generator 10 may include two or more electromagnetic coils 100 positioned along the side of the container 20 and spaced orthogonally with respect to each other. Each coil includes several windings 104 of a continuous wire 106 that winds outwardly from a coreless or air core 114. The ends of the coiled windings 104 are coupled to electrical contact or conductor pads 110. A low voltage power supply may be electrically coupled to the pads to thereby cause a flow of electrons through the coil windings 104. Power may be supplied to the two coils simultaneously or may alternate between the two coils. When electrons flow through the coil a magnetic field is established associated with each coil. The object 200 may have a spherical outer surface 206. FIGS. 13, 15 and 16 illustrate a disc magnet 210 that is embedded in an encasement 208 having a spherical outer surface 206. Alternatively, the object may have a spherical shape and made from a permanent magnetic material or may be made from a material having magnetically responsive properties (see FIGS. 12 and 14).

Figure 17:
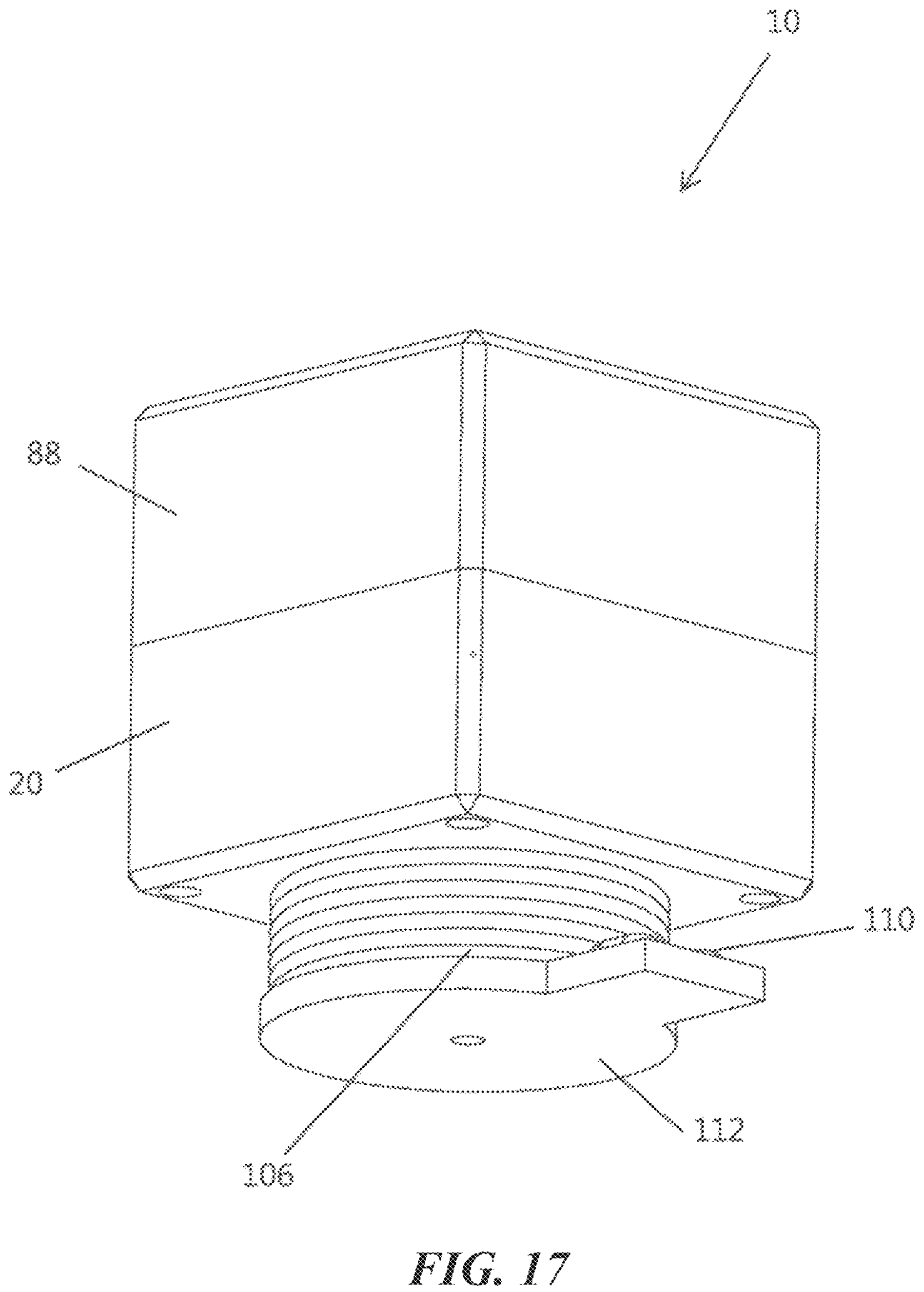
FIG. 17 is a bottom perspective view of a motion generator embodiment of the present technology shown with an enclosed confinement.
Figure 18:
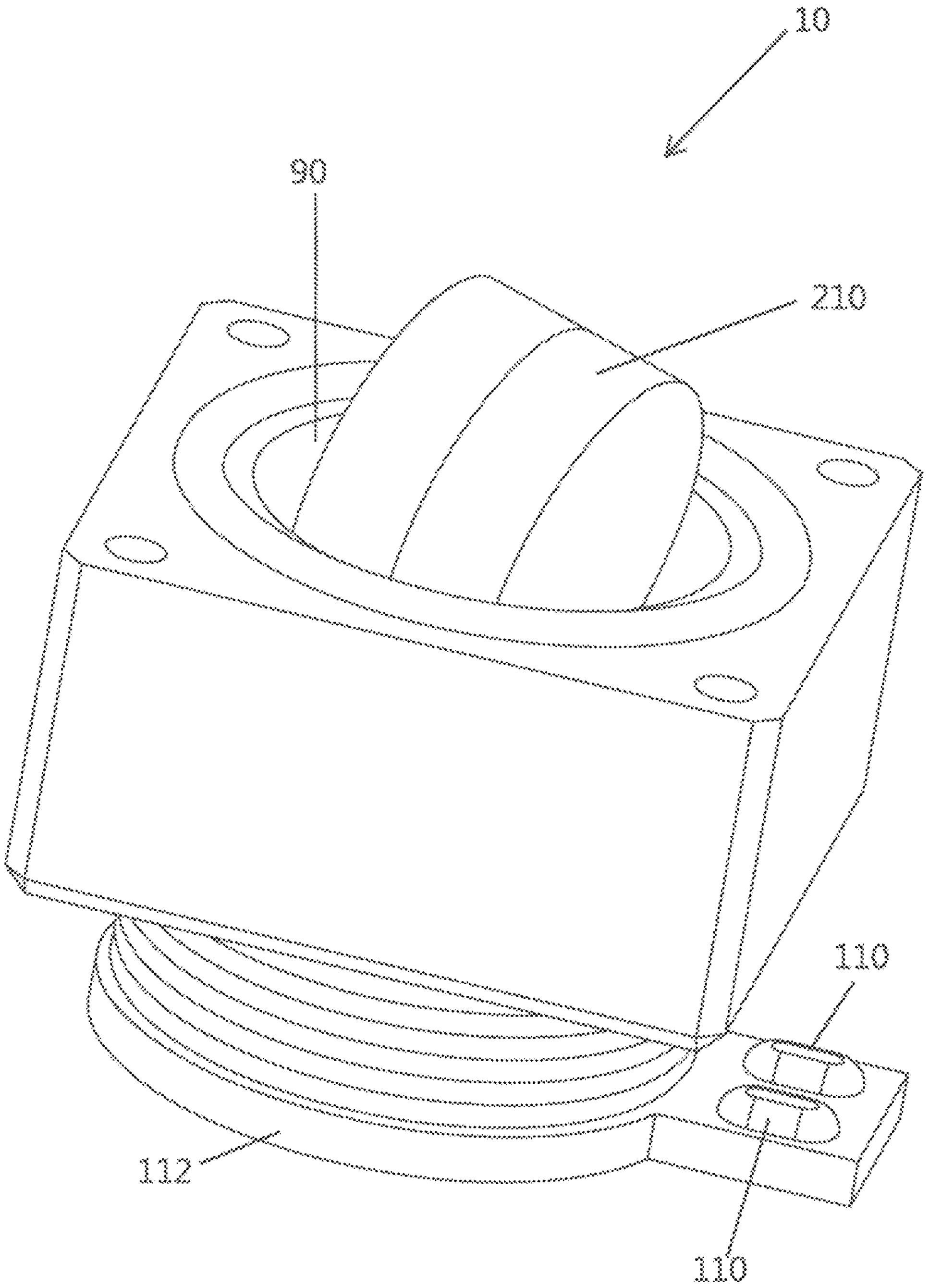
FIG. 18 is a partial sectional top perspective view of a motion generator of the present technology of the type shown in FIG. 17.
Figure 19:
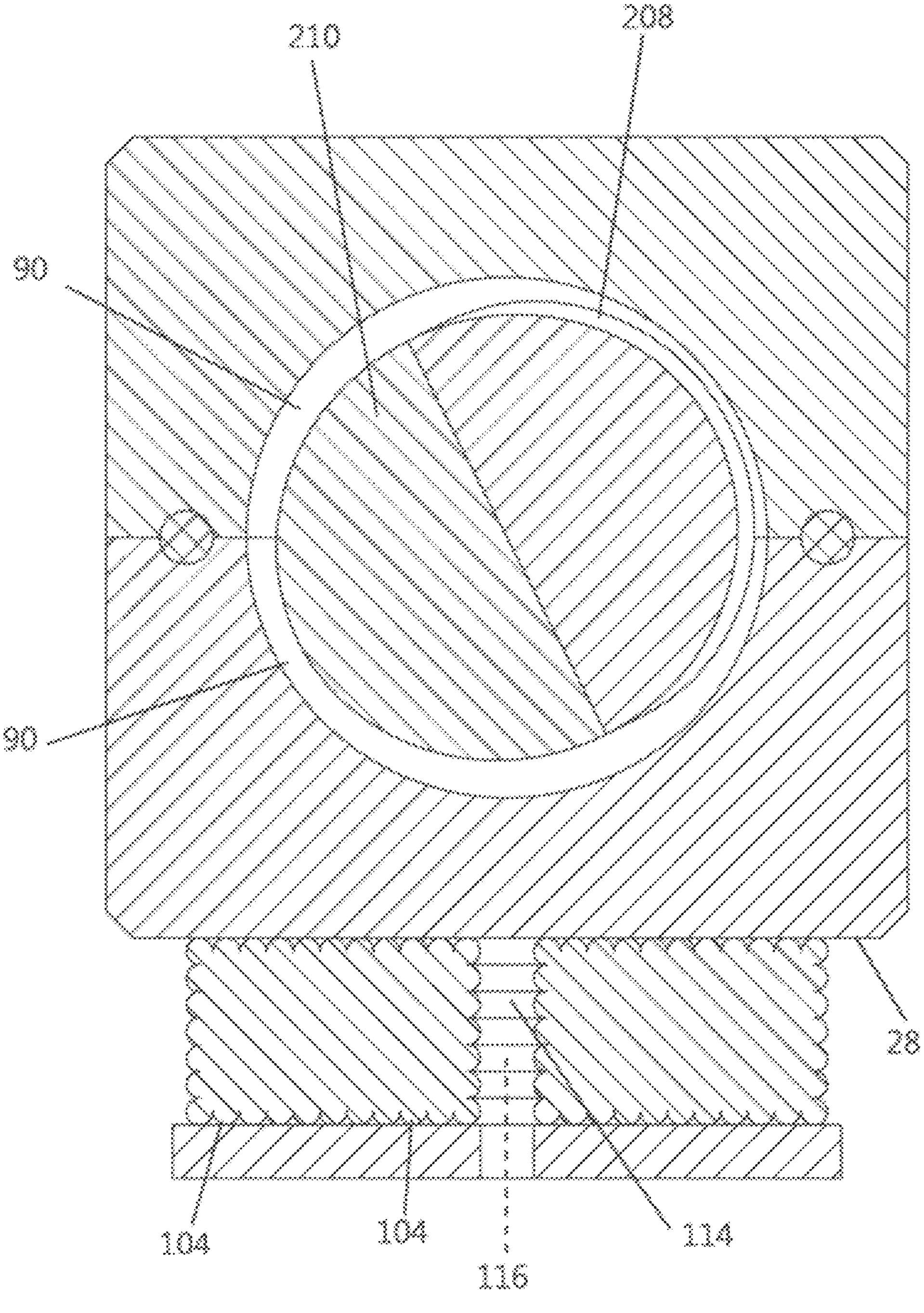
FIG. 19 is a partial sectional perspective view of a motion generator of the present technology of the type shown in FIG. 17.

Referring next to FIGS. 17-19 a motion generator 10 is illustrated that confines a magnetic spherical object 200 within a boundary defined by a container, base or housing 20. In this embodiment, the base 20 includes a top 88 that is fixed to the base 20 of the container. Both the base 20 and top 88 include concave interiors. When the top 88 is fixed to the base 20 an interior cavity 90 is formed by the concave interiors that captures and contains the object 200 within the cavity 90. The cavity 90 is preferably spherical and the diameter of the cavity is sized slightly larger than the object 200 to allow the object to freely rotate within the cavity 90.

This embodiment of the motion generator 10 includes an electromagnetic coil 100 mounted to the bottom exterior 28 of the container 20. The coil includes several windings 104 of a continuous wire 106. The ends of the coiled windings 104 are coupled to electrical contact or conductor pads 110. A low voltage power supply may be electrically coupled to the pads to thereby cause a flow of electrons through the coil windings 104. When electrons flow through the coil a magnetic field is established associated with the coil. The object 200 may have a spherical outer surface 206. FIGS. 18 and 19 together illustrate a disc magnet 210 that is embedded in an encasement 208 having a spherical outer surface 206. Alternatively, the object may have a spherical shape and made from a permanent magnet.

The shape of the object together with the slightly larger spherical cavity 90 and gravitational forces cause the object to come to rest at the gravitational bottom of the base 20 when no magnetic field from the coils 100 is present, or an insufficient magnetic field is present to urge object 200 into motion. When electricity passes through at least one of the coils 100, a magnetic field results that interacts with the magnetic moment of the object 200 causing the object to move within the cavity 90 responsive to the applied magnetic field. The magnetic moment of an active electromagnetic coil 100 interacts with the magnetic moment of the object 200 causing the object to move within the cavity 90. Depending upon the direction of the current through the electromagnetic coils and the orientation of the magnetic moment of the object, the object 200 may be attracted towards or pushed away from the bottom of the cavity 90. As the object moves, the orientation of the magnetic moment of the object is ever changing which further contributes to the ever-changing pattern of motion of the object. Also, the randomized motion is further compounded by the gravitational forces acting upon the object as it moves about within the cavity 90.

Figure 20:
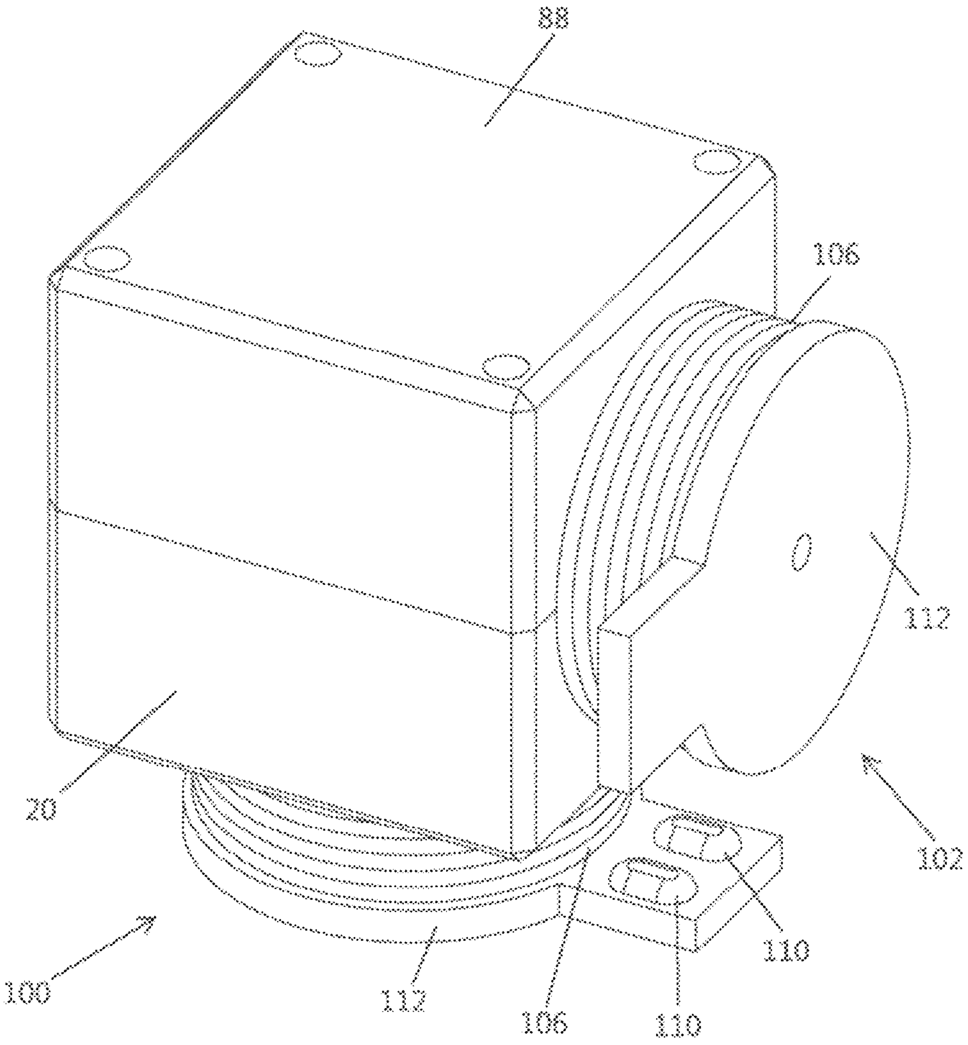
FIG. 20 is a partial sectional top perspective view of a motion generator embodiment of the present technology having two electromagnets positioned on an enclosed confinement.
Figure 21:
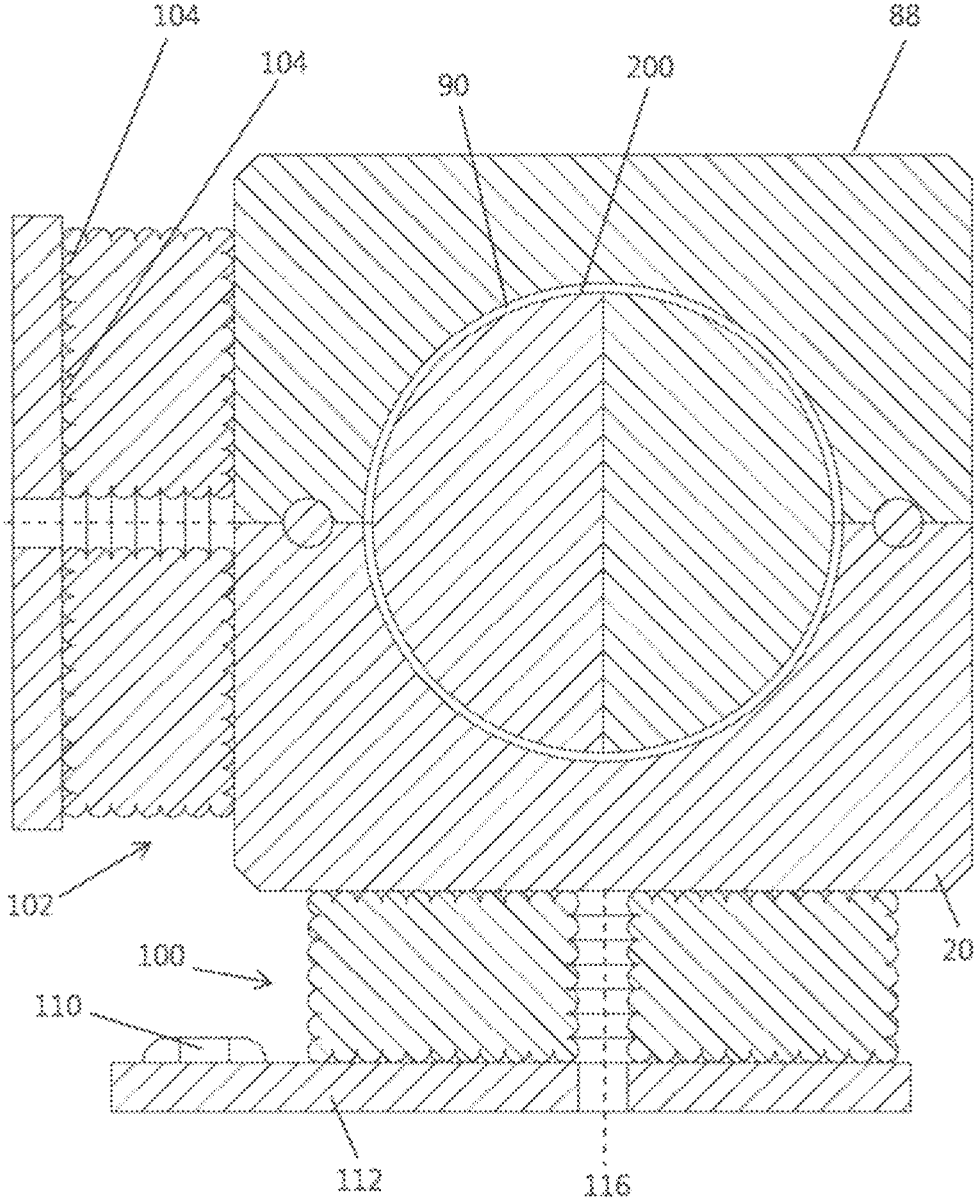
FIG. 21 is a partial sectional view of a motion generator of the present technology of the type shown in FIG. 20.
Figure 22:
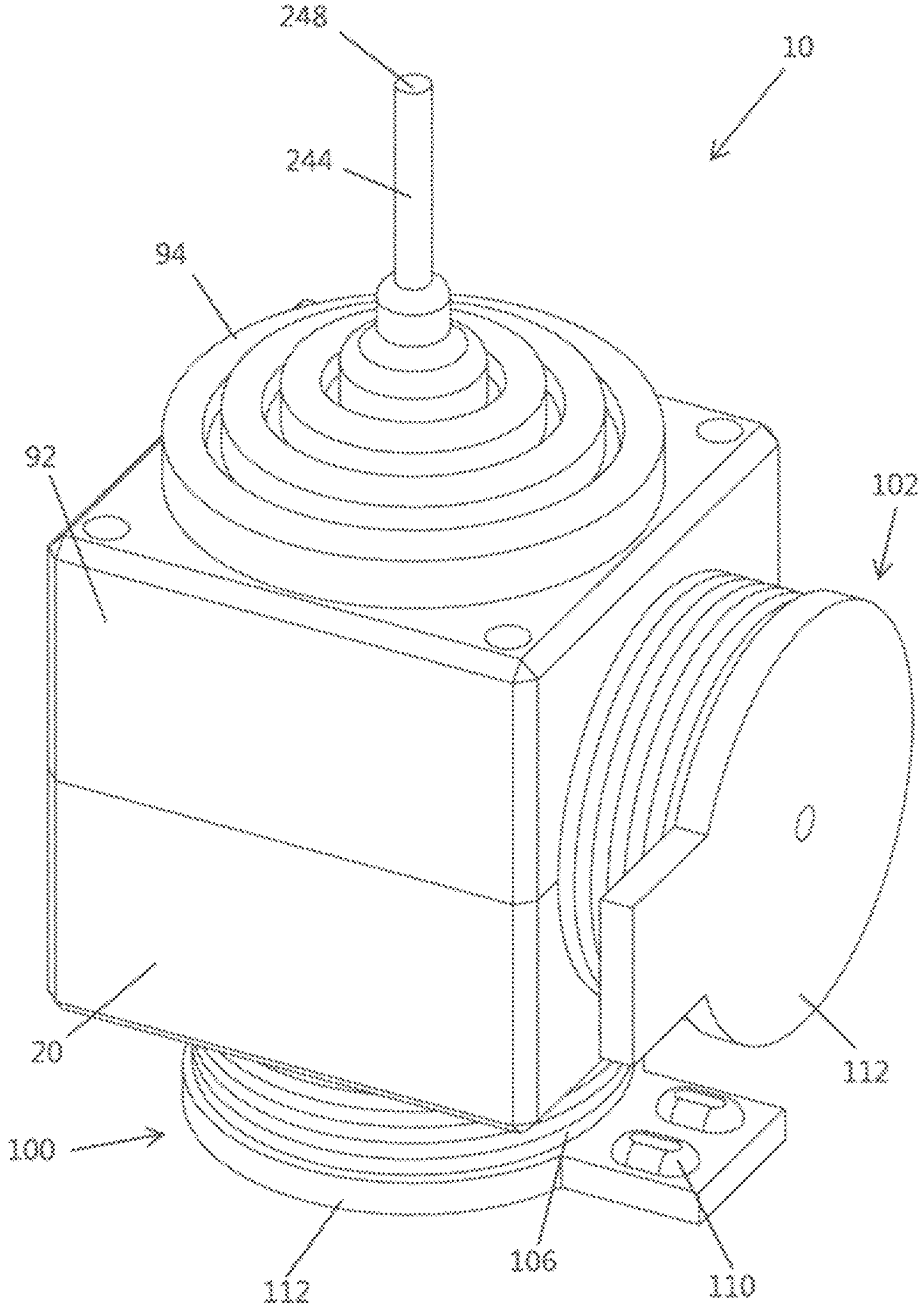
FIG. 22 is a top perspective view of a motion generator embodiment of the present technology having two electromagnets positioned on an enclosed confinement and having a bellow forming a top portion thereof.
Figure 23:
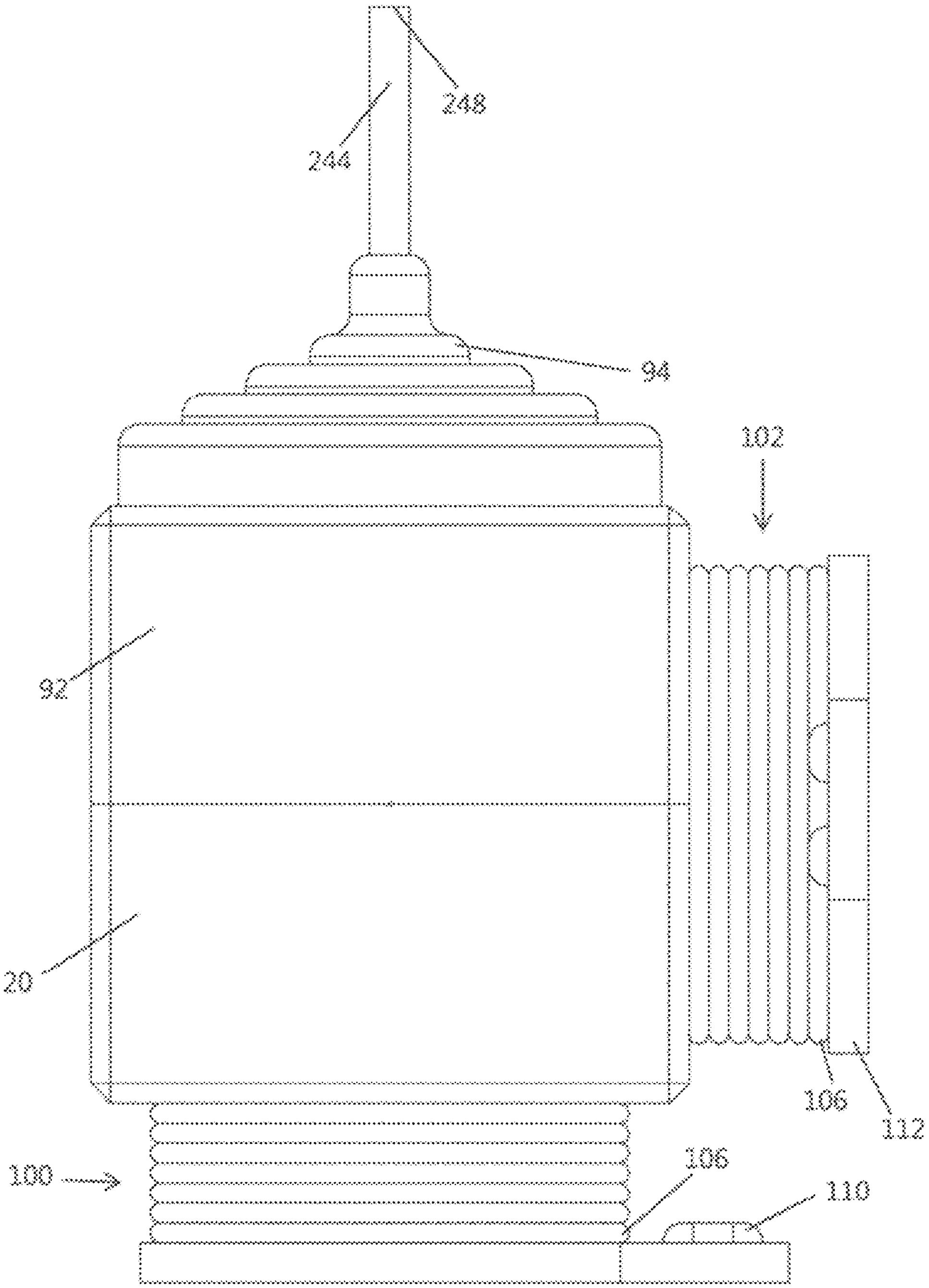
FIG. 23 is a side view of a motion generator of the invention of the type shown in FIG. 22.

Referring next to FIGS. 20 and 21, a motion generator 10 is illustrated that confines a magnetic spherical object 200 within a boundary defined by a container, base or housing 20. In this embodiment, the container 20 includes a top 88 that is fixed to the base of the container 20. Both the base and top include concave interiors. When the top 88 is fixed to the base 20 an interior cavity 90 is formed that captures and contains the object 200 within the cavity 90. The cavity 90 is preferably spherical and the diameter of the cavity is sized slightly larger than the object 200 to allow the object 200 to freely move within the cavity 90, bound only by the wall of cavity 90.

This embodiment of the motion generator 10 includes a first electromagnetic coil 100 mounted to the bottom exterior 28 of the container 20 and a second electromagnetic coil 102 mounted to a side of the container. Each coil includes several windings 104 of a continuous wire 106. The ends of the coiled windings 104 are coupled to electrical contact or conductor pads 110. A low voltage power supply may be electrically coupled to the pads to thereby cause a flow of electrons through the coil windings 104. When electrons flow through the coil a magnetic field is established associated with the coil. The magnetic moments of the two coils 100 and 102 are aligned orthogonal to each other. FIG. 21 illustrates multiple magnets that together form a spherical object 200. Of course, the object 200 may instead have a spherical shape and made from a permanent magnet.

The shape of the object 200 together with the slightly larger spherical cavity 90 and gravitational forces cause the object 200 to come to rest at the bottom of the base when no magnetic fields from the coils 100 and 102 are present, or when the magnetic field or fields are of insufficient strength to urge object 200 into motion. When electricity passes through the first and second coils 100 and 102, a magnetic field results that interacts with the magnetic moment of the object 200 causing the object to move within the cavity 90 responsive to the applied magnetic fields. The magnetic moments of the two electromagnetic coils 100 interacts with the magnetic moment of the object 200 causing the object to move, possibly including by spinning and rotating within the enclosure, in an ever-changing rotational pattern. The randomness of motion of object 200 may be altered by intermittently activating one or both coils 100 and 102 either simultaneously or sequentially. Depending upon the direction of the current through the electromagnetic coils and the orientation of the magnetic moment of the object, the object 200 may be attracted toward or pushed away from the bottom or side of the spherical cavity 90. As the object rotates and spins within the spherical cavity the orientation of the magnetic moment of the object is ever changing, which further contributes to the randomized motion of the object 200. Also, the motion is further compounded by the gravitational forces acting upon the object as it moves about within the cavity 90.

Referring next to FIGS. 22-25 a motion generator 10 is illustrated that confines a magnetic object 240 within a boundary defined by a container, base or housing 20. The object 240 may be non-spherical having a first portion 242 and a rod 244 extending outward from the first portion 242. In this embodiment, the container 20 includes an open top 92 that is fixed to the base of the container. A bellow 94 is fixed to the open top to thereby enclose an interior of the container. Rod 244 extends through a center portion of the bellow 94, wherein the elasticity of the bellow tends to urge the rod 244 toward a center orientation. When the top 92 is fixed to the base 20, an interior cavity is formed that captures and contains the object 240. The interior of the base has a concave shape that is dimensioned slightly larger than the spherical portion of the object 240. The interior of the top 92 is chamfered or angled 96 to thereby define a maximum range that the rod may be displaced from the center of the bellow 94.

Figure 24:
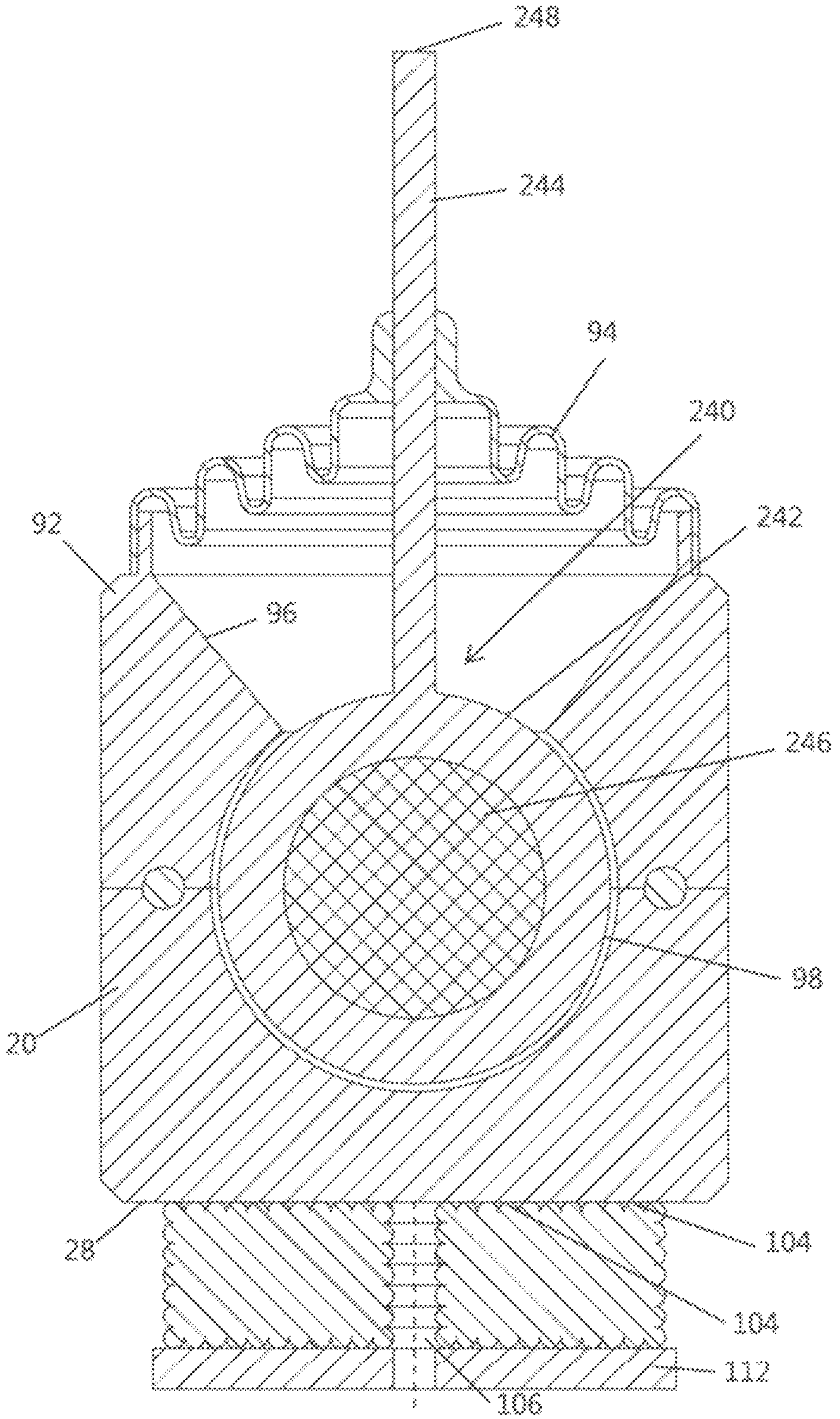
FIG. 24 is a partial section right side view of a motion generator of the present technology of the type shown in FIG. 22.
Figure 25:
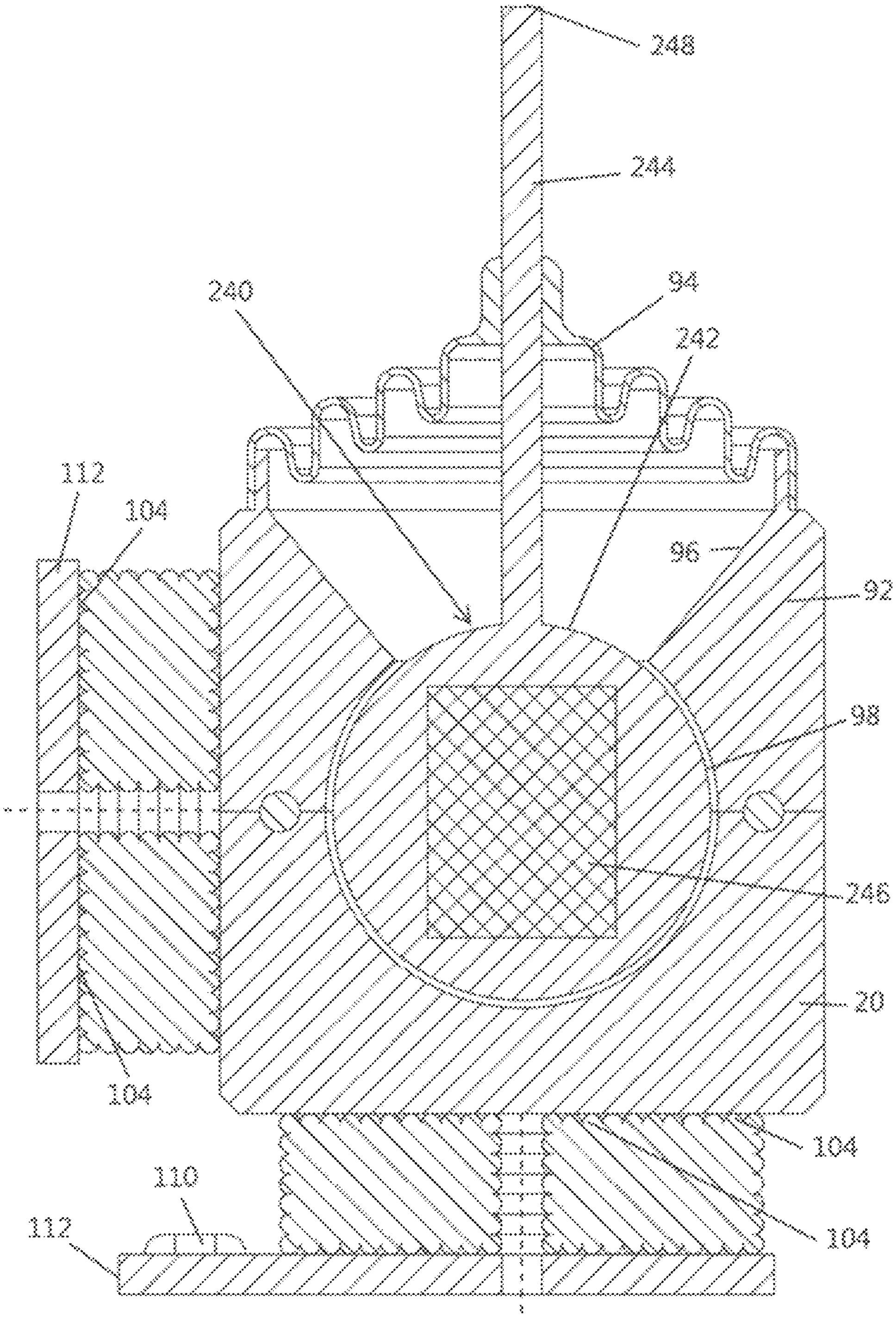
FIG. 25 is a partial sectional back view of a motion generator of the present technology of the type shown in FIG. 22.
Figure 26:
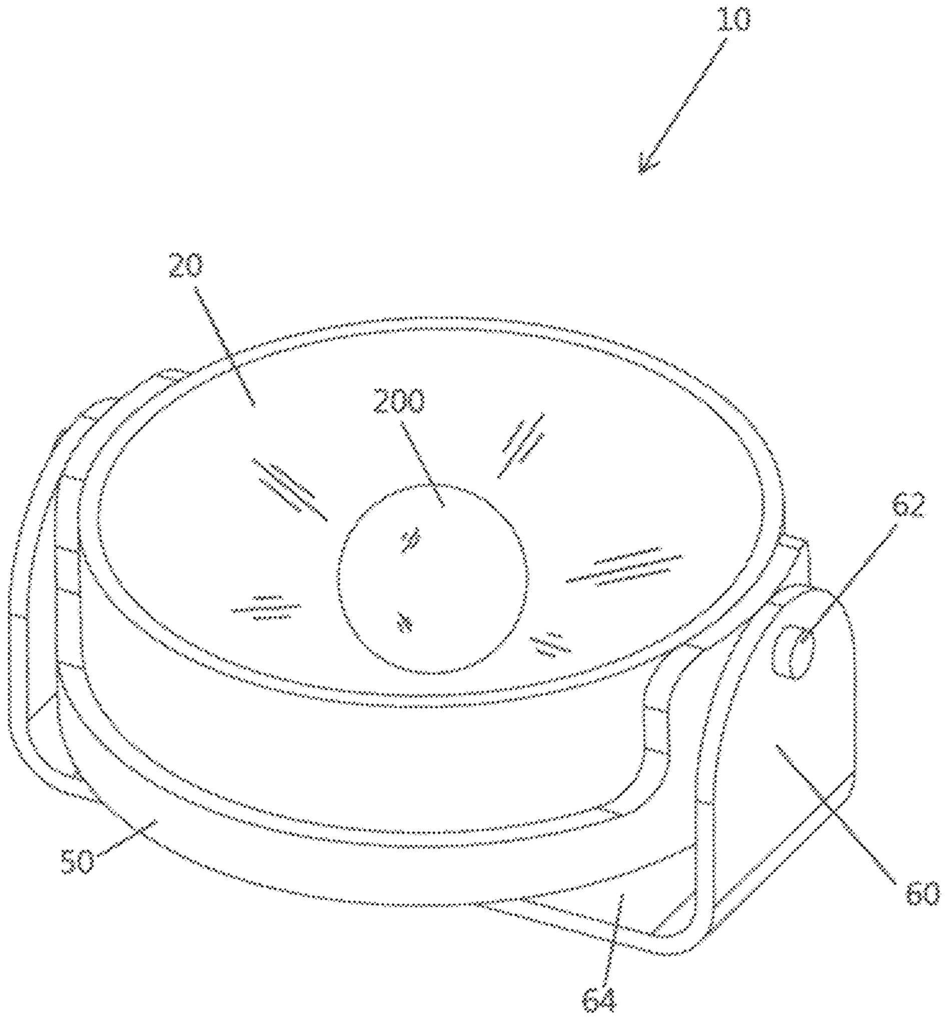
FIG. 26 is a top perspective view of a motion generator embodiment of the present technology shown with single axis gimbaled confinement.

This embodiment of the motion generator 10 includes a first electromagnetic coil 100 mounted to the bottom exterior 28 of the container 20 and a second electromagnetic coil 102 mounted to a side of the container. Each coil includes several windings 104 of a continuous wire 106. The ends of the coiled windings 104 are coupled to electrical contact or conductor pads 110. A low voltage power supply may be electrically coupled to the pads to thereby cause a flow of electrons through the coil windings 104. When electrons flow through the coil a magnetic field is established associated with the coil. The polar axes or magnetic moments of the two coils 100 and 102 are aligned orthogonal to each other. FIGS. 24 and 25 illustrate magnets 246 that are embedded in an encasement 242. Of course, the object may instead have a spherical shape and made from a permanent magnet. Rod 244 extending from portion 242 may itself be magnetic, may be made from magnetically reactive material or may be made from other non-magnetic materials. The free end 248 of rod 244 may be coupled to an article to create movement in the article or may be otherwise paired with the article such that, from time to time, the rod bumps or displaces the paired article. Those skilled in the art will appreciate other uses for the displaceable rod 244.

The bellow 94 causes the body 242 to come to rest at the bottom of the base such that the rod 244 is oriented vertically upward from the center of the bellow when no magnetic field from the coils 100 and 102 are present. When electricity passes through the first and second coils 100 and 102 a magnetic field results that interacts with the magnetic moment of the object 200 causing the object to spin and rotate within the cavity 98 responsive to the applied magnetic fields. The magnetic moments of the two electromagnetic coils 100 and 102 interacts with the magnetic moment of the object or object 240 causing the object to spin and rotate within the enclosure. The movement of body 240 may be altered by intermittently activating one or both coils 100 and 102 either simultaneously or sequentially. Depending upon the direction of the current through the electromagnetic coils and the orientation of the magnetic moment of the object, the object may be attracted towards or pushed away from the bottom or side of the spherical bottom portion of the cavity. As the object rolls and spins within the cavity the orientation of the magnetic moment of the object is ever changing which further contributes to the motion of the rod 244. Also, the motion is further compounded by the gravitational forces acting upon the object as it moves about within the oversized spherical cavity 98. However, the elastic force of the bellow dominates the orienting of the sphere 242 and rod 244 within the container 20.

Referring next to FIGS. 26-29 a motion generator 10 is illustrated that confines a magnetically reactive object 200 within a boundary defined by a container, base or housing 20. In this embodiment, the container 20 is shown supported by a container mounting base 50 and rotationally attached at joint 62 to a gimbal 60 defining a first axis. The joint 62 allows for the container to rotate about the first axis. The container 20 includes an exterior sidewall 24 that extends between a lower or bottom portion 28 and an upper top ledge 26 of the container. An interior surface 34 extends between the upper top ledge 26 and a nonplanar and curved bottom portion 30. Surface 34 may be chamfered or otherwise curved between the upper top ledge 26 and the bottom portion 30. Further, the bottom portion 30 may curve upward from the center region 40. Alternatively, the bottom portion 30 may include an upward extending bump 42 that prevents a magnetic axis of object 200 from aligning with a polar axis 116 of coil 100. Such misalignment ensures that object 200 will move from a rest position/orientation when coil 100 is energized.

Figure 27:
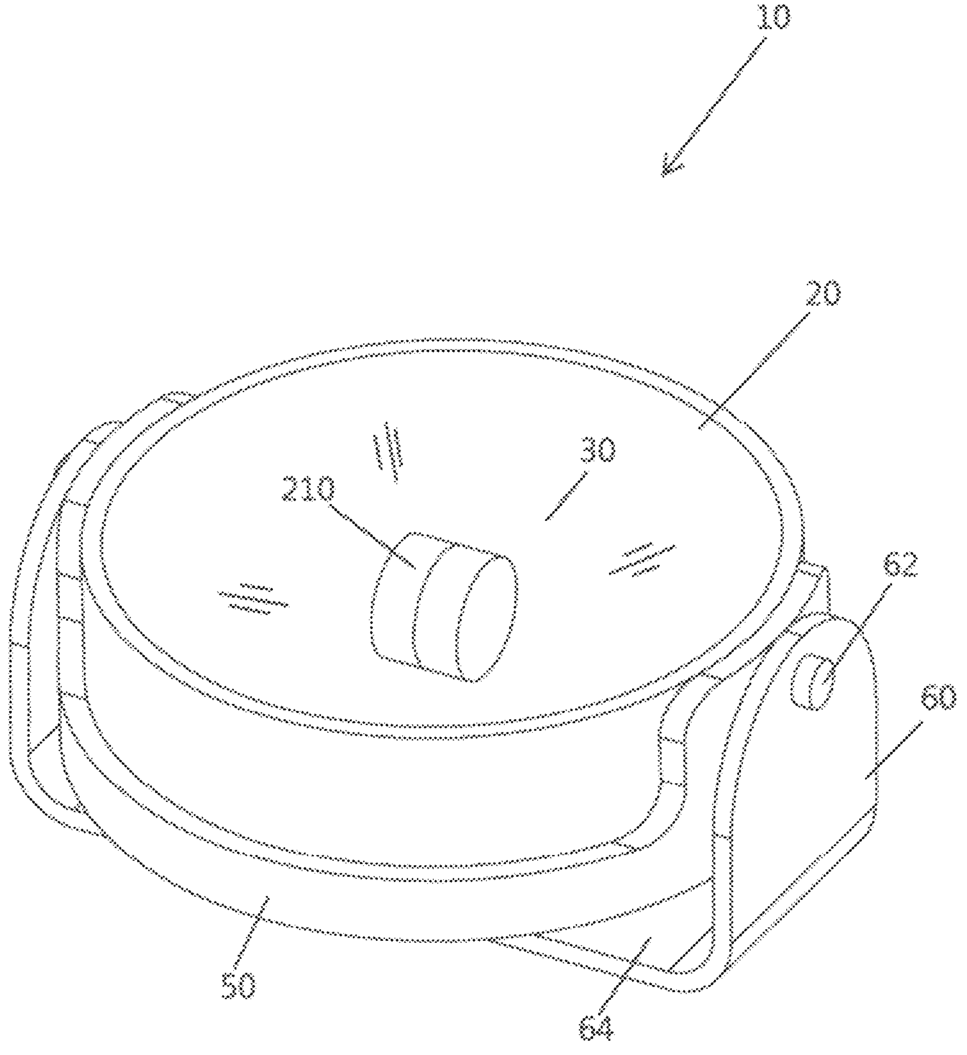
FIG. 27 is a partial sectional perspective view of a motion generator of the present technology of the type shown in FIG. 26.
Figure 28:
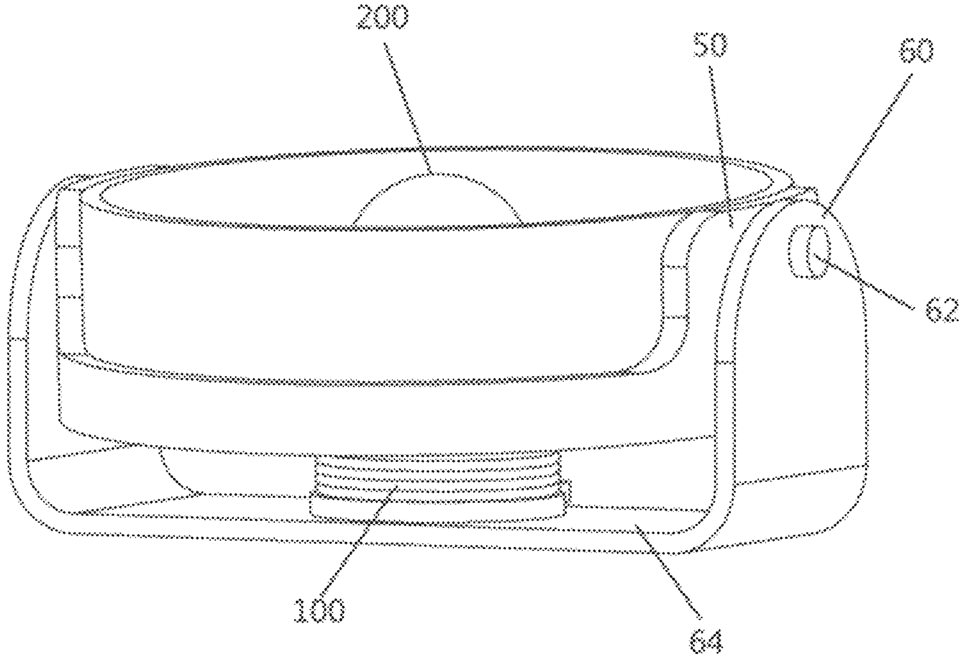
FIG. 28 is a side perspective view of a motion generator of the present technology of the type shown in FIG. 26.
Figure 29:
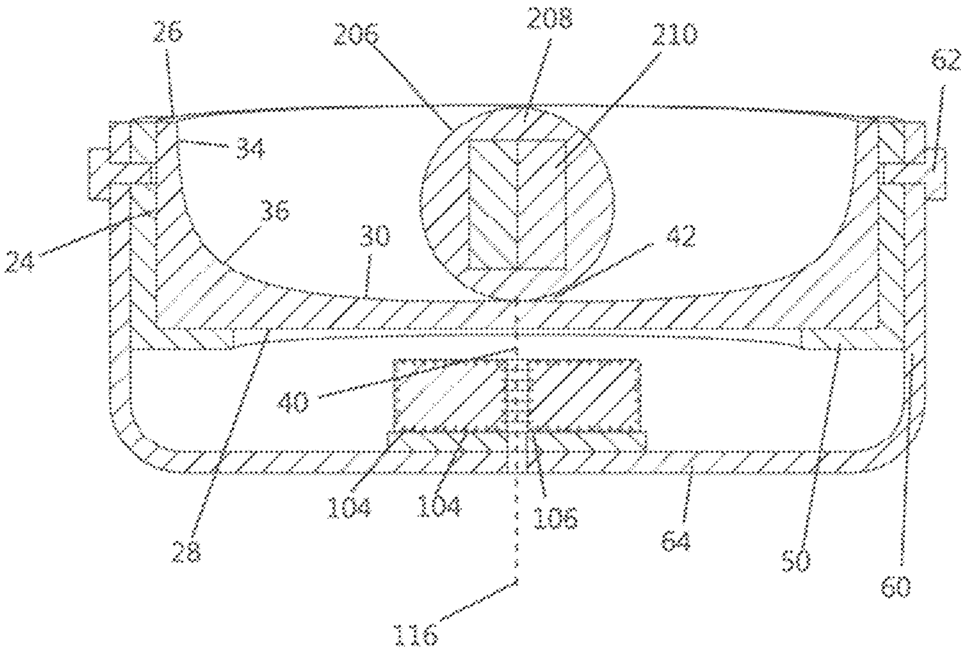
FIG. 29 is a partial sectional side view of a motion generator of the present technology of the type shown in FIG. 26.

This embodiment of the motion generator 10 includes a single electromagnetic coil 100 fixed to the base 64 of the first gimbal 60. The coil includes several windings 104 of a continuous wire 106. The ends of the coiled windings 104 are coupled to electrical contact or conductor pads 110. A low voltage power supply may be electrically coupled to the pads to thereby cause a flow of electrons through the coil windings 104. When electrons flow through the coil 100, a magnetic field is established. A central core of the windings may be hollow or filled with air. The center of the base mount 50 may be removed to reduce the amount of material separating the magnetic field and the object 200. The object 200 may have a spherical outer surface 206. FIGS. 27 and 29 illustrate a disc magnet 210 that is embedded in an encasement 208 having a spherical outer surface 206. Alternatively, the object may have a spherical or non-spherical shape and made from a permanent magnetic material or may be made from a material having magnetically responsive properties (see FIG. 26).

The shape of the object together with the nonplanar, curved bottom 30 of the container 20 and gravitational forces cause the object to come to rest at a rest position/orientation, which may be in the middle or center 40 of the container 20 when no magnetic field from the coil 100 is present. The rest position/orientation, however, may instead be non-centered. When electricity passes through the coil windings 104 a magnetic field results that acts upon the magnetically reactive object 200 and displaces the object from the rest position 40 of the container. The non-planar inner surface 34 at the bottom portion 30 of the container 20 causes the object 200 to move along surface 34 responsive to the applied magnetic field in an ever-changing pattern of motion. As the object 200 is displaced along surface 34, the mass of the object 200 causes the container 20 to pivot about joint 62. When the object 200 includes a magnetic field of its own, the magnetic moment of the object 200 and the magnetic moment of an active electromagnetic coil 100 interact, further causing the object 200 to move along surface 34 of the container 20, preferably in non-linear, randomized directions. Depending upon the direction of the current through the electromagnetic coil 100 and the orientation of the magnetic moment of the object 200, the object may be attracted toward or pushed away from the polar axis 116 of the coil. As the object 200 moves, the orientation of the magnetic moment of the object 200 is ever-changing, which further contributes to the motion of an ever-changing pattern. Also, the motion is further compounded by the gravitational forces acting upon the object 200 as it moves about on the curved surface 34 of the container 20.

Figure 30:
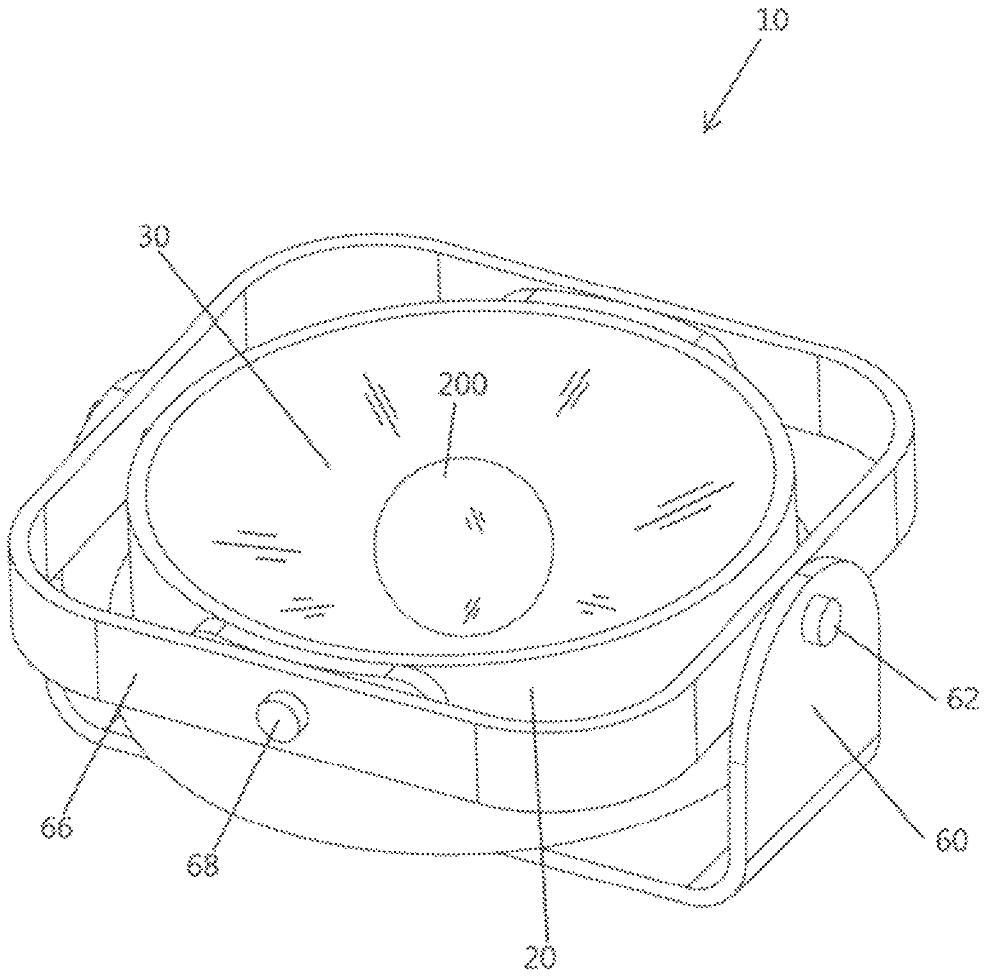
FIG. 30 is a top perspective view of a motion generator embodiment of the present technology shown with multi axis gimbaled confinement.
Figure 31:
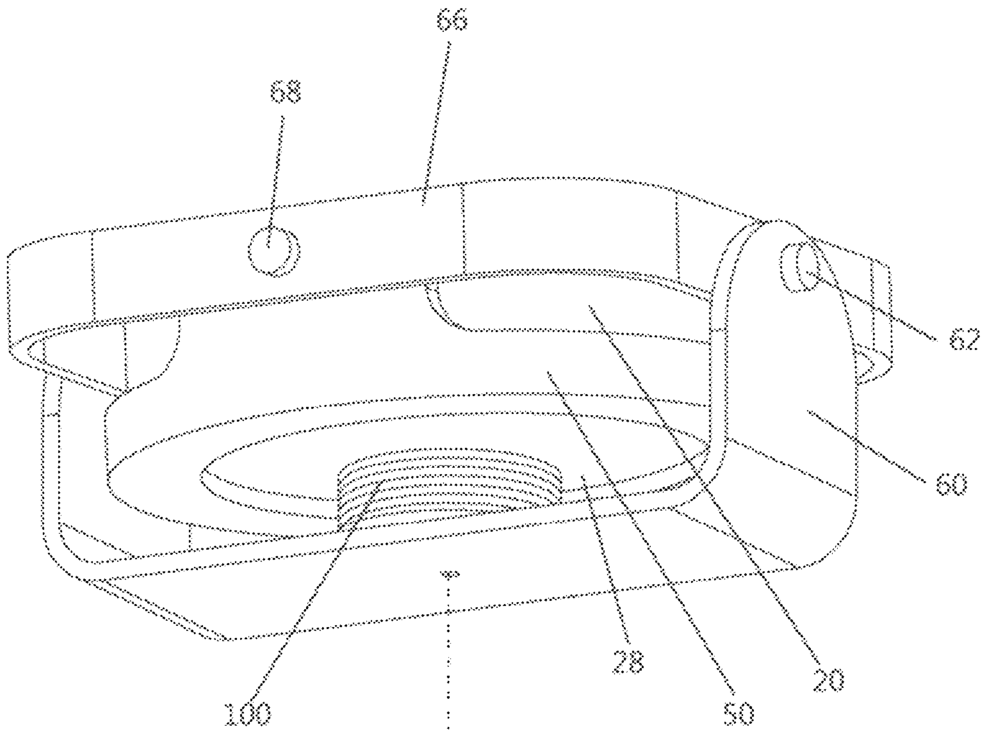
FIG. 31 is a bottom perspective view of a motion generator of the present technology of the type shown in FIG. 30.
Figure 32:
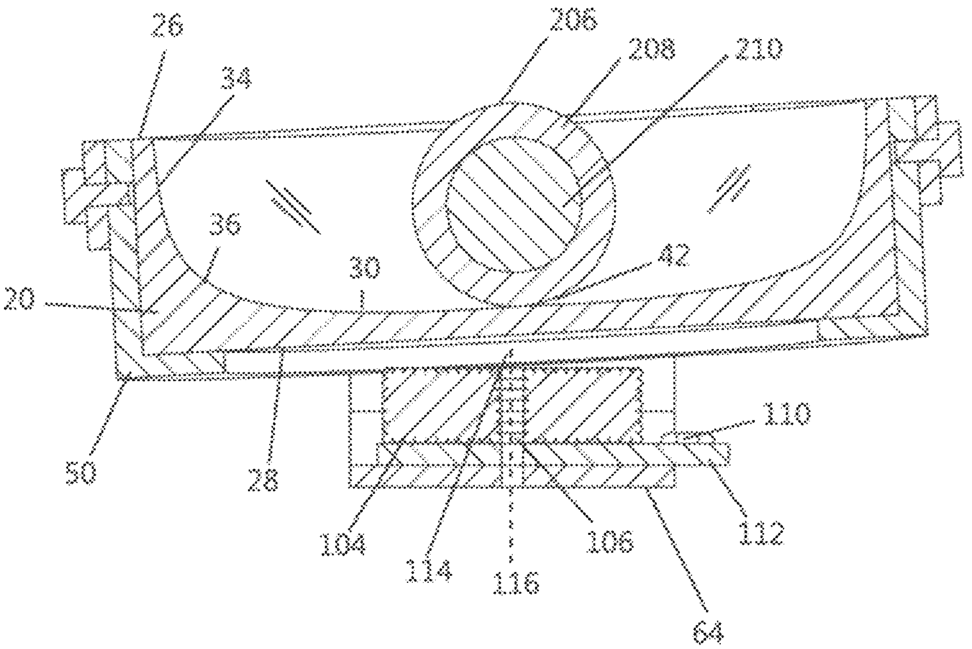
FIG. 32 is a partial sectional side view of a motion generator of the present technology of the type shown in FIG. 30.

Referring next to FIGS. 30-32 a motion generator 10 is illustrated that confines a magnetically reactive object 200 within a boundary defined by a container, base or housing 20. In this embodiment, the container 20 is shown supported by a container mounting base 50 and rotationally attached at joint 62 to a first gimbal 60 defining a first axis. The joint 62 allows for the container 20 to rotate about the first axis. The first gimbal 60 is rotationally attached to a second gimbal 66 at joint 68 to allow rotation about a second orthogonal axis defined by joint 68. In other embodiments, one or more pivot axes may be defined by structures other than a gimbal. The container and gimbals are further supported by base 64. The container 20 includes an exterior sidewall 24 that extends between a lower or bottom portion 28 and an upper top ledge 26 of the container. An interior surface 34 extends between the upper top ledge 26 and nonplanar and curved bottom portion 30. Surface 34 may be chamfered or otherwise curved between the upper top ledge 26 and the bottom portion 30. Further, the bottom portion 30 may curve upward from the center region 40. Alternatively, the non-planar bottom portion 30 may include an upwardly extending bump 42 that prevents a magnetic axis of object 200 from aligning with a polar axis 116 of coil 100. Such misalignment ensures that object 200 will move from the rest position/orientation when coil 100 is energized.

This embodiment of the motion generator 10 includes a single electromagnetic coil 100 fixed to the base 64 of the first gimbal 60. The coil 100 includes several windings 104 of a continuous wire 106. The ends of the coiled windings 104 are coupled to electrical contact or conductor pads 110. A low voltage power supply may be electrically coupled to the pads to thereby cause a flow of electrons through the coil windings 104. When electrons flow through the coil 100, a magnetic field is established. A central core of the windings may be hollow or filled with air. The center of the base mount 50 may be removed to reduce the amount of material separating the magnetic field and the object 200. The object 200 has a spherical outer surface 206. FIG. 32 illustrates a disc magnet 210 that is embedded in an encasement 208 having a spherical outer surface 206. Alternatively, the object may have a non-spherical or spherical shape and made from a permanent magnetic material or may be made from a material having magnetically responsive properties (see FIG. 30).

The shape of the object 200, together with the shape of the surface 34 of the container 20, the pivot joints 62, 68 of the container 20, and gravitational forces cause the object 200 to come to rest at a rest position/orientation, which may be in the middle or center 40 of the container 20 when no magnetic field from the coil 100 is present. The rest position/orientation, however, may instead be non-centered. When electricity passes through the coil windings 104 a magnetic field results that acts upon the magnetically responsive object 200 and displaces the object from the rest position of the container. The non-planar surface 34 of the container 20 facilitates randomized motion that is responsive to the applied magnetic field. As the object is displaced within the container, the mass of the object 200 causes the container 20 to rotate about one or more of pivot axes 62, 68. When the object 200 exerts a magnetic field of its own, the magnetic moment of the object 200 and the magnetic moment of an active electromagnetic coil 100 interact, further causing the object 200 to move along surface 34 of the container 20, preferably in non-linear, randomized directions. Depending upon the direction of the current through the electromagnetic coil and the orientation of the magnetic moment of the object, the object 200 may be attracted toward or pushed away from the polar axis 116 of the coil. As the object moves, the orientation of the magnetic moment of the object may be ever-changing which further contributes to the motion of an ever-changing pattern and displacement. Also, the motion is further compounded by the gravitational forces acting upon the object 200 as it moves along surface 34 of the container 20 and the container 20 pivots about the one or more pivot axes 62, 68.

Figure 33:
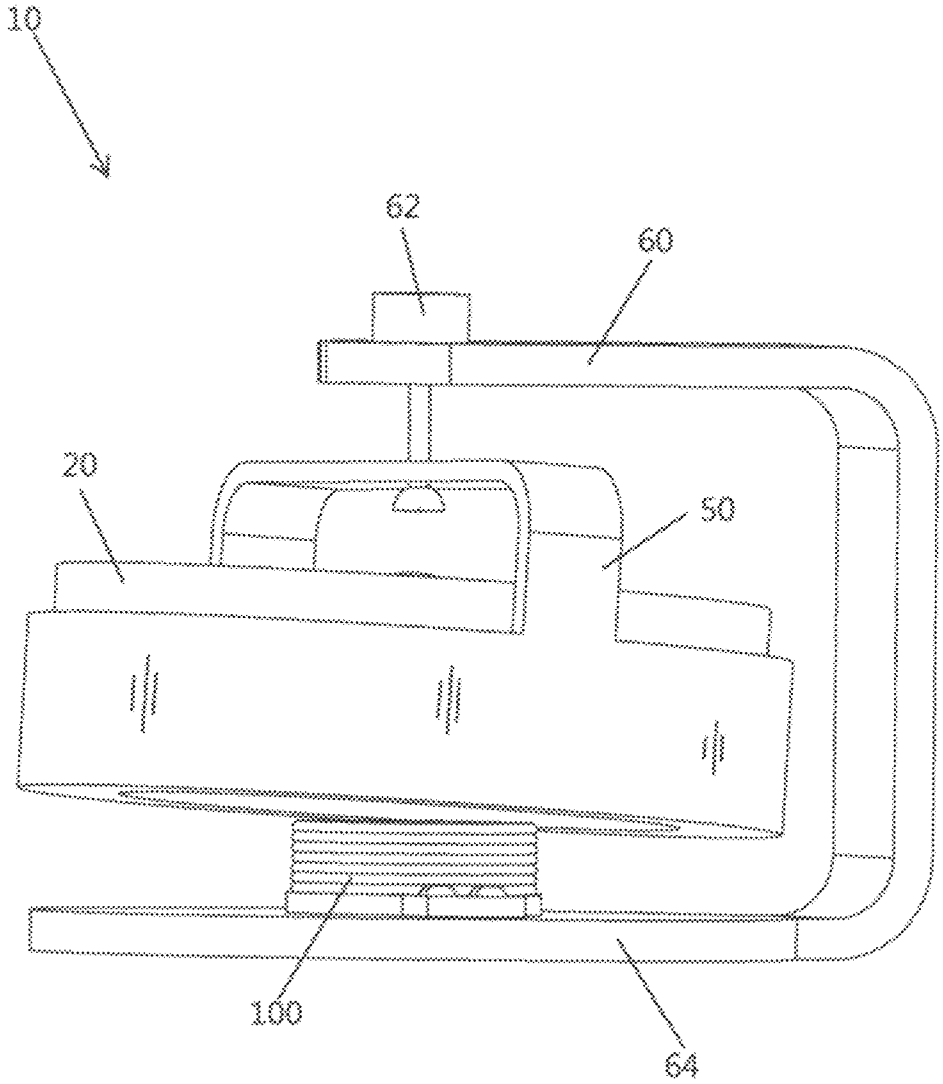
FIG. 33 is a top perspective view of a motion generator embodiment of the present technology shown with top gimbaled confinement.
Figure 34:
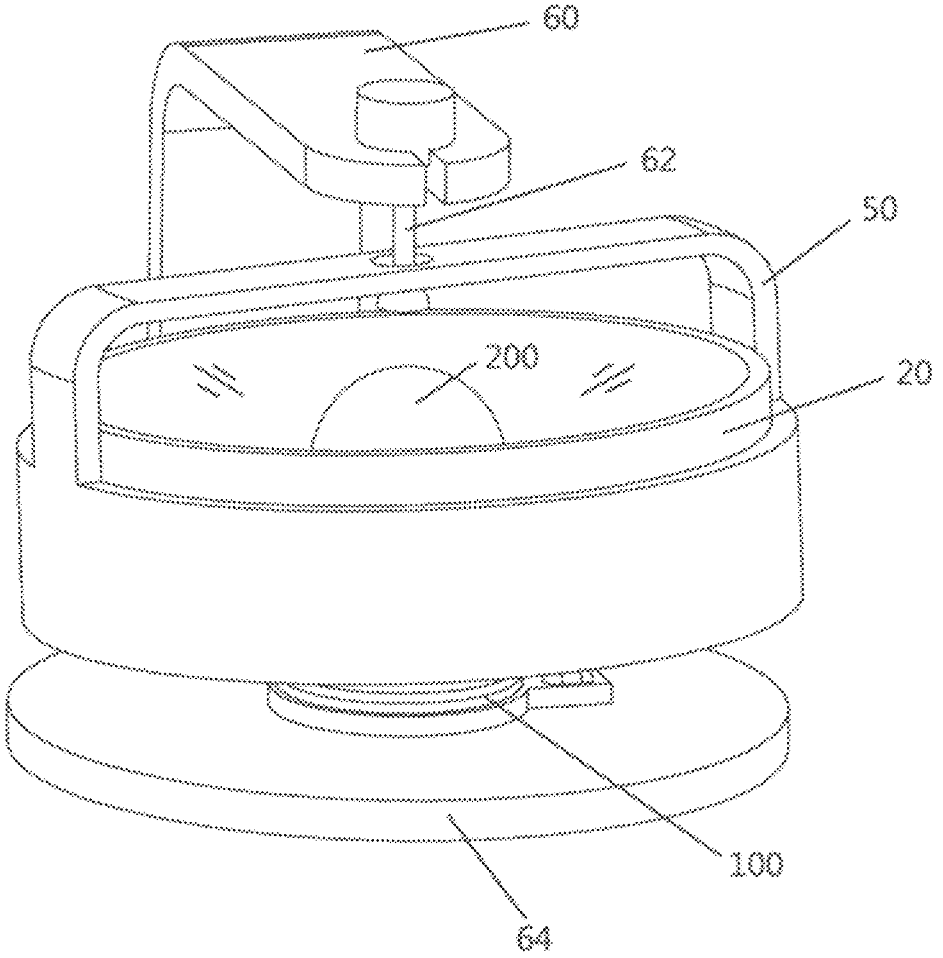
FIG. 34 is a side perspective view of a motion generator of the present technology of the type shown in FIG. 33.
Figure 35:
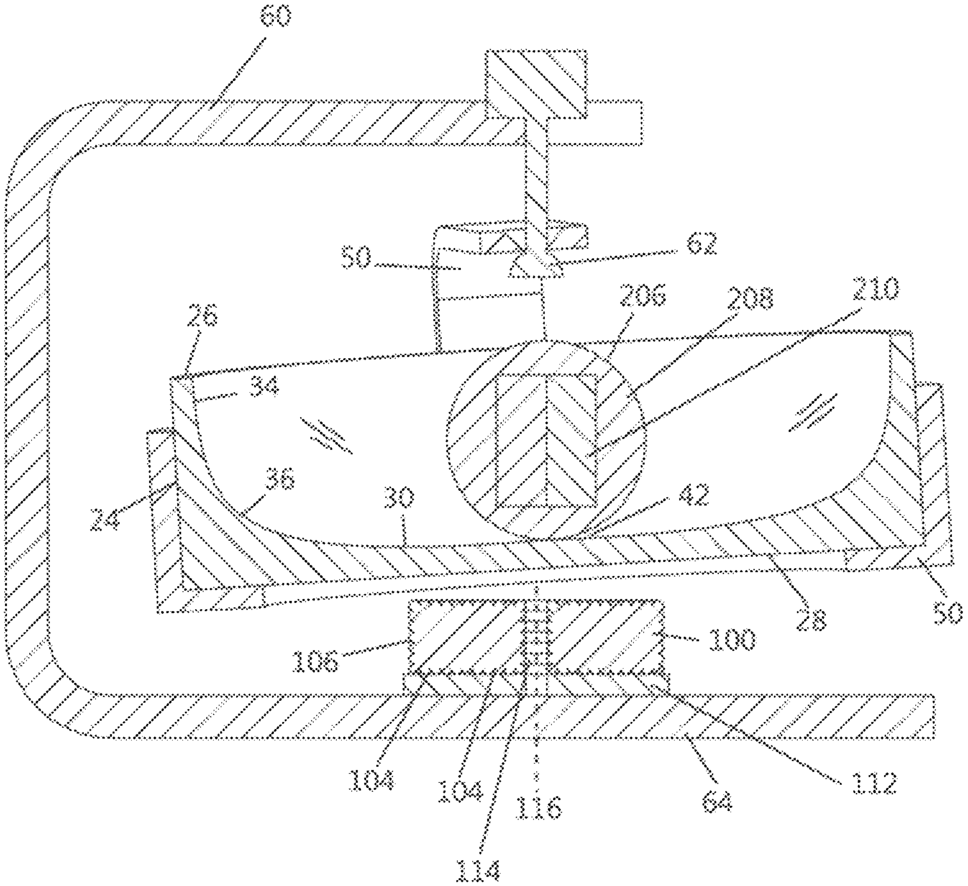
FIG. 35 is a partial sectional side view of a motion generator of the present technology of the type shown in FIG. 33.

Referring next to FIGS. 33-35, a motion generator 10 is illustrated that confines a magnetically reactive object 200 within a boundary defined by a container, base or housing 20. In this embodiment, the container 20 is shown suspended by a container mounting base 50 that is rotationally attached at joint 62 to a first gimbal 60. The gimbal is U-shaped and includes base 64 that provides stability to the gimbal 60. The joint 62 allows for the container to hang and rotate 360 degrees about a vertical axis defined by joint 62. The container 20 includes an exterior sidewall 24 that extends between a lower or bottom portion 28 and an upper top ledge 26 of the container. An interior surface 34 extends between the upper top ledge 26 and a bottom portion 30. Surface 34 may be chamfered or otherwise curved between the upper top ledge 26 and the bottom portion 40. Further, the bottom 30 may curve upward from the center of bottom portion 40. Alternatively, the bottom portion may include an upwardly extending bump 42 that inhibits a magnetic axis of object 200 from aligning with a polar axis 116 of coil 100. Such misalignment ensures that object 200 will move from the rest position/orientation when coil 100 is energized.

This embodiment of the motion generator 10 includes a single electromagnetic coil 100 fixed to the base 64 of the first gimbal 60. The coil includes several windings 104 of a continuous wire 106. The ends of the coiled windings 104 are coupled to electrical contact or conductor pads 110. A low voltage power supply may be electrically coupled to the pads to thereby cause a flow of electrons through the coil windings 104. When electrons flow through the coil a magnetic field is established. A central core 114 of the windings may be hollow or filled with air. The center of the base mount 50 may be removed to reduce the amount of material separating the magnetic field and the object 200. The object 200 may have a spherical outer surface 206. FIG. 35 illustrates a disc magnet 210 that is embedded in an encasement 208 having a spherical outer surface 206. Alternatively, the object may have a non-spherical or spherical shape and made from a permanent magnetic material or may be made from a material having magnetically responsive properties (see FIG. 34).

The shape of the object 200 together with the curved bottom portion 30 of the container 20 and gravitational forces acting on both the object 200 and the container 20 facilitate the object coming to rest at a rest position, which in some embodiments may be in the middle or center 40 of the bottom portion 30 when no magnetic field from the coil 100 is present. The rest position/orientation, however, may instead be non-centered. When electricity passes through the coil windings 104 a magnetic field results that acts upon the magnetically responsive object 200 and displaces the object from the rest position 40 of the container. The non-planar inner surface 34 of the container 20 facilitates randomized motion of the object 200 under an applied magnetic field. As the object is displaced within the container, the mass of the object causes the container to pivot about pivot axis 62. When the object 200 exerts a magnetic field of its own, the magnetic moment of the object and the magnetic moment of an active electromagnetic coil 100 interact, further causing the object to move along surface 34, preferably in non-linear, randomized directions. Depending upon the direction of the current through the electromagnetic coil 100 and the orientation of the magnetic moment of the object 200, the object may be attracted toward or pushed away from the polar axis 116 of the coil 100. As the object 200 moves, the orientation of the magnetic moment of the object 200 is ever-changing, which further contributes to the motion of an ever-changing pattern. Also, the motion is further compounded by the gravitational forces acting upon the object and container as the object moves along the surface 34 of the container 20.

Figure 36:
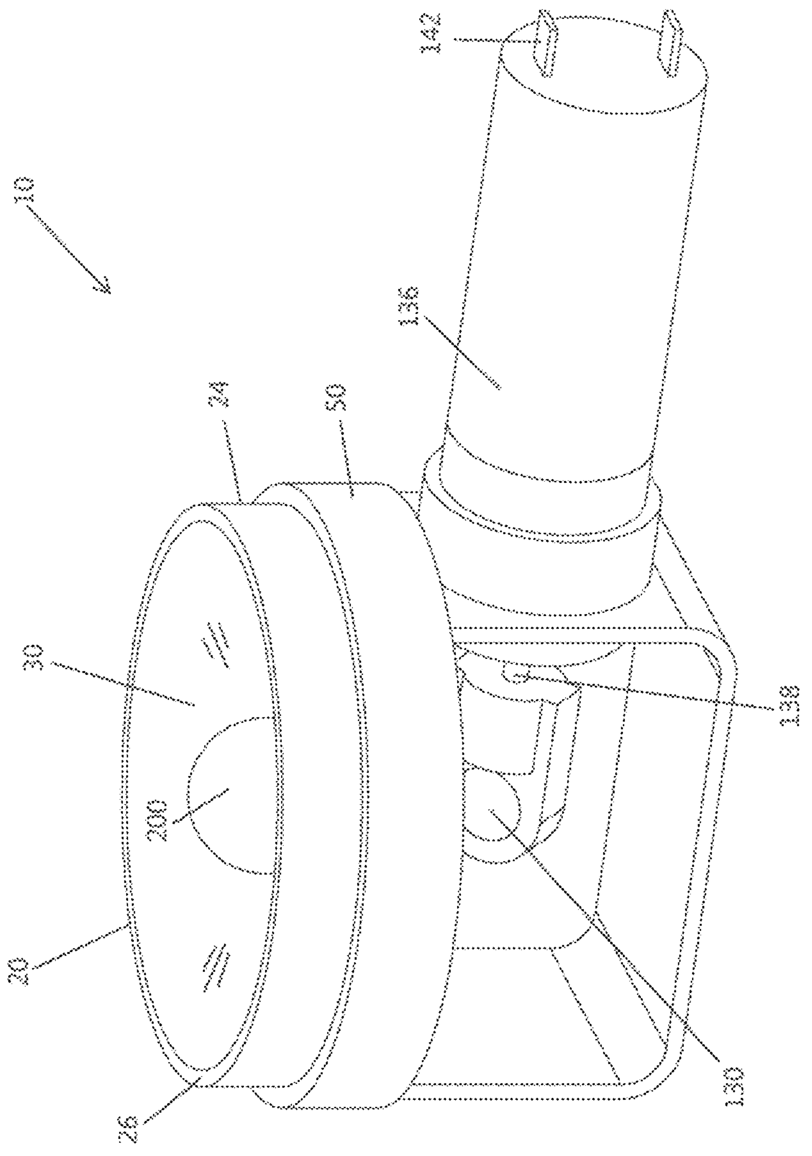
FIG. 36 is a front perspective view of a motion generator of the present technology showing a magnet movable by a motion generator.
Figure 37:
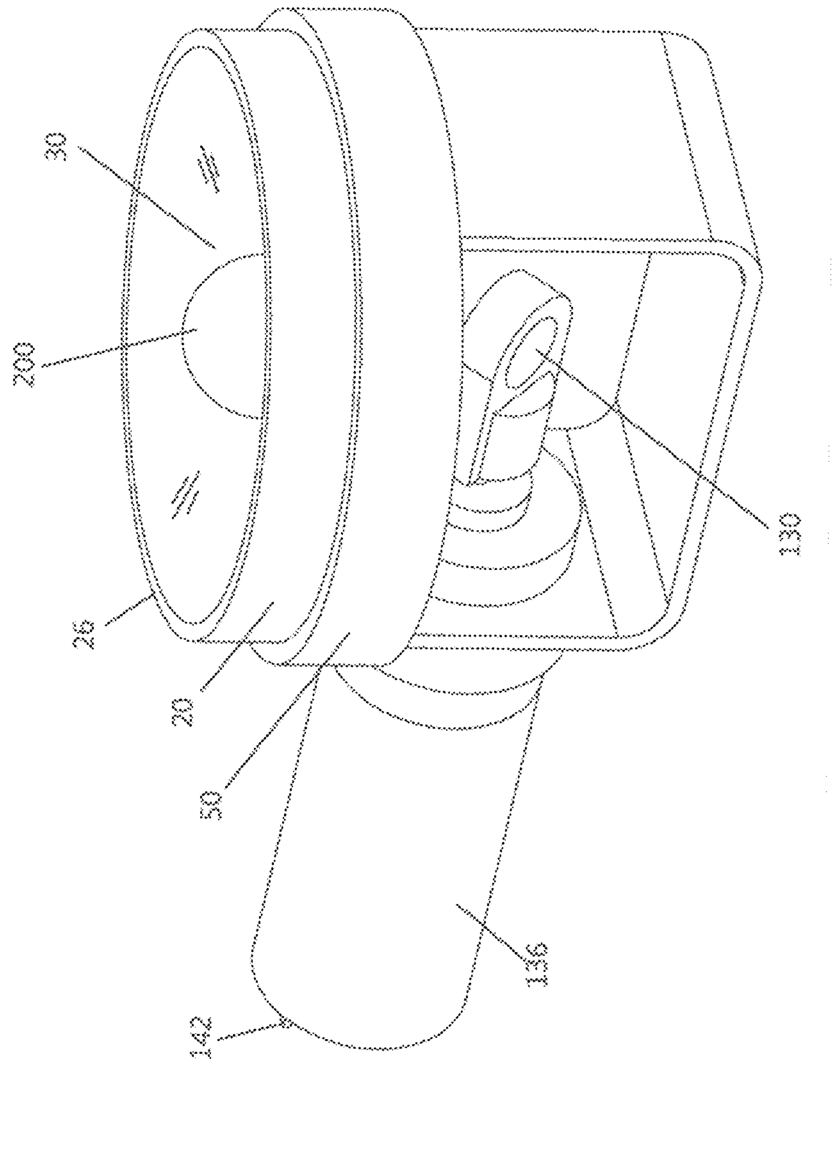
FIG. 37 is a back perspective view of a motion generator of the present technology of the type shown in FIG. 36.

Referring next to FIGS. 36-37 a motion generator 10 is illustrated that confines a magnetically reactive object 200 within a boundary defined by a container, base or housing 20. In this embodiment the container 20 is shown fixed to a container mounting base 50. The container 20 includes an exterior sidewall 24 that extends between a lower or bottom portion and an upper top ledge 26 of the container. An interior surface 34 extends between the upper top ledge 26 and a nonplanar and curved bottom portion 30.

This embodiment of the motion generator 10 includes a permanent magnet or electromagnet 130 mounted to the shaft 138 of rotary motor 136. When the motor 136 is activated the shaft spins or rotates causing the magnet 130 to rotate. The motor 136 includes electrical contacts 142 to couple to a low voltage power supply. As the magnet rotates the magnetic moment of the magnet is altered which then causes a displacement or movement of the object 200 along surface 34. The shape of the magnetically reactive object 200 together with the nonplanar, curved surface 34 of the container 20 and gravitational forces cause the object 200 to come to rest at a rest position of the surface 34 when the motor 136 stops spinning. When the motor is activated and begins to spin, the magnetic field from magnet 130 acts upon the magnetically responsive object 200 and urges the object 200 from the rest position. The displacement is due to a mis-alignment of the magnetic axis of the object 200 with respect to the polar axis 116 of magnet 130. The non-planar surface 34 of the container 20 facilitates randomized motion of object 20 under an applied magnetic field from the spinning magnet 130. When the object 200 exerts a magnetic field of its own, the magnetic moment of the object and the magnetic moment of the magnet 130 interact, further causing the object to move along surface 34 of the container, preferably in non-linear, randomized directions. As the object moves, the orientation of the magnetic moment of the object is ever-changing which further contributes to the motion in an ever-changing pattern. Also, the motion is further compounded by the gravitational forces acting upon the object as it moves about on the curved inner surface 34 of the container 20.

Figure 38:
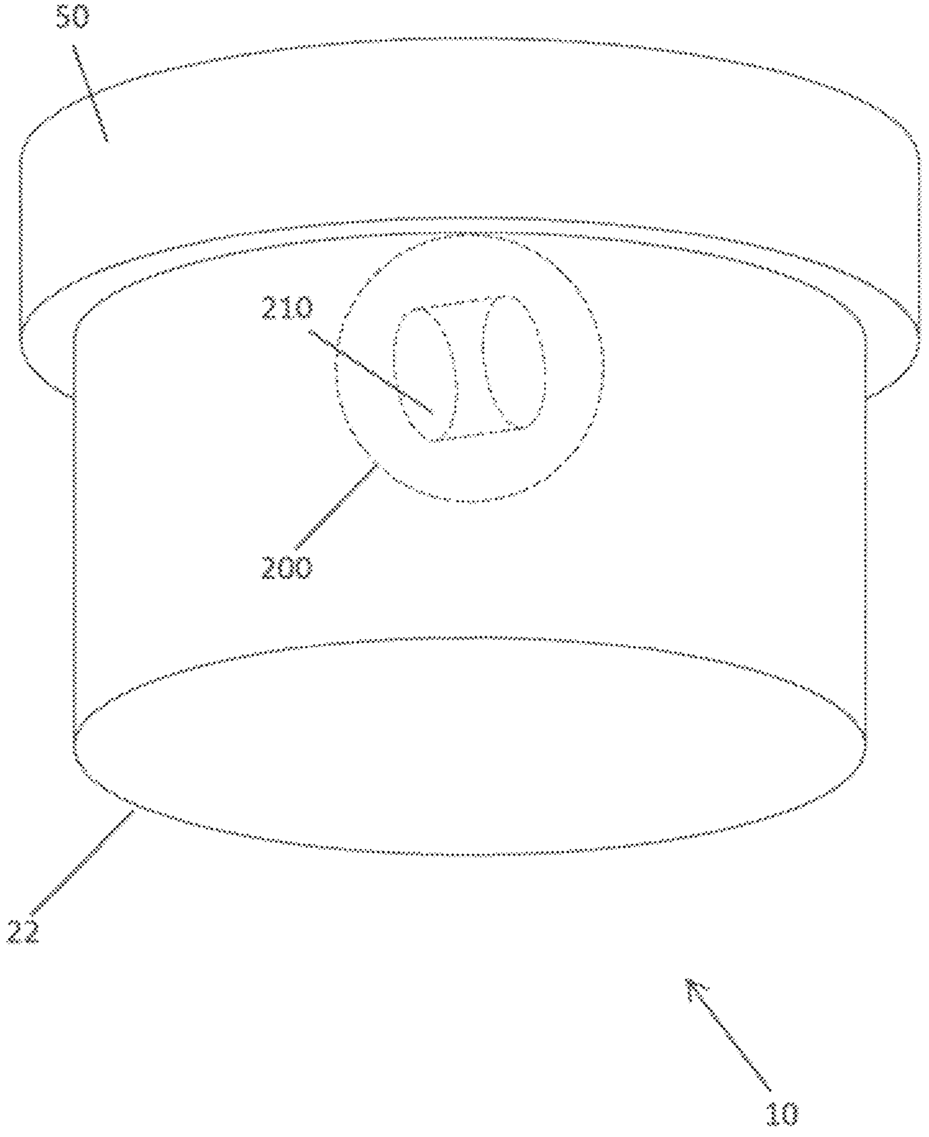
FIG. 38 is a bottom perspective view of a motion generator embodiment of the present technology shown with enclosed stationary confinement.
Figure 39:
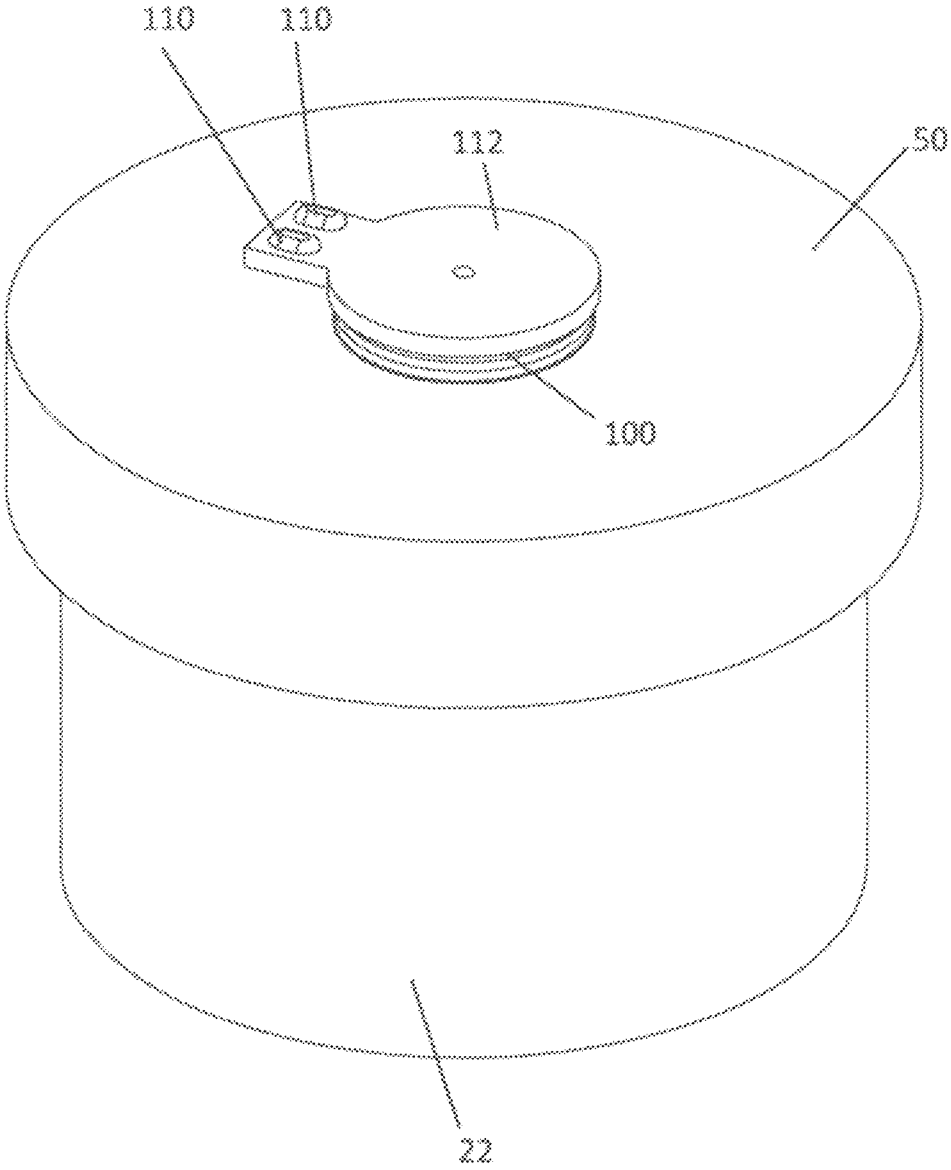
FIG. 39 is a top perspective view of a motion generator of the present technology of the type shown in FIG. 38.
Figure 40:
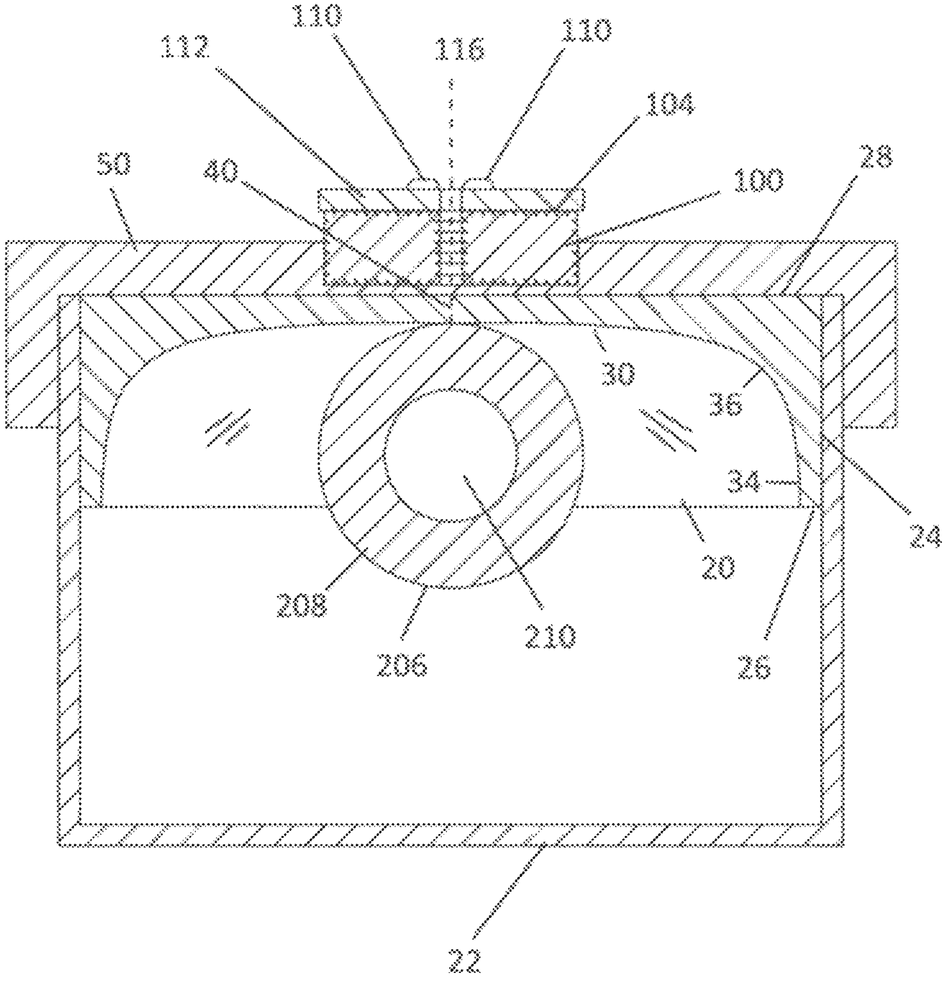
FIG. 40 is a partial sectional side view of a motion generator of the present technology of the type shown in FIG. 38.

Referring next to FIGS. 38-40 a motion generator 10 is illustrated that confines a magnetically reactive object 200 within a boundary defined by an enclosed container, base or housing 20. In this embodiment the container 20 is shown fixed to cover 50. Cover or top 50 is sealed to the container 20 and base 22. The container 20 includes an exterior sidewall 24 and an interior surface 34 that includes a nonplanar and curved portion 30. Surface 34 may be chamfered or otherwise curved between the sidewall and the top 50. A fluid is contained within and fills the interior of the container 20. The mass of the object 200 together with the viscosity, specific gravity, and coefficient of friction of the fluid are all selected so that the velocity of the object 200 displaced in the fluid is less than the velocity that the object would be in air. Although the displacement of the object travelling through fluid remains subject to an ever-changing pattern of motion, the velocity of the object is reduced.

This embodiment of the motion generator 10 includes a single electromagnetic coil 100. The coil includes several windings 104 of a continuous wire 106. The ends of the coiled windings 104 are coupled to electrical contact or conductor pads 110. A low voltage power supply may be electrically coupled to the pads to thereby cause a flow of electrons through the coil windings 104. When electrons flow through the coil a magnetic field is established. A central core of the windings may be hollow or filled with air. The object 200 may have a spherical outer surface 206. FIGS. 38 and 40 illustrate a disc magnet 210 that is embedded in an encasement 208 having a spherical outer surface 206. Alternatively, the object may have a non-spherical or spherical shape and made from a permanent magnetic material or may be made from a material having magnetically responsive properties.

The shape of the object together with the nonplanar, curved top 30 of the container 20 and buoyancy forces cause the object to come to rest at a rest position/orientation, which may be in the middle or center 40 of the container 20 when no magnetic field from the coil 100 is present. In this embodiment, object 200 may be encased in a fluid with a specific gravity that is greater than the specific gravity of object 200. As a result, the rest position is gravitationally up against top 30. The rest position/orientation, however, may instead be non-centered. When electricity passes through the coil windings 104 a magnetic field results that acts upon the magnetically reactive object 200 and displaces the object from the rest position 40 of the container. The non-planar inner surface 30 of the top of the container causes the object to randomly move within the container responsive to the applied magnetic field. When the object 200 includes a magnetic field of its own, the magnetic moment of the object and the magnetic moment of an active electromagnetic coil 100 interact further causing the object to move within the container in non-linear randomized directions, limited by surface 30. Depending upon the direction of the current through the electromagnetic coil and the orientation of the magnetic moment of the object, the object may be attracted towards or pushed away from the polar axis 116 of the coil. As the object moves, the orientation of the magnetic moment of the object is ever changing which further contributes to the motion of an ever-changing pattern. As noted above, the fluid slows the motion of the object but does not reduce the randomness of the motion.

Figure 41:
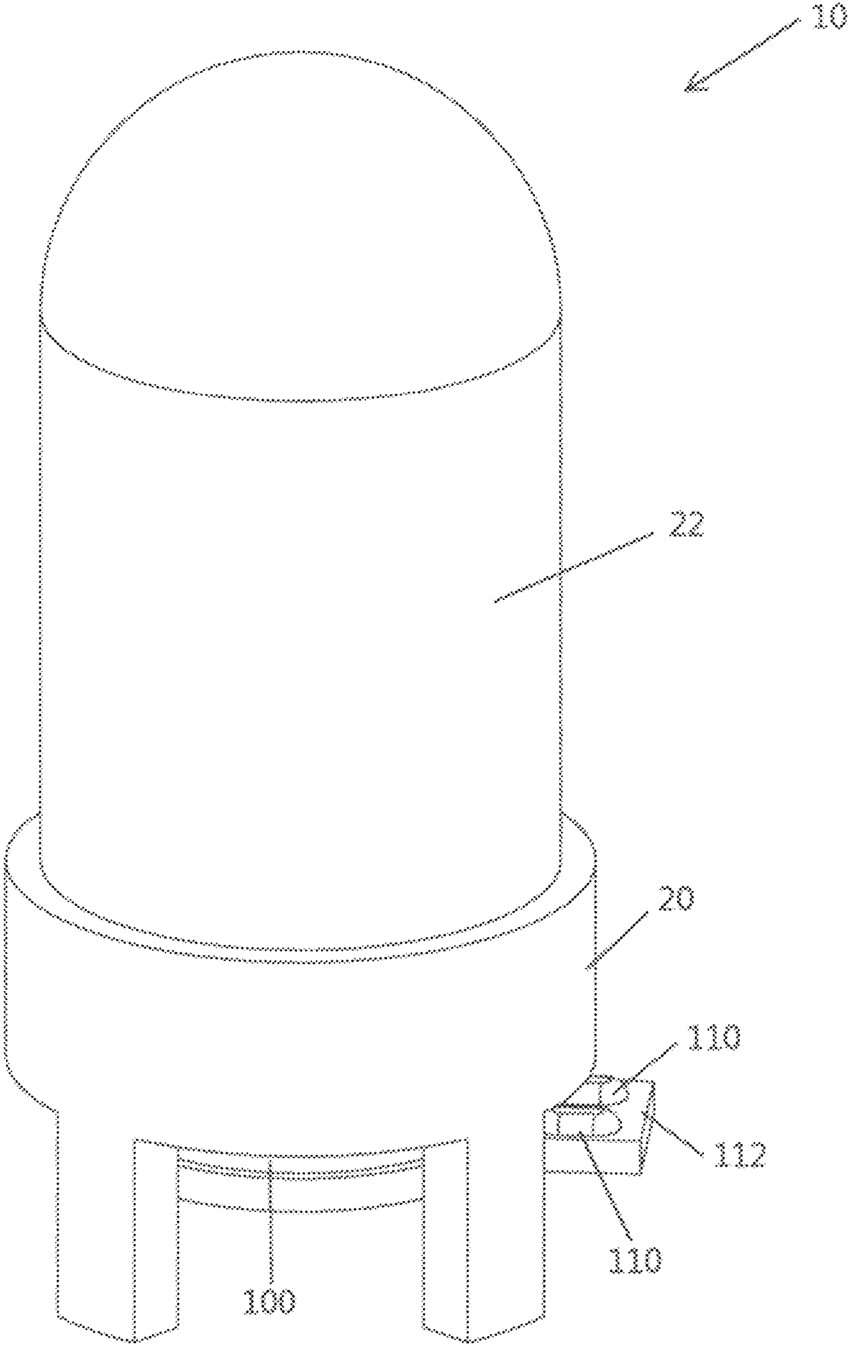
FIG. 41 is a top perspective view of a motion generator embodiment of the present technology shown with enclosed positional confinement.
Figure 42:
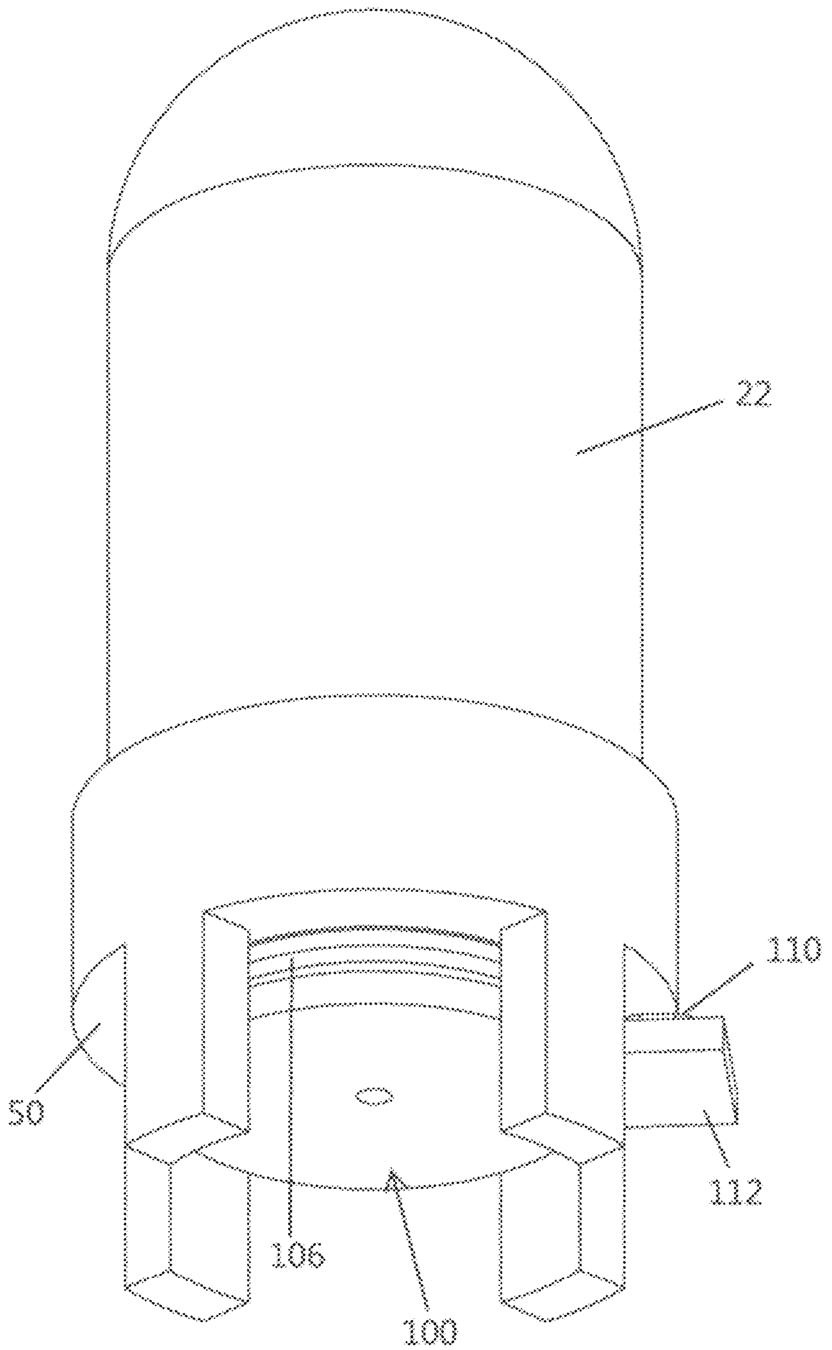
FIG. 42 is a bottom perspective view of a motion generator of the present technology of the type shown in FIG. 41.
Figure 43:
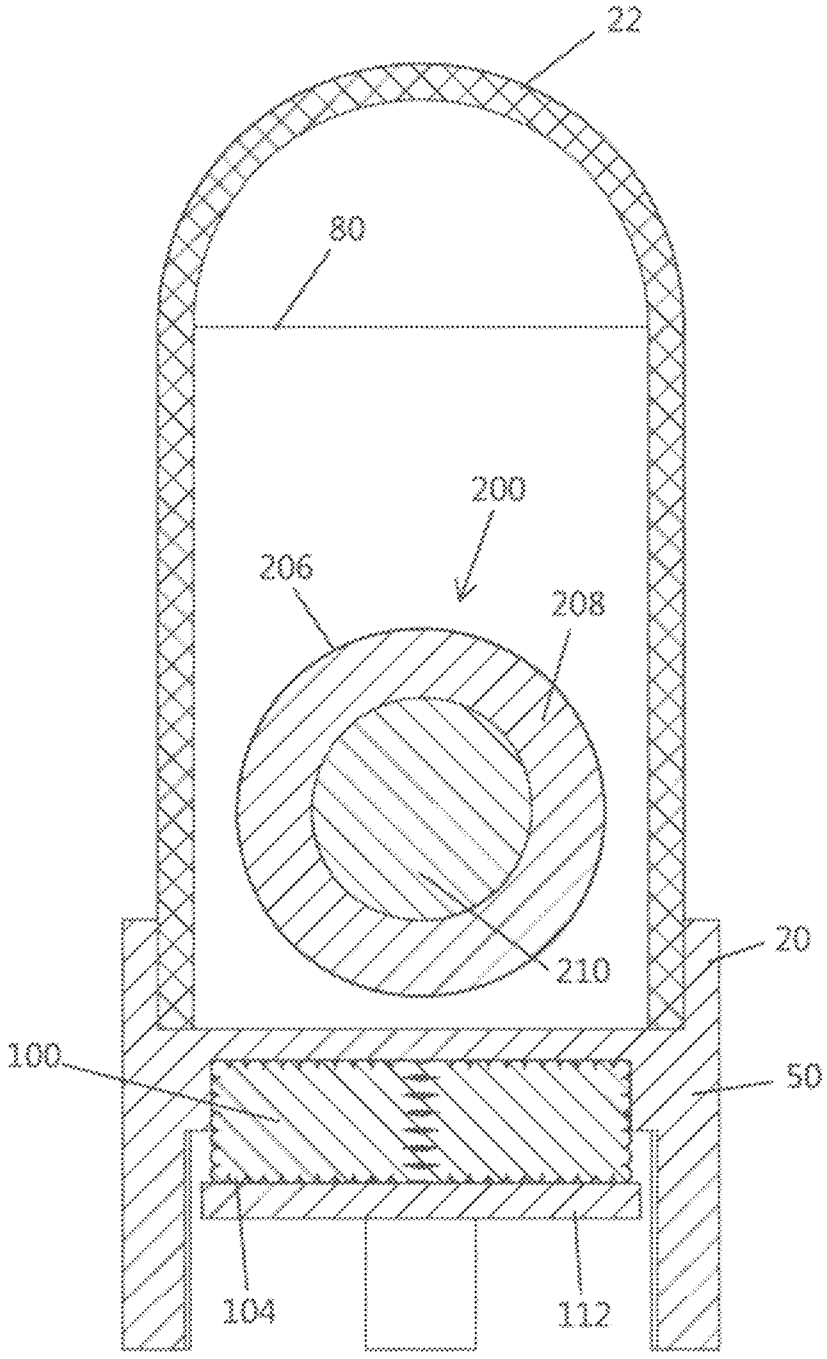
FIG. 43 is a partial sectional side view of a motion generator of the present technology of the type shown in FIG. 41.
Figure 44:
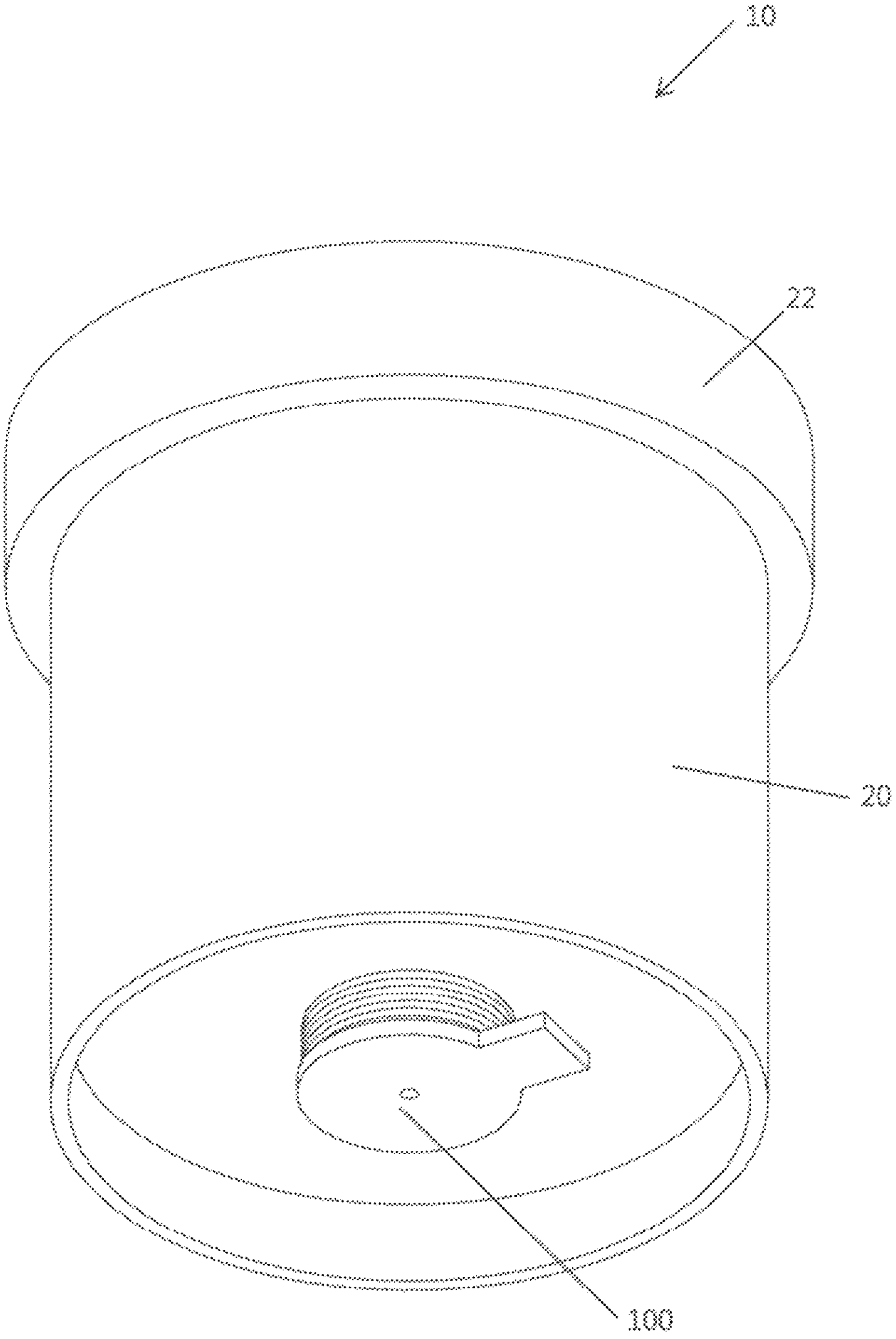
FIG. 44 is a bottom perspective view of a motion generator of the present technology with enclosed positional confinement.
Figure 45:
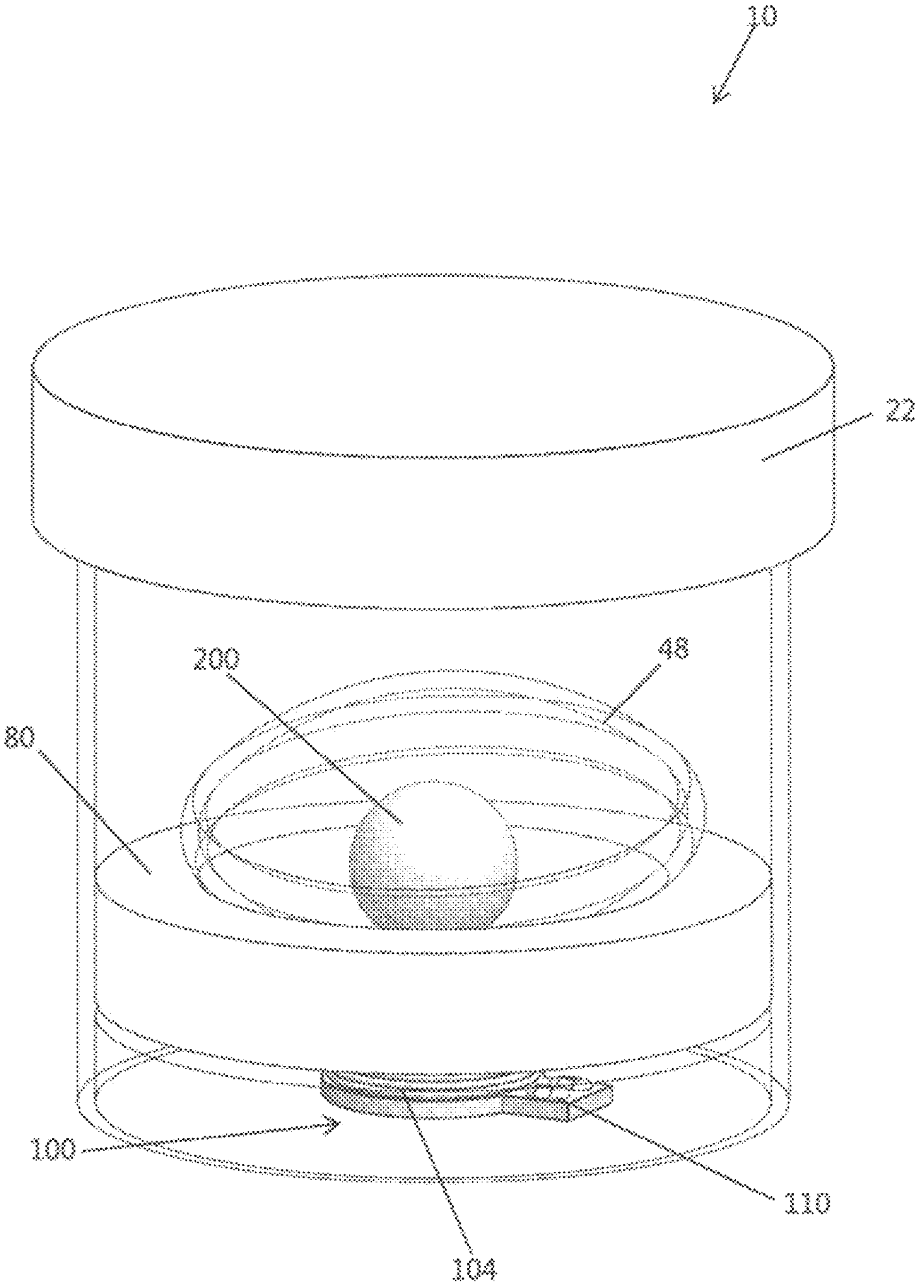
FIG. 45 is a partial transparent perspective view of a motion generator of the present technology of the type shown in FIG. 44.
Figure 46:
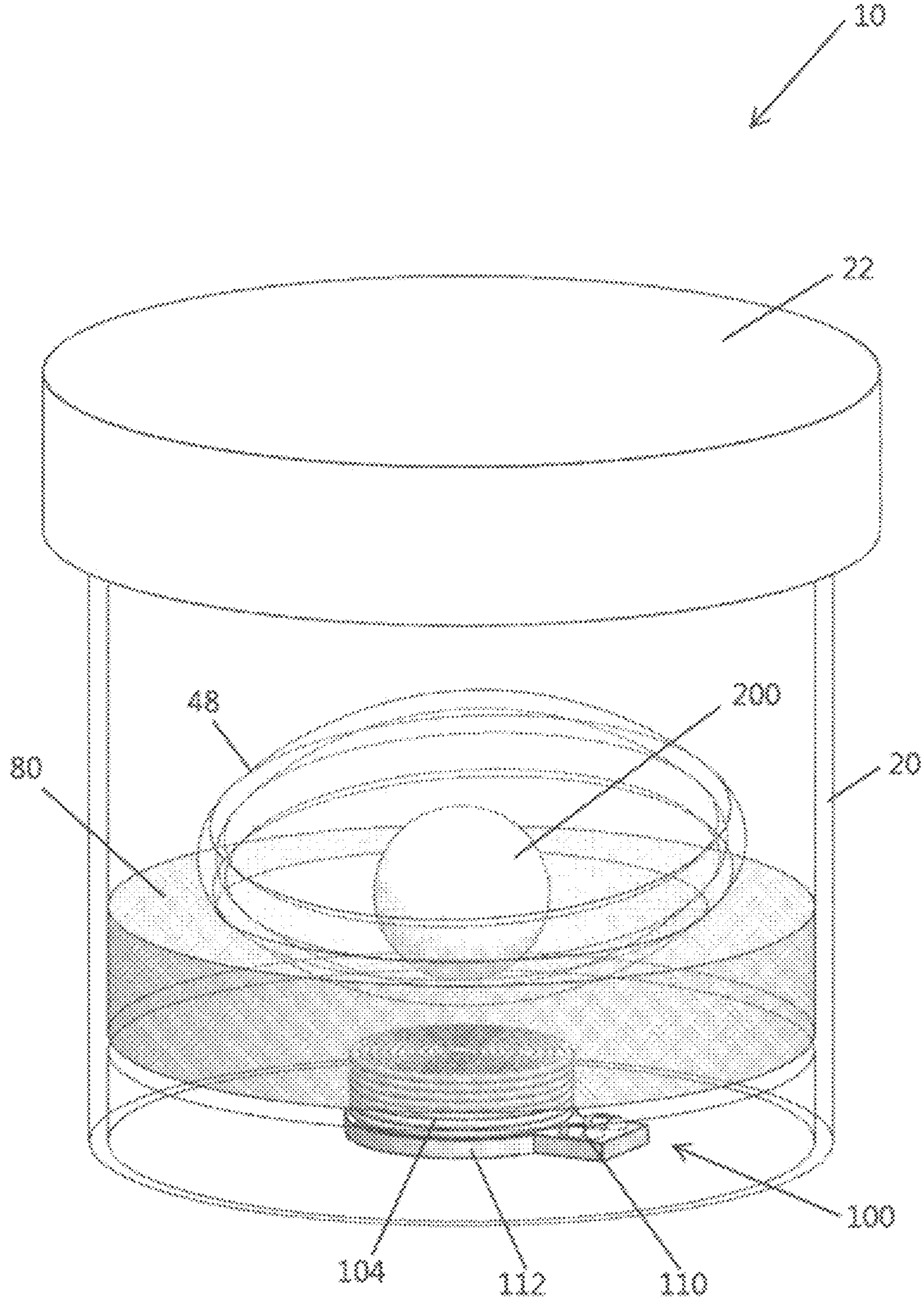
FIG. 46 is a partial transparent perspective view of a motion generator of the present technology of the type shown in FIG. 44.
Figure 47:
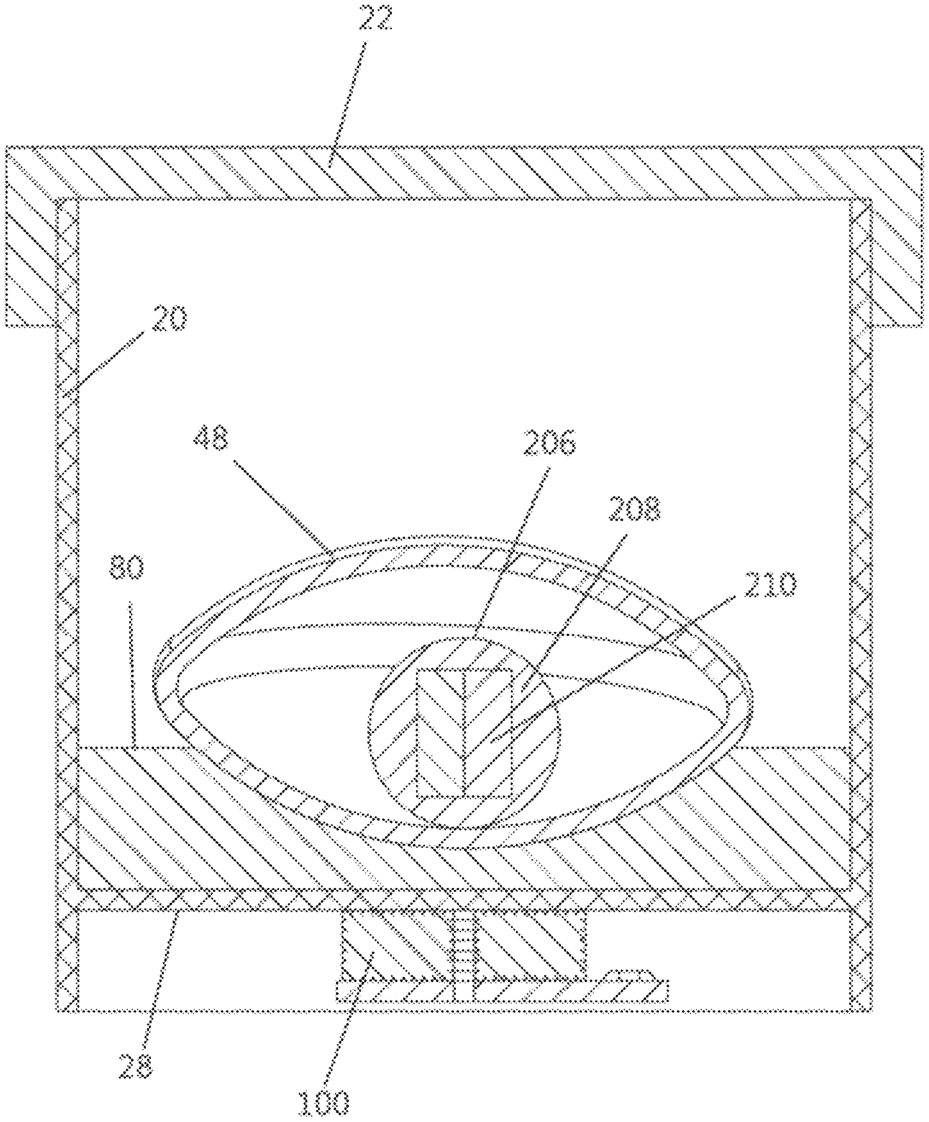
FIG. 47 is a partial sectional side view of a motion generator of the present technology of the type shown in FIG. 44.

Referring next to FIGS. 41-43 a motion generator 10 is illustrated that confines a magnetically responsive object 200 within a boundary defined by an enclosed container, base or housing 20. This embodiment of the motion generator 10 includes a single electromagnetic coil 100. The coil includes several windings 104 of a continuous wire 106. The ends of the coiled windings 104 are coupled to electrical contact or conductor pads 110 and board 112. A low voltage power supply may be electrically coupled to the pads to thereby cause a flow of electrons through the coil windings 104. When electrons flow through the coil a magnetic field is established. A central core of the windings may be hollow or filled with air.

In this embodiment, the container 20 is shown fixed to mounting base 50. Cover or top 22 is sealed to the container 20 and base 50. The container 20 and base 50 are illustrated as a single unitary body. A liquidous fluid 80 may be contained within and fills the interior of the container 20 and cover or top 22A. Disc magnet 210 may be embedded in an encasement 208 having a spherical or non-spherical outer surface 206. The encasement is made from a material having a density that is less than the liquidous fluid 80 to an extent that allows the object to float upwards in a relatively dense fluid medium when a magnetic field is not present. Although the object 200 may have a spherical outer surface 206, the shape may be altered to imitate other aquatic objects. The buoyancy of the object 200 together with the viscosity, specific gravity, and coefficient of friction of the fluid are all selected so that the velocity of the object displaced in the fluid is less than the velocity that the object would be in air under similar magnetic forces. Although the displacement of the object travelling through fluid remains randomized, the velocity of the object is reduced.

When electricity passes through the coil windings 104, a magnetic field results that acts upon the magnetically responsive object 200 and displaces the object within the container 20. The object 200 moves within the container responsive to the applied magnetic field. The magnetic moment of the object 200 and the magnetic moment of the electromagnetic coil 100 interact causing the buoyant object 200 to move in non-linear, randomized directions. Depending upon the direction of the current through the electromagnetic coil 100 and the orientation of the magnetic moment of the object 200, the object may be attracted toward or repelled away from the electromagnetic coil 100, which may be positioned adjacent to the bottom of the container. As the object 200 moves within the fluid, the orientation of the magnetic moment of the object is ever changing which further contributes to the random motion of the object. As noted above, the fluid slows the motion of the object but does not reduce the randomness of the motion.

With reference to FIGS. 44-47 a motion generator 10 is illustrated that confines a magnetically reactive object 200 within a floating vessel 48 that is itself enclosed in a container, base or housing 20. This embodiment of the motion generator 10 includes a single electromagnetic coil 100. The coil includes several windings 104 of a continuous wire 106. The ends of the coiled windings 104 are coupled to electrical contact or conductor pads 110. A low voltage power supply may be electrically coupled to the pads to thereby cause a flow of electrons through the coil windings 104. When electrons flow through the coil a magnetic field is established. A central core of the windings may be hollow or filled with air. In this embodiment, the container 20 is shown having a cover or top 22 sealed to the container 20. The container 20 includes an exterior sidewall 24 and bottom 28. A fluid 80 is contained within and fills a portion of the interior of the container 20.

The object 200 is enclosed and sealed within the floating vessel 48. The interior of the floating vessel has a hollow elliptical shape that allows the object 200 to freely roll around within the vessel as the vessel floats within the container A. Disc magnet 210 may be embedded in an encasement 208 having a spherical outer surface 206. The vessel is made from a buoyant material that allows the vessel to float on a surface of fluid 80 contained within the enclosure 20. The buoyancy of the vessel together with the viscosity, specific gravity, and coefficient of friction of the fluid are all selected so that as the object rolls within the vessel, the vessel will randomly pivot and rotate with multiple degrees of freedom. Although the displacement of the object within the vessel continues with several degrees of freedom, the velocity of the object displaced within the vessel is reduced.

When electricity passes through the coil windings 104 a magnetic field results that acts upon the magnetically responsive object 200 and displaces the object and subsequently the vessel 48 as well. The object moves within the vessel 48 and the vessel floats within the container responsive to the applied magnetic field. The magnetic moment of the object and the magnetic moment of the electromagnetic coil 100 interact causing the object to move within the vessel in a non-linear, randomized direction. Depending upon the direction of the current through the electromagnetic coil and the orientation of the magnetic moment of the object, the object may be attracted downward or repelled from the coil 100. As the object moves within the floating vessel, the orientation of the magnetic moment of the object is ever changing which further contributes to the motion of the object. As noted above, the fluid and buoyancy of the vessel slows the motion of the object but does not reduce the randomness of the motion.

Figure 48:
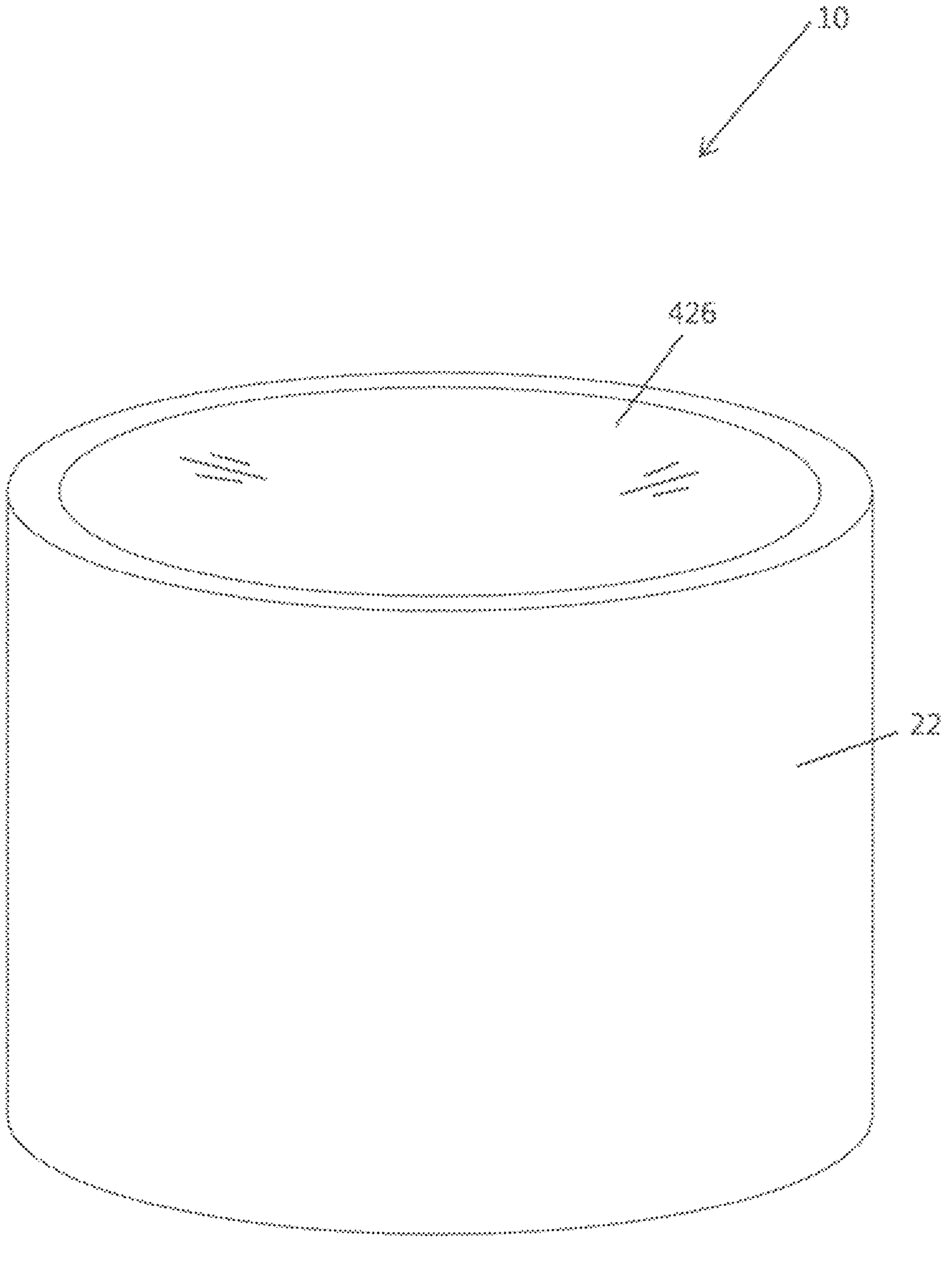
FIG. 48 is a top perspective view of a motion generator embodiment of the present technology shown with enclosed moving confinement.
Figure 49:
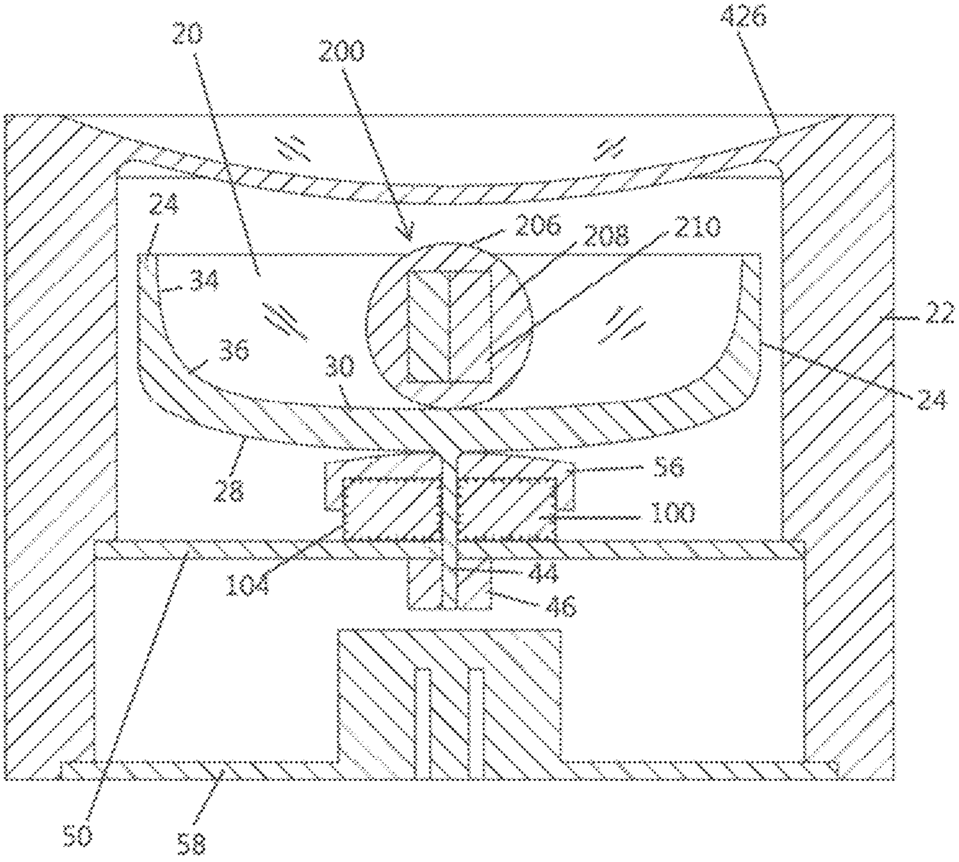
FIG. 49 is a partial sectional side view of a motion generator of the present technology of the type shown in FIG. 48.

With reference to FIGS. 48-49 a motion generator 10 is illustrated having a container, base or housing 20 that confines a magnetically responsive object 200 within a boundary defined by the container. In this embodiment, a cover or top 22 is sealed to the base 50 and a bottom plate 58. The top of cover 22 may be transparent or may be made concave with a mirror surface 426. The container 20 is shown supported by a dome 56 extending upward from coil 100 and mounting base 50. The container 20 includes an elastic stem 44 extending from the bottom of the container. The stem 44 extends through an aperture in the dome 56 and coil 100. A free end of the elastic stem 44 is fixed to the base 50 with retainer 46. The elastic stem 44 is tensioned so that the bottom of the container presses against the dome 56 but remains flexible enough to allow the container 20 to wobble about the dome with several degrees of freedom as the object 200 is displaced within the container. The container 20 includes an exterior sidewall 24 that extends between a lower or bottom portion 28 and an upper top ledge 26 of the container. A surface 34 extends between the upper top ledge 26 and a nonplanar and curved bottom portion 30. Surface 34 is chamfered or otherwise curved between the upper top ledge 26 and the bottom portion 30. Further, the bottom portion 30 may curve upward from a center region of the container.

This embodiment of the motion generator 10 includes a single electromagnetic coil 100 fixed to the mounting base 50 under the container 20. The coil includes several windings 104 of a continuous wire. The opposing ends of the coiled windings 104 are coupled to electrical contact or conductor pads. A low voltage power supply may be electrically coupled to the pads to thereby cause a flow of electrons through the coil windings 104. When electrons flow through the coil a magnetic field is established. A central core of the windings may be hollow or filled with air. In some embodiments, the polar axis 116 of the coil windings 104 of the continuous wire is aligned with the center of the housing 20. The object 200 may have a spherical or non-spherical outer surface 206. FIG. 49 illustrates a disc magnet 210 that is embedded in an encasement 208 having a spherical outer surface 206.

The shape of the object together with the nonplanar, curved surface 34 of the container 20 and gravitational forces cause the object to come to rest at a rest position, which may be the middle or center of the container 20, when no magnetic field from the coil 100 is present. The rest position/orientation, however, may instead be non-centered. When electricity passes through the coil windings 104, a magnetic field results that acts upon the magnetically responsive object 200 and displaces the object from the rest position 40 of the container. Surface 34 facilitates randomized motion of object 200 under an applied magnetic field. When the object 200 exerts a magnetic field of its own, the magnetic moment of the object and the magnetic moment of an active electromagnetic coil 100 interact, further causing the object to move upon surface 34 in randomized. Depending upon the direction of the current through the electromagnetic coil 100 and the orientation of the magnetic moment of the object 200, the object may be attracted toward or pushed away from the polar axis 116 of the coil 100. As the object 200 moves, the orientation of the magnetic moment of the object is ever changing as the container 20 wobbles about an axis defined by stem 44, further contributing to the motion of an ever-changing pattern. Also, the motion is further compounded by the gravitational forces acting upon the object 200 as it moves along surface 34 of the wobbling container 20.

Figure 50:
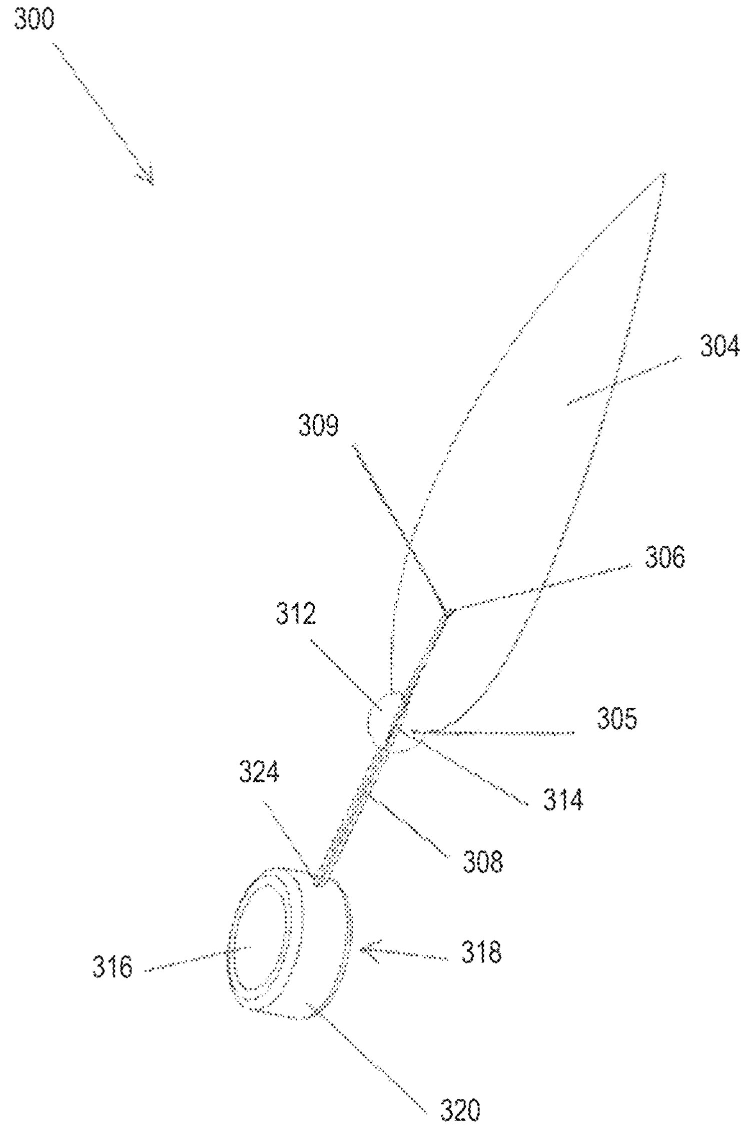
FIG. 50 is a perspective view of an artificial flame assembly embodiment suitable for use in an artificial candle of the present technology.
Figure 51A:
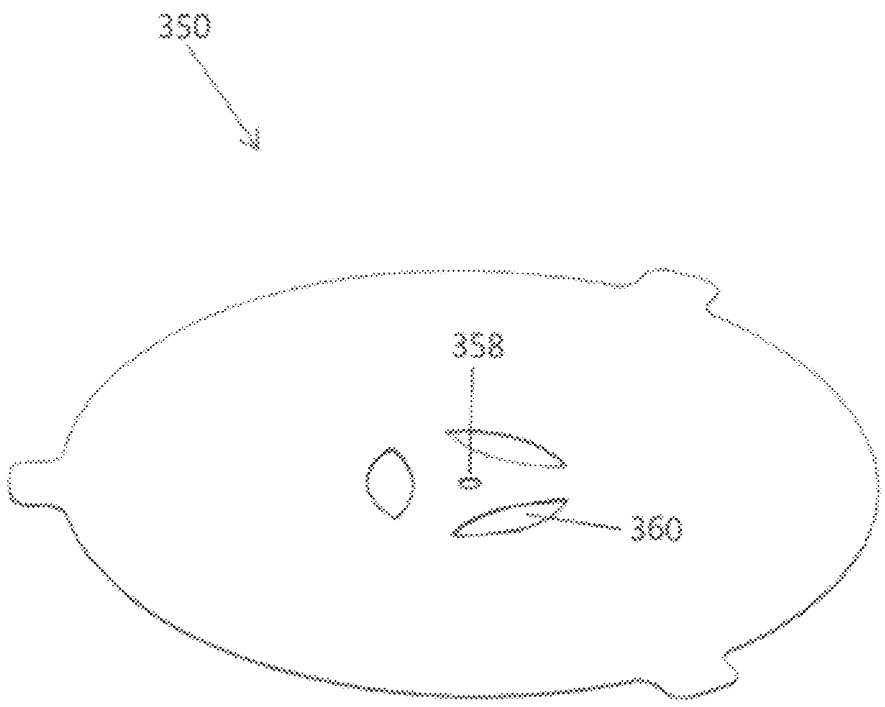
FIG. 51A is a perspective view of a platform for an artificial flame assembly embodiment suitable for use in an artificial candle of the present technology.
Figure 51B:
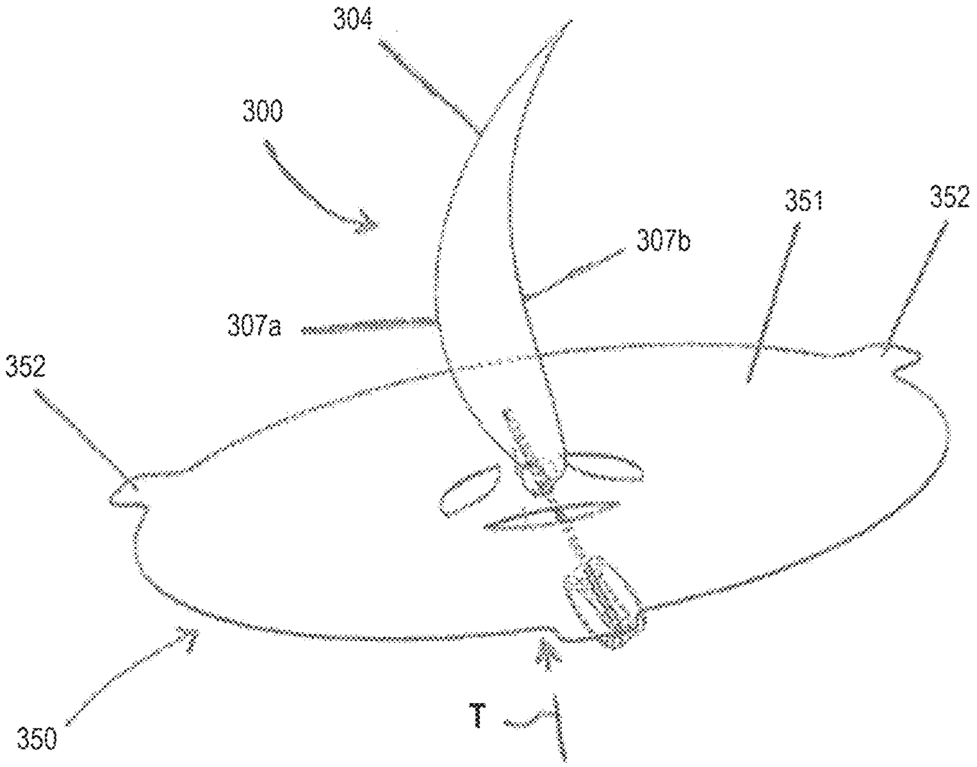
FIG. 51B is a perspective view of an artificial flame assembly with the platform of FIG. 51A.
Figure 52:
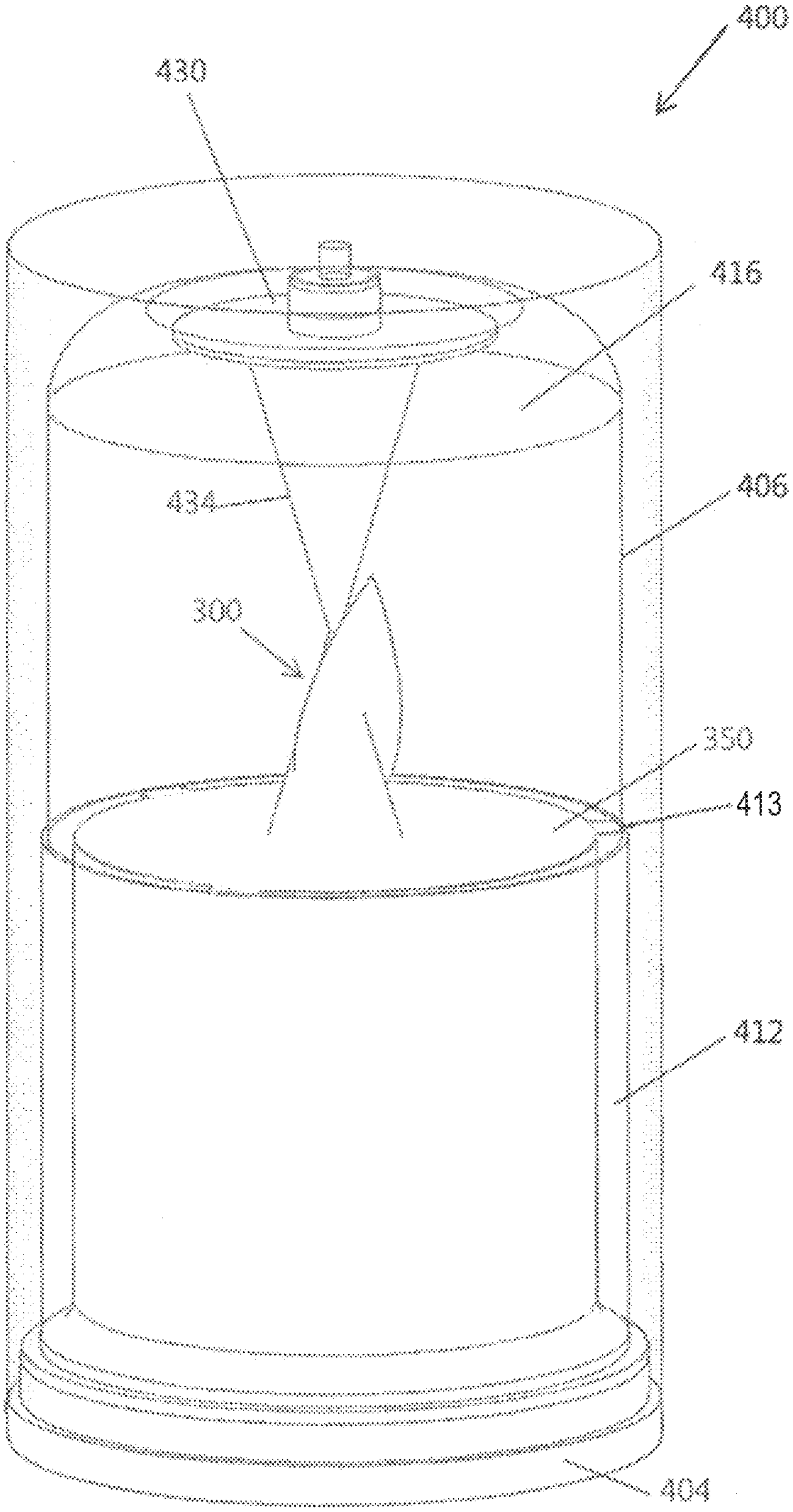
FIG. 52 is a front partial transparent perspective view of an enclosed artificial candle embodiment of the present technology suitable for randomized motion of an artificial flame.
Figure 53:
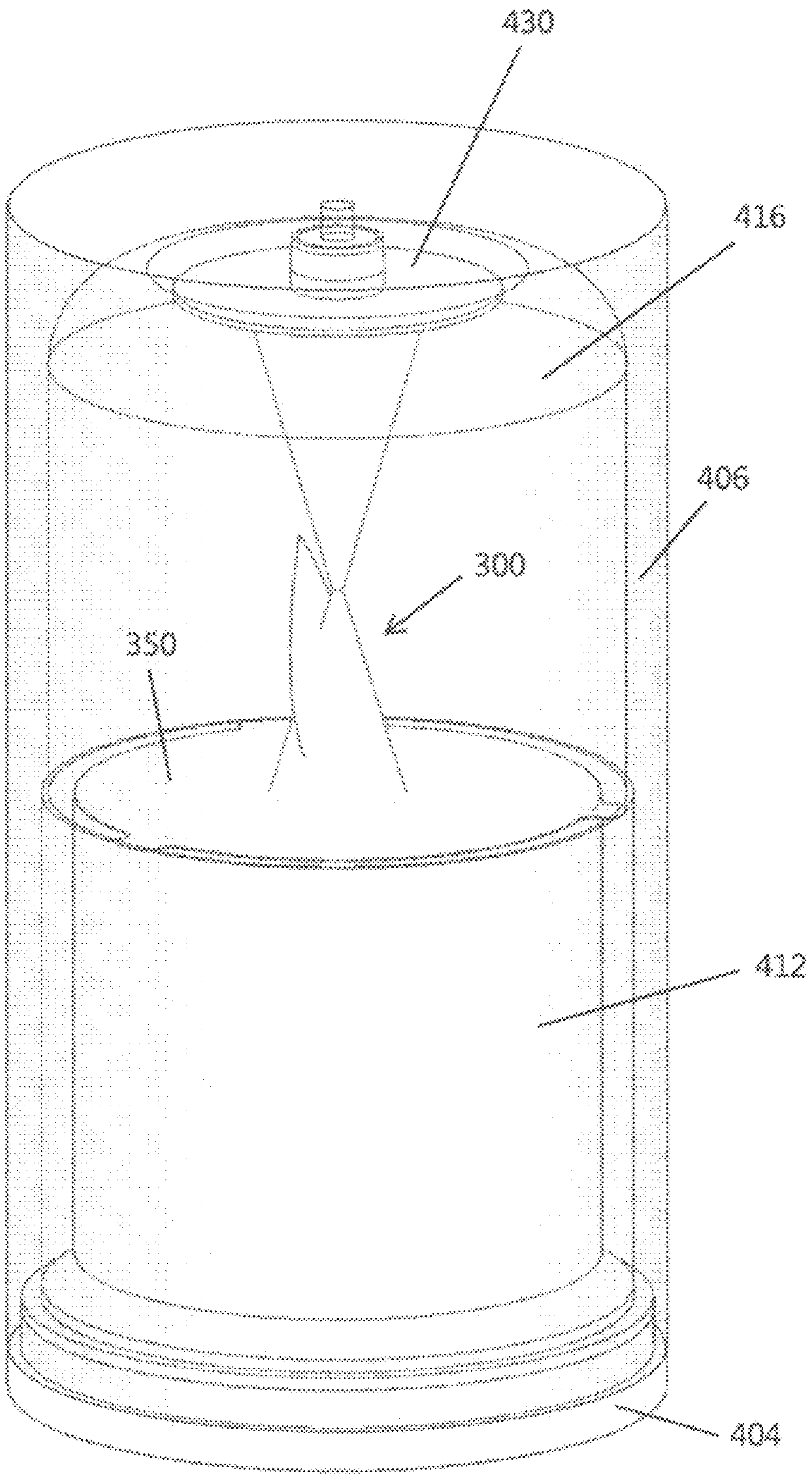
FIG. 53 is a back partial transparent perspective view of an enclosed artificial candle embodiment of the type shown in FIG. 52.
Figure 54:
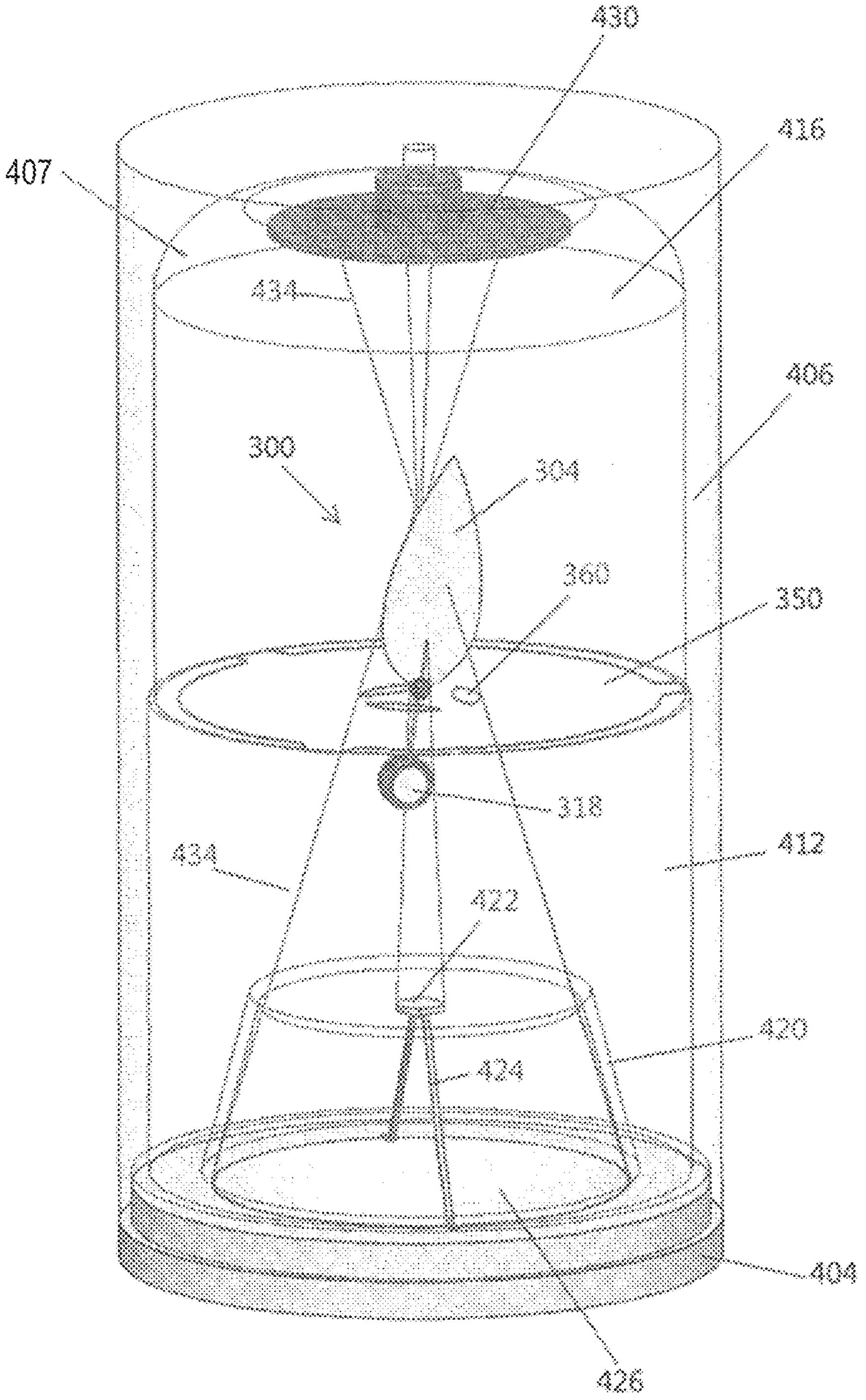
FIG. 54 is a partial transparent perspective view of an enclosed artificial candle embodiment of the type shown in FIG. 52.
Figure 55:
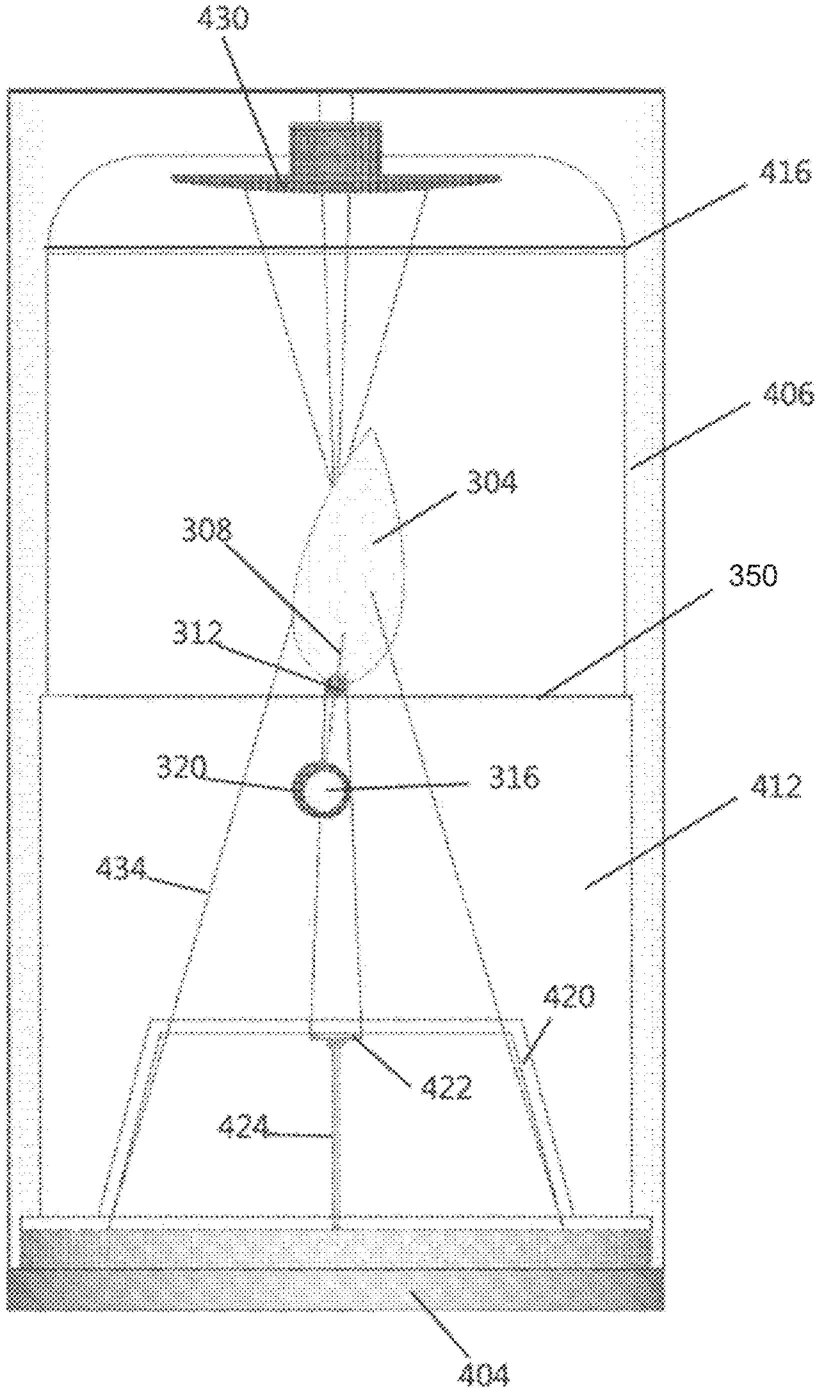
FIG. 55 is a partial transparent side perspective view of an enclosed artificial candle embodiment of the type shown in FIG. 52.
Figure 56:
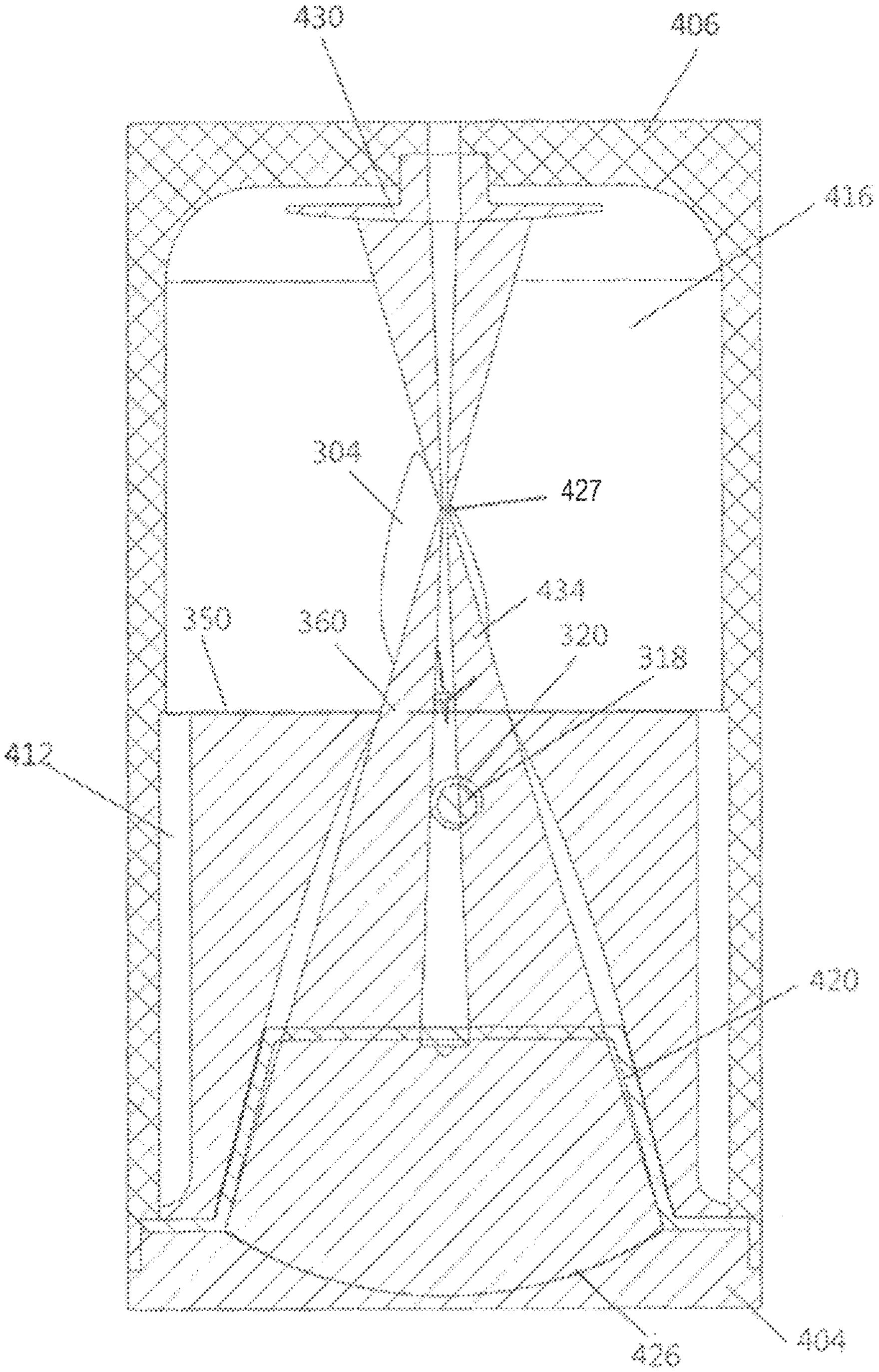
FIG. 56 is a partial sectional side view of an enclosed artificial candle embodiment of the type shown in FIG. 52.
Figure 57:
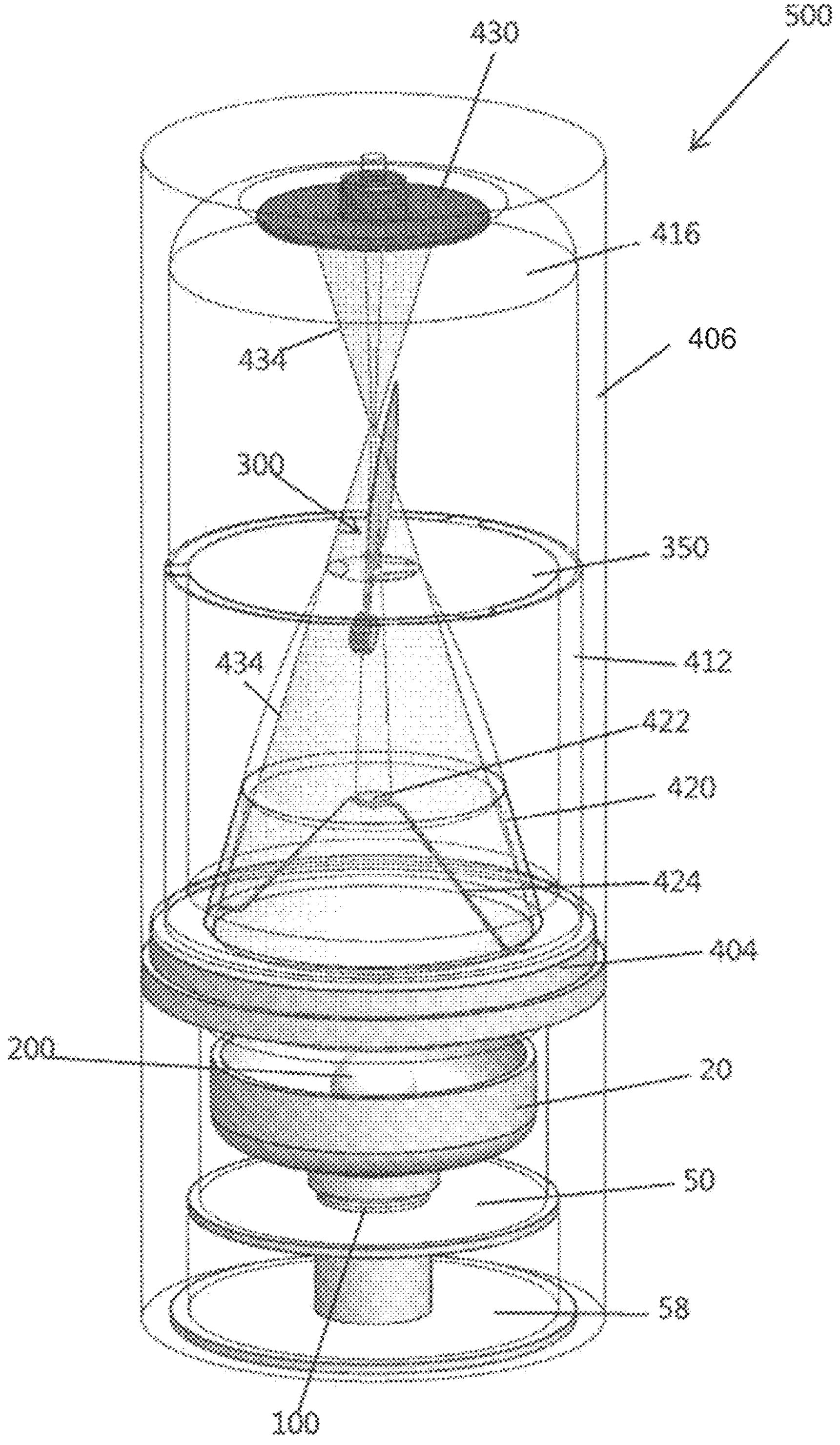
FIG. 57 is a top partial transparent perspective view of a combined enclosed artificial candle and motion generator embodiment of the present technology suitable for randomized motion of an artificial flame.
Figure 58:
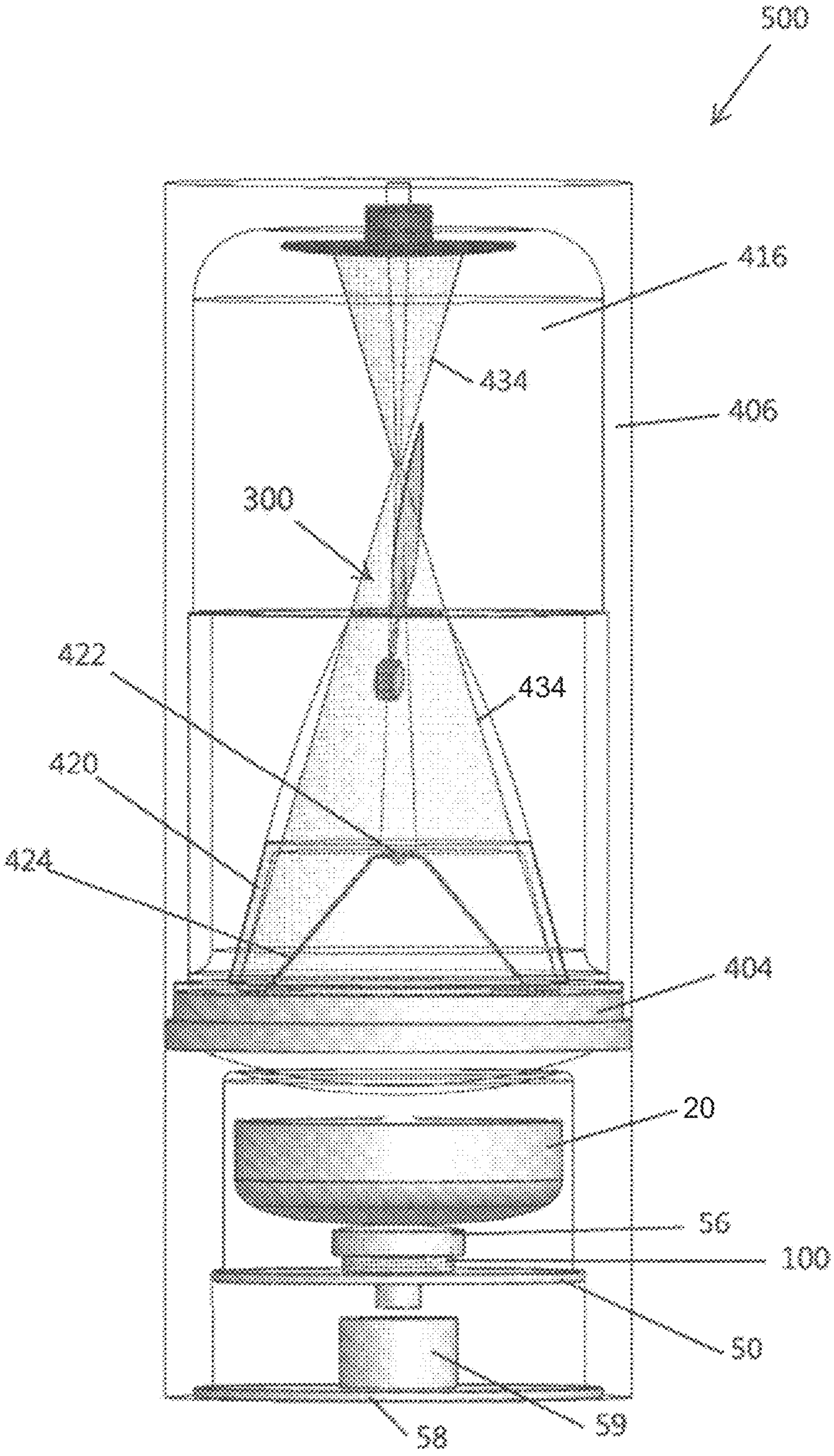
FIG. 58 is a side partial transparent perspective view of a combined enclosed artificial candle and motion generator embodiment of the type shown in FIG. 57.
Figure 59:
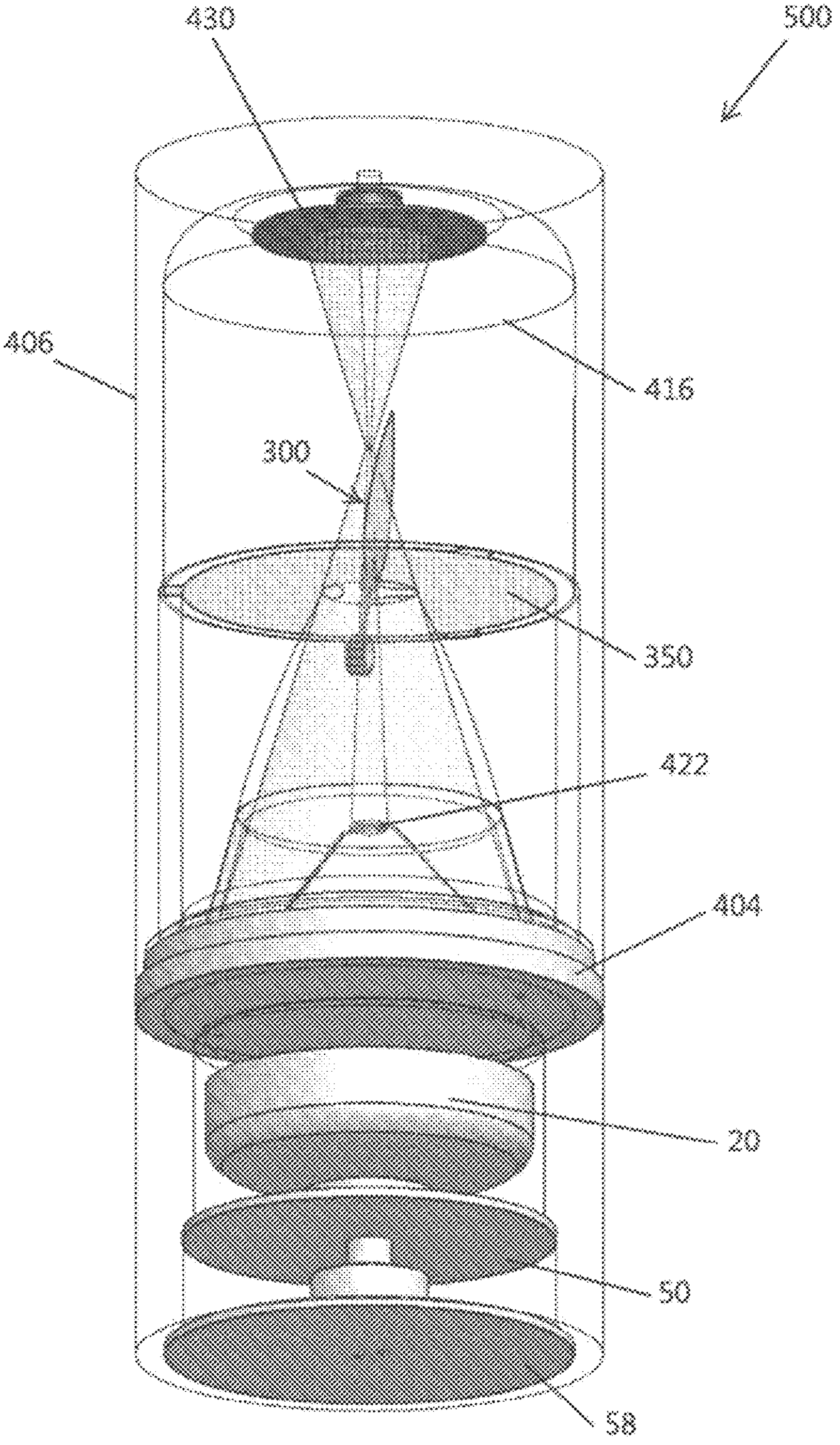
FIG. 59 is a bottom partial transparent perspective view of a combined enclosed artificial candle and motion generator embodiment of the type shown in FIG. 57.
Figure 60:
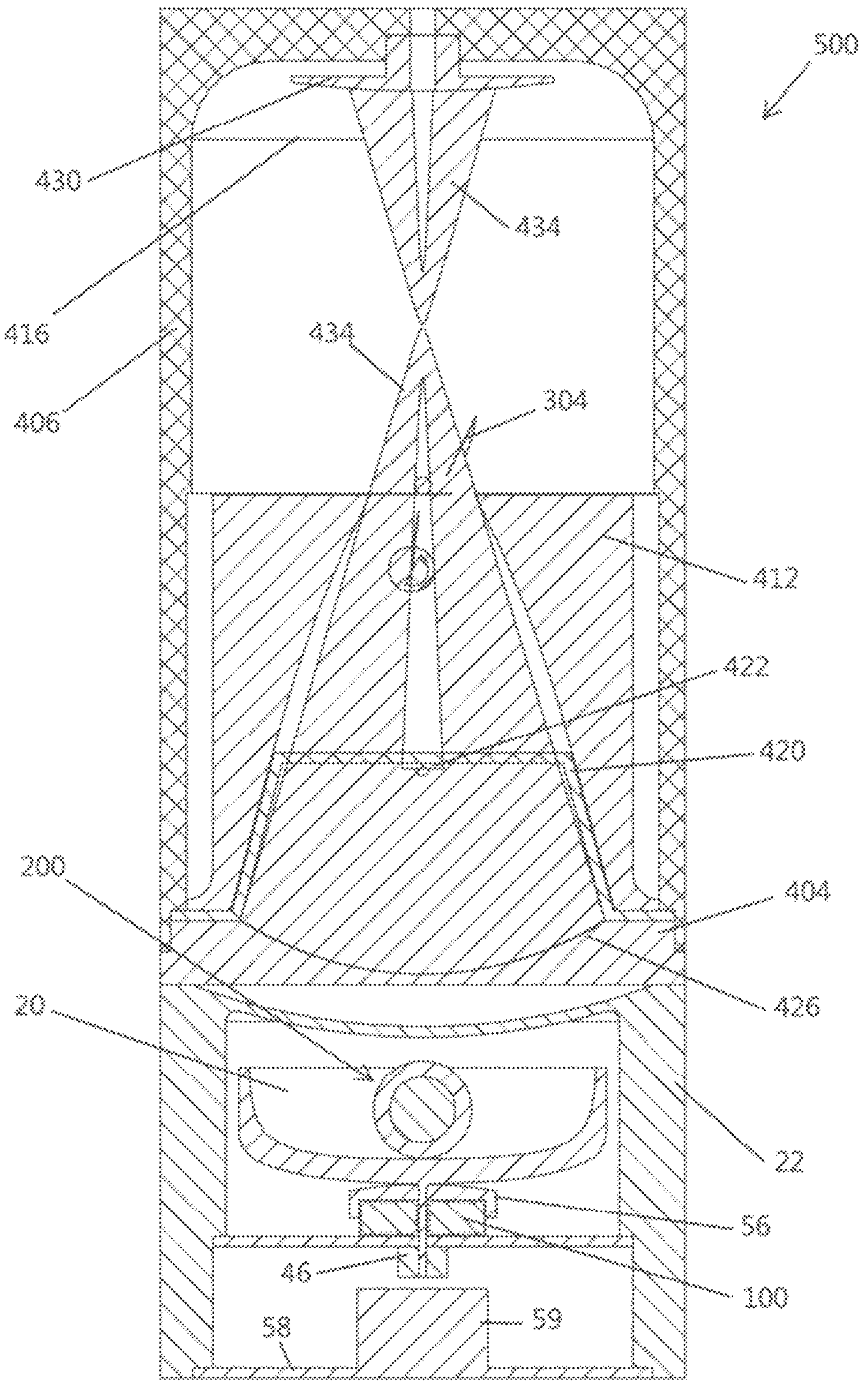
FIG. 60 is a partial sectional side view of a combined enclosed artificial candle and motion generator embodiment of the type shown in FIG. 57.

With reference to FIGS. 50, 51A, and 51B, a screen assembly or an illumination assembly 300 and suspension platform or pivot disk 350 are illustrated. The screen assembly 300 includes a screen 304, wire loop 308, pivot object 312, magnet 318, and a magnet holder 320. The screen assembly 300 may be pivotally supported by platform 350, as illustrated in FIG. 51B. The platform 350 may be mounted adjacent to or near a motion generator 10, such that object 200 may continuously or discontinuously couple with magnet 318 of screen assembly 300. In some embodiments, object 200 may magnetically pair with magnet 318 of screen assembly 300 through a magnetic interaction between object 200 and magnet 318. Object 200 may additionally or instead physically interact with screen assembly 300. Through such coupling, movement of object 200 imparts movement to screen assembly 300. Preferably, the imparted or induced movement is randomized, assuming an ever-changing movement pattern. In this regard, screen assembly 300 is an example of an associated or paired article, which is associated with the motion generator 10 through the continuous or discontinuous coupling between object 200 and screen assembly 300 to provide screen assembly with unique motion characteristics. It is contemplated, however, that a wide variety of shapes, figures, and mechanisms may be employed as the paired article or articles.

In some embodiments, such as when screen 304 of screen assembly 300 is configured with an appearance of a flame, the wire loop 308 may be configured to resemble the wick of a wax candle. In particular, screen may be secured to wire loop 308 so that a distal end 309 of wire loop 308 is spaced from a base end 305 of screen 304. An appearance of a flame emitting from around an end region of a wick is accordingly achieved. Wire loop 308 may be sufficiently rigid to transfer the motion imparted upon magnet 318 to the screen 304. However, wire loop 308 may, in some embodiments, exhibit flexibility in operation to provide a natural appearance of the wick bending or otherwise moving as a result of external forces such as moving air impacting the wick. In some embodiments, wire loop 308 may be fabricated from a relatively thin metal wire that provides the necessary rigidity to effectively transfer motion to screen 304, but may also exhibit a degree of flexibility as described above. Moreover, the thinness of wire loop 308 may be advantageous to reduce the visible prominence of the wire. An example wire loop 308 may be fabricated from stainless steel, with an example thickness of between 0.05 mm to 0.2 mm.

Each end of the wire loop 308 may be received through a slot or aperture 306 in screen 304, through an aperture 314 extending through the pivot body 312, through an aperture 358 in the pivot disk 350, and through an opening 324 in the magnet holder 320. Ends of the wire loop 308 may be positioned on opposing sides of a dividing wall within the magnet holder 320, such that when more than one magnet bodies 316 form magnet 318, and are drawn together in the magnet holder 320, the ends of wire loop 308 may be sandwiched between the respective magnet bodies 316 and the dividing wall to be firmly held in place. Other techniques and configurations for securing wire loop 308 with magnet holder 320 are also contemplated by the present technology.

Pivot body 312 is preferably configured to coordinate with suspension platform/pivot disk 350. In the illustrated embodiment, pivot body 312 is supported by pivot disc 350 with wire loop 308 extending though aperture 358. Pivot body 312 restricts movement of screen assembly 300 through aperture 358 of pivot disc 350, but is preferably configured to facilitate movement of screen assembly in several degrees of freedom. The interaction of pivot body 312 with pivot disc 350 permits screen assembly 304 to pitch, yaw, slide, and roll in several degrees of freedom, limited axially by the relatively larger sizes of pivot body 312 and magnet holder 320 with respect to aperture 358, and otherwise by the relative size of aperture 358 with respect to a thickness of wire loop 308. In some embodiments, the interaction of pivot body 312 and pivot disc 350 resembles a universal joint that permits several degrees of motion freedom to screen assembly 300, while restricting few degrees of freedom of motion. Pivot body 312 may be spherical, semi-spherical, elliptical, lens-shaped, or any other shape that facilitates desired movement of screen assembly relative to pivot disc 350. A spherical pivot body 312 may provide an advantage of limiting or avoiding significant change to a silhouette or shadow cast by pivot body 312 as it pivots. Other shapes for pivot body 312, however, may also exhibit this optical advantage.

Pivot plate 350 may assume a variety of configurations and be fabricated from a variety of materials. In some embodiments, however, light transmissivity may be an important characteristic of pivot plate 350. Pivot plate 350 may therefore be substantially transparent to electromagnetic radiation, such as radiation having wavelengths within a visible light range, an infrared light range, an ultraviolet light range, and combinations thereof. For the purposes hereof, the term "transparent" may mean having the property of transmitting light through so that objects can be illuminated by the light. In some embodiments, pivot plate may be entirely transparent. In other embodiments, however, only a portion or certain portions of pivot plate 350 may be transparent. As will be described in greater detail hereinbelow, a function of pivot plate 350 may be to permit passage of light along at least a direction "T" through a thickness of pivot plate 350. An example construction of pivot plate 350 may be a visible light-transparent polyester sheet having a thickness along direction "T" of 0.05-0.2 mm. In some embodiments, an upper surface 351 of pivot plate 350 may exhibit light reflective properties, or may have a reflective coating applied thereto. Aperture 358 preferably has a diameter that is smaller than a cross-sectional dimension of pivot body 312.

Pivot plate 350 may also or instead be translucent or semi-transparent to light. For the purposes hereof, the term "translucent" may mean the property of, in the case of visible light, permitting some light through, but diffusing it so that objects are not clearly visible through it. Pivot plate may have some portions which are translucent, and other portions which are transparent or opaque.

The screen assembly 300 and pivot plate 350 are typically positioned in relation to a motion generator 10 such that magnet 318 is responsive to a change in the magnetic field emanating from the motion generator 10 and/or a change in the magnetic field emanating from object 200. In some embodiments, object 200 exerts a magnetic field. As described above, object 200 may be urged into movement by motion generator 10. The movement of object 200 may include rolling, tumbling, spinning, and the like, which causes a polar axis of the magnetic field of object 200 to move correspondingly. The moving magnetic field exerted by object 200 may also cause a magnetic response in magnet 318 of screen assembly 300. The magnetic response of magnet 318 may include spatial displacement responsive to the randomized positioning of object 200 of motion generator 10. Magnet 318, therefore, may itself move in somewhat randomized directions and magnitudes, based upon the movement of object 200 and its relative proximity and spatial relationship to magnet 318 when magnet 318 is magnetically paired with object 200.

In some embodiments, magnet 318 may be magnetically responsive to motion generator 10, but not to object 200. In some embodiments, object 200 may interfere with the magnetic field exerted by motion generator 10, such that the magnetic field may be intermittently modified or blocked as object 200 moves along surface 34 of container 20. Movement of magnet 318 induced by motion generator 10 and/or object 200 results in motion to screen assembly 300. Because wire loop 308 transfers motion from magnet 318 to screen 304, the ever-changing movement pattern induced in magnet 318 from motion generator 10 and/or object 200 may be transferred to screen 304, limited by the degrees of freedom of movement permitted at the universal joint represented by the relationship between pivot body 312 and pivot plate 350.

Screen 304 may preferably comprise a flexible body that is capable of being at least partially illuminated by incident light. For the purposes hereof, the term "light" may mean electromagnetic radiation in one or more wavelength ranges, such as visible, ultraviolet, and infrared wavelength ranges. The flexible body of screen 304 may therefore be diffusive to light. Screen 304 may be shaped to represent an article that is movable directly or indirectly by motion generator 10. In some embodiments, the flexibility of screen 304 is important to its function and appearance. FIGS. 50 and 51B illustrate a screen 304 shaped like a flame. Screen 304 is therefore sufficiently flexible to bend during induced movement of screen assembly 300 to resemble a flickering flame. An example screen 304 is a polyester film having a thickness of between 0.01-0.03 mm. However, other materials and material thicknesses are contemplated as being useful in the manufacture of screen 304. Moreover, screen 304 may be shaped as desired to best accommodate the respective application of the present technology. Accordingly, screen 304 may have various shapes, sizes, materials, flexibilities, light responsiveness, etc.

In the illustrated embodiment, screen 304 is shaped as a modified, asymmetrical crescent, with each side edge 307*a*, 307*b* having a compound curvature with multiple radii. In other embodiments, however, side edges 307*a*, 307*b* may each of a single radius of curvature, whether equivalent to one another or not. The illustrated embodiment of screen 304 is intended to represent a flame.

A coating may be applied to screen 304 to modify illumination or physical properties thereof. Example coatings include light reflective coatings, light diffusive coatings, colorants, decorative coatings, liquid-impermeable coatings, stiffening agents, and so on.

The screen assembly 300 may be encased in liquid to dampen its motion. Dampening the motion of the screen assembly 300 may increase the flexure of screen 304 as the magnet 318 responds to variances in nearby magnetic fields, thereby causing the wire loop 308 to pitch, yaw, and otherwise be driven by the induced movement of magnet 318. The flexibility and shape of the screen 304, along with the viscosity and density of the liquid, and the rapidity and magnitude of induced motion and directional change to screen assembly from motion generator 10 may be selected and controlled such that a desired movement of screen 304 is achieved. In some embodiments, the movement of screen 304 mimics a flickering flame. It has been found that immersion of screen 304 in a relatively viscous fluid such as various liquids facilitates a realistic flickering flame illusion.

With reference to FIGS. 52-56, a screen assembly 300 illustrated as being secured within an illuminated, fluid filled encasement 400. The illustrated apparatus may constitute a waxless candle, wherein the flame is represented by screen 304 illuminated by a light emitter. The screen assembly 300 within the encasement 400 is driven along several degrees of freedom by a motion generator 10. In some embodiments, the encasement 400 may include a base 404, a dome or cover 406, and body 412. Body 412 may be hollow and may be secured between base 404 and cover 406. The pivot plate 350 of the screen assembly 300 may be dimensioned to be supported by a top ledge of the body 412. In particular, tabs 352 of pivot plate 350 may be received in respective recesses 413 of body 412. In this embodiment, the pivot plate 350 may be substantially transparent and optionally includes slots 360. Encasement 400 may be made from materials that aid in presenting a desired appearance for the paired article, in this case screen 304. In some embodiments, dome or cover 406 may in part or wholly be transparent. In other embodiments, dome or cover 406 may in part or wholly be translucent, or may be combinations of transparent, semi-transparent, translucent, and opaque, wherein various regions encasement 400 exhibit different optical properties. Encasement 400 may be shaped, textured, decorated, or otherwise configured to achieve desired optical properties, physical properties, and/or appearance.

In some embodiments, encasement 400 may be substantially cylindrical. In the illustrated embodiment, cover 406 may have a cylindrical side wall that is at least in part transparent. Applicant has determined that the transparent cylindrical side wall can act as a lens to enhance the appearance of screen 304, particularly when screen 304 is illuminated. The lens formed by the cylindrical side wall can magnify the appearance of screen 304, depending upon the location of the screen 304 relative to the center of curvature of the lens and the focus of the lens.

A fluid 416 may be disposed in a chamber defined by and/or within the encasement 400. As described above, the fluid 416 may be a liquid, and preferably exhibits physical properties that enhance the appearance and function of screen apparatus 300. For example, fluid 416 may be selected in part for its viscosity properties, wherein the fluid 416 acts as a movement retardant to screen 304. An increased viscosity in comparison to a gas mixture like air may preferably cause screen to flex more dramatically during than it would otherwise if immersed in air. Applicant has found that the flex imparted upon screen 304 by fluid 416 during movement of the screen 304 driven by motion generator 10 enhances the realistic appearance of a flickering flame. The ideal flexure of screen 304 during movement may be established through combinations of the material or materials, thicknesses, sizes, and shapes of screen 304, the mounting arrangement of screen 304 to wire loop 308, and the viscosity properties of fluid 416. Optimization of these and other factors are contemplated by the present technology to suit the particular application. An example fluid 416 is water, such as deionized water, which is optically transparent and exhibits a viscosity of about 1 cP at 20° C. Other fluid materials, such as various aqueous solutions, and other non-toxic liquids, are contemplated as being useful in the present technology.

Figure 61:
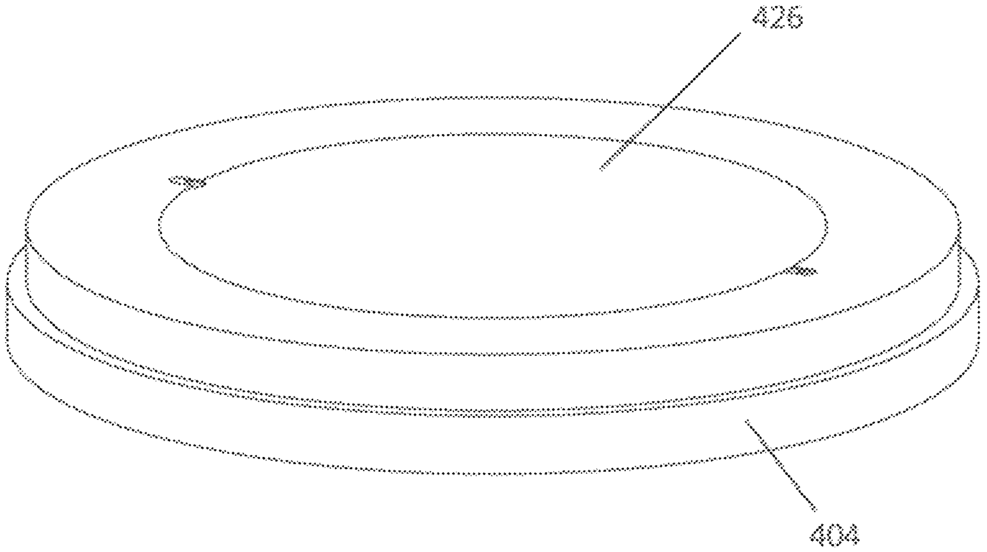
FIG. 61 is a perspective of a mirror embodiment suitable for use in an artificial candle of the present technology.

A light source 422, such as a light emitting diode, may be supported under screen assembly 300 by a support body 420. Electrical conductors or leads 424 extend from light source 422 toward the base 404. The light source 422 is preferably positioned to emit light in a manner to illuminate screen 304. Applicants contemplate a variety of illumination mechanisms and arrangements that may suitably illuminate screen 304. In some embodiments, a reflective surface 426 (see also FIG. 61) may be located below light source 422. Reflective surface 426 may have a concave configuration, wherein incident light may be reflected by surface 426 toward one or more foci. In a particular embodiment, at least one of the reflected light foci 427 may be at a specific position within chamber 407 defined by cover 406 to provide a desired illumination of screen 304. For example, screen 304 may be between light source and focal point 427. In this arrangement, a desired illumination pattern, such as a conical or triangular illumination pattern may illuminate at least a portion of screen 304. In the case of screen 304 exhibiting an appearance of a flame, the illumination pattern created by the arrangement and configuration of light source 422 and reflective surface 426 may enhance such appearance by mimicking the illuminated boundary of the flame. Screen 304 may also or instead intersect focal point 427. Thus, as screen 304 moves within chamber 407, including with varying degrees of flexure, portions of screen 304 may intersect with foci 427 of reflected light. By directing the emitted light toward foci 427, an intensity of illumination of screen 304 can be enhanced relative to the source intensity. As a result, light source 422 may require less power than would otherwise be required to achieve the illumination effect facilitated by the arrangement of the present technology. It is to be understood, however, that reflected light from light source 422, other than at foci 427, may also intersect with screen 304. In some embodiments, reflective surface 426 may be formed by vacuum metalizing base 404.

In general, the assembly may be constructed by loading and capturing parts at internal contours. Base 404 and support body 420 combine to seal the bottom of dome 406 when bonded in place. An anti-reflective coating may be applied to various surfaces of the apparatus to minimize undesired reflection of the emitted light from light source 422, and to maximize the intensity of light received at screen 304. The anti-reflective coating may be applied, for example, to a lower surface of pivot plate 350, and an underside of support body 420.

In some embodiments, a portion of the emitted light may be intentionally blocked or diffused to enhance the visual appearance of screen 304 and/or portions of or the entirety of the apparatus. For example, light source 422 itself, and magnet 318 and pivot object 312 of the screen assembly 300 may block a portion of the reflected light from reflective surface 426. The light-blocking elements are arranged in the apparatus such that a shadow or shadows cast by the light-blocking elements enhances the visual appearance of the illuminated screen 304, in some cases by creating a dynamic, diffuse shadow pattern on screen 304 that enhances the realistic quality of the flame illusion. In some embodiments, a shadow cast at screen 304 by one or more of the light blocking elements may resemble a candle wick. The apparatus may therefore preferably include one or more light blocking elements in the light path between light source 422 and screen 304.

A treatment or mechanism may also be applied to at least a portion of reflective surface 426, or in a light pathway between light source 22 and screen 304 to in some manner adjust light incident thereto or passing therethrough. In some embodiments, a pigmented region of reflective surface 426 may act as a color filter to adjust a visible wavelength spectrum of light incident to the pigmented region, and reflected from reflected surface 426 superimposed by the pigmented region. Such an arrangement may enhance the appearance of the flame illusion by creating an amber-colored region of illumination at screen 304. The pigmented region/filter may be applied in an annular pattern at reflective surface 426 so that only a portion of reflected light is affected by the pigmented region/filter.

At least a portion of the light that passes through or around screen 304 may be absorbed, diffused, scattered, and/or reflected by shield 430 rather than passing through dome 406. Shield 430 accordingly limits light from emitting through dome/cover 406, and creates an appearance of only screen 304 being illuminated, as though being its own source of light. Shield 430 may therefore exhibit light absorbing properties. Shield 430 may also or instead have a convex surface that acts to scatter any light reflected therefrom, thereby greatly diminishing the light intensity at any single location. In other embodiments, shield 430 may have a concave reflective surface to reflect incident light back toward a focal point at or near screen 304. Doing so further enhances the intensity of light incident upon screen 304.

With reference to FIGS. 57-60 an exemplary embodiment of the combination of a motion generator 10, screen assembly 300 and encasement 400 is illustrated. The motion generator 10 is coupled to the base 404 of the encasement 400 and the dome or cover 406 extends to a bottom plate 58 of the motion generator 10. A power supply coupling 59 is fixed to an inner side of the bottom plate 58. The arrangement of components of the motion generator 10 are consistent with those described with respect to FIGS. 5-8 and FIGS. 48-49. Similarly, the arrangement of components of the encasement 40 and screen assembly 300 are consistent with those described with respect to FIGS. 52-56. Those skilled in the art will recognize that the above described embodiments of the motion generator and other variations of the motion generator may be associated with an encasement and article to consequently displace the article attached to the wire loop 308. Further, without limitation intended, the appearance of the encasement may be modified to simulate various candles or other environments in which the article moves within several degrees of freedom. Additionally, multiple articles and encasements may be associated with a single motion generator that consequently displaces all of the associated articles in randomized movements. In use, by way of example, and without limitation intended, a user may provide low voltage power to the electromagnet coil 100. The object 200 is displaced within a boundary defined by the container 20. As the object 200 is displaced, a corresponding magnetic field acts upon the magnet 318 of the article 300, causing displacement of the screen 304. The randomized displacement of the screen 304 resembles the random flicker and flutter of a candle flame. Low voltage power may further be delivered to light source 422 through conduits 424 and a light beam may be focused on the screen 304. The flicker and flutter of the screen 304 affects the portion of the screen 304. This change in illumination further creates an illusion that the illuminated screen is an active flame.

Figure 63:
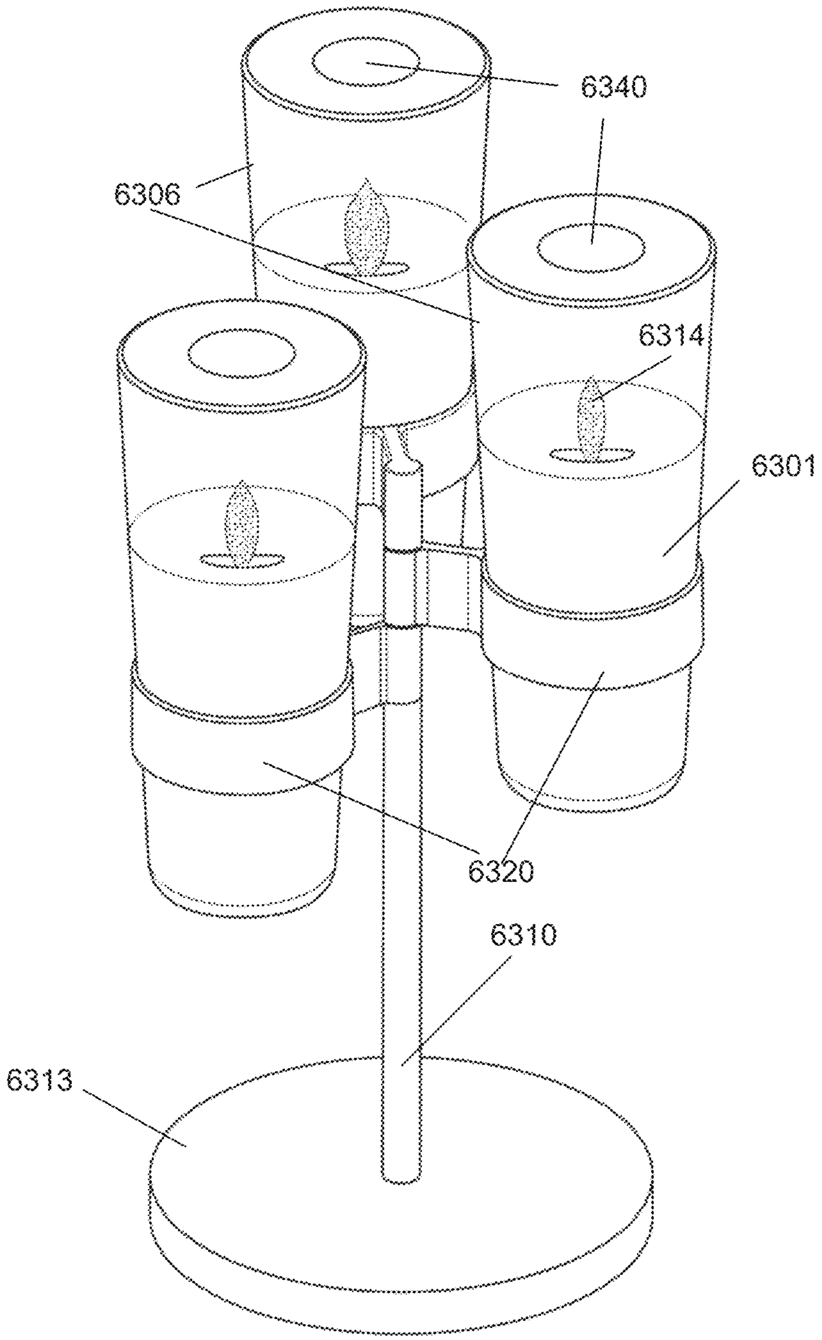
FIG. 63 illustrates an example group of lighting fixtures in accordance with one or more embodiments of the present technology.

In some embodiments, artificial flames with randomized motion using the disclosed techniques can be implemented as a group of lighting fixtures for indoor and outdoor usage. FIG. 63 illustrates an example group of lighting fixtures in accordance with one or more embodiments of the present technology. This example includes a group of three lighting fixtures coupled to a stand 6310. Each of the lighting fixtures includes a motion generator with a container having a magnetically reactive object (e.g., as shown in FIGS. 1-49) that is placed within a hollow body 6301. The body 6301 can be opaque or slightly translucent (e.g., having a wax texture). A screen assembly (not shown), with components similar to the examples shown in FIGS. 50-52, can be positioned partially within the body 6301. A pivot plate (e.g., as shown in FIGS. 51A-B) can be dimensioned to be below the top surface of the body 6301 to support the flame-shaped screen 6314. A light source (not shown) can be positioned within to the body 6301 to emit light onto the flame-shaped screen 6314. A transparent or translucent cover 6306 is coupled to the body 6301 to provide support for a reflective shield 6340 configured to absorb, diffuse, scatter, and/or reflect the light from the flame-shaped screen 6314. The diameter of the body 6301 is shaped to fit and be supported by a bracket 6320. The light source can have different colors that vary over time. Alternatively, or in addition, extra lights can be provided to emit different same or different colors that can be multiplexed with the light emitted by the light source and can be controlled to emit varying colors of light that change over time to create a more aesthetic appearance of the lighting fixture.

The example group of lighting fixtures shown in FIG. 63 can be used both as indoor and outdoor lighting features. For example, the stand can be placed on various types of flat surfaces (e.g., tables or ground) indoor or outdoor. In some embodiments, the shape of the stand can also be adapted (e.g., to have a torch shape) to provide other types of lighting effects.

In some embodiments, the stand 6310 can function as a charging station to charge multiple lighting fixtures at the same time. The base portion 6313 of the stand 6310 can include an electrical connector (not shown) that is used to electrically connect to an external power source. Power from the external power source can be transferred to the lighting fixtures through the brackets 6320 (e.g., via inductive charging). Three brackets and lighting fixtures are shown in FIG. 63, but additional brackets and lighting fixtures can be added to or removed from the stand 6310 to charge the desired number of fixtures.

Figure 64:
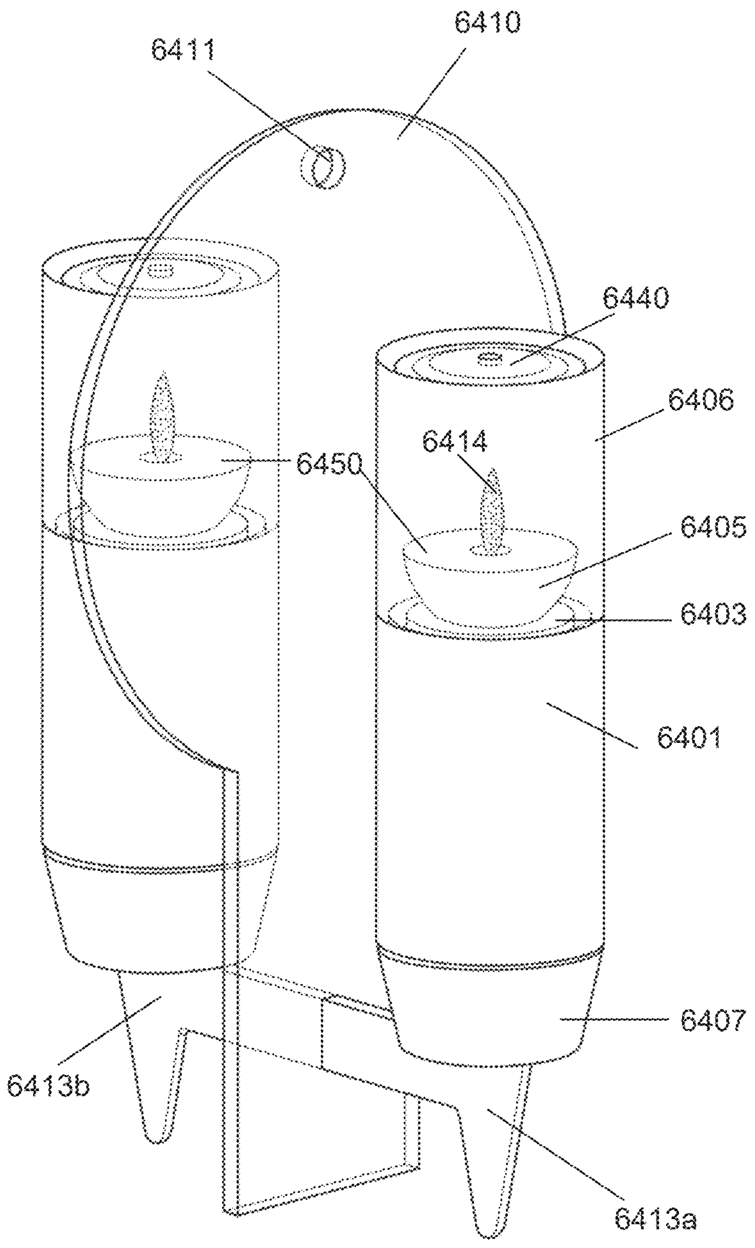
FIG. 64 illustrates another example group of lighting fixtures in accordance with one or more embodiments of the present technology.

FIG. 64 illustrates another example group of lighting fixtures in accordance with one or more embodiments of the present technology. This example includes a group of two lighting fixtures coupled to a frame 6410. Each of the lighting fixtures includes a motion generator with a container having a magnetically reactive object (e.g., as shown in FIGS. 1-49) that is placed within a hollow body 6401. The body 6401 can include a support structure 6403 positioned inside to support a screen assembly 6405, with components similar to the examples shown in FIGS. 50-52. In this example, the screen assembly 6405 includes a bottom part that shaped as a bowl. A pivot plate 6450 (e.g., as shown in FIGS. 51A-B) is dimensioned to be the top surface or below the top surface of the bowl to support the flame-shaped screen 6414. A light source (not shown) can be positioned within to bowl to emit light onto the flame-shaped screen 6414. A transparent or translucent cover 6406 is coupled to the body 6401 to provide support for a reflective shield 6440 configured to absorb, diffuse, scatter, and/or reflect the light from the flame-shaped screen 6414. The body 6401 also includes a bottom coupling part 6407 that is configured to be removably coupled to a frame 6410. The frame 6410 can be transparent or translucent to enhance the illumination effect when the group of lighting fixtures is in operation. In some embodiments, the frame 6410 also includes a hanging mechanism 6411 (e.g., a hole) that allows the frame to be hung as a pendant. The example group of lighting fixtures shown in FIG. 64 can also be used both as indoor and outdoor lighting features. This example group can be positioned on flat surfaces (e.g., a patio table) and/or be hung at various locations (e.g., to function as a lantern) to provide various types of lighting effects.

In some embodiments, the base portion can function as a charging station to charge multiple lighting fixtures at the same time. In some embodiments, the base portion can include charging pieces 6413*a*, 6413*b* with connectors that configured to be coupled with (e.g., inserted into) the bottom coupling part 6407 of the lighting fixture so as to charge the lighting fixtures. In some embodiments, each of the charging pieces can include a charging surface (not shown) that is configured to be coupled with the bottom coupling part 6407 of the lighting fixture via induction charging. For example, a flat, magnetic surface can be provided at the top of the charging pieces 6413*a*, 6413*b* to hold the bottom coupling part 6407 and to charge the lighting fixture at the same time. In the specific example shown in FIG. 64, two charging pieces are separated by the vertical frame 6410. In other embodiments, one or more frames having different shapes can be provided to enable configurations with three or more charging pieces so as to charge more lighting fixtures at the same time.

In some embodiments, a motion generator can be positioned above a screen assembly to magnetically drive the randomized motion of a screen in the screen assembly. Because there is no magnet blocking the light beam prior to it hitting the screen, the size of the magnet of the screen assembly can be adjusted to help optimize the movement of screen via the motion generator.

In some embodiments, a longer distance exists between the magnetically reactive object in the motion generator and the magnets of the screen assembly when the motion generator is positioned above the screen assembly. Because magnetic flux decreases over distance, to account for the longer distance, the size of the magnetically reactive object of the motion generator can be increased to adjust the magnetic activity level accordingly. It is also noted that, as the magnetic flux of the magnetically reactive object gets stronger, the necessary current supplied to the electromagnet coil also reduces, thereby reducing the amount of energy required for the operation of the lighting fixtures. The operation of the lighting fixture requires an external power source or a power storage, such as one or more batteries. According to the Proceedings of the National Academy of Sciences (PNAS), the greenhouse gas (GHG) emissions for all nickel-based batteries globally range from ~80 kgCO2eq/kWh to a maximum of 82 kgCO2eq/kWh. The lithium-ion batteries, such as lithium iron phosphate (LFP) batteries, have lower GHG emissions than the nickel-based chemistries, with an intensity of 55 kgCO2eq/kWh. The reduced consumption in energy, with a one-time increase in the magnetically reactive material for the object in the motion generator, can help reduce the overall GHG emissions from the lighting fixtures. Furthermore, when the motion generator is positioned above the screen assembly, the top surface of the fixtures can include one or more solar panels 610 to provide a renewable energy source for the outdoor operation of the lighting fixture, thereby further reducing the cost for users (e.g., electricity bill or replacing batteries) and reducing the GHC emission from the lighting fixture. In some embodiments, the size of the magnetically reactive object of the motion generator is adjusted according to the size of the lighting fixture(s) so as to achieve the desired control of the screen 304 and the desired level of energy consumption.

To achieve optimal illumination effect, the screen assembly is often accompanied by reflective surfaces or shields located below and above the light source and the screen. In some embodiments, the reflective surface can be adjusted (e.g., to be thinner and/or to have a shorter focal length) so that the focal point of the reflective surface is located closer to the motion generator positioned above. The screen assembly can be positioned according to the focal point, thereby reducing the distance between the magnet of the screen assembly and the magnetically reactive object of the motion generator.

Figure 65:
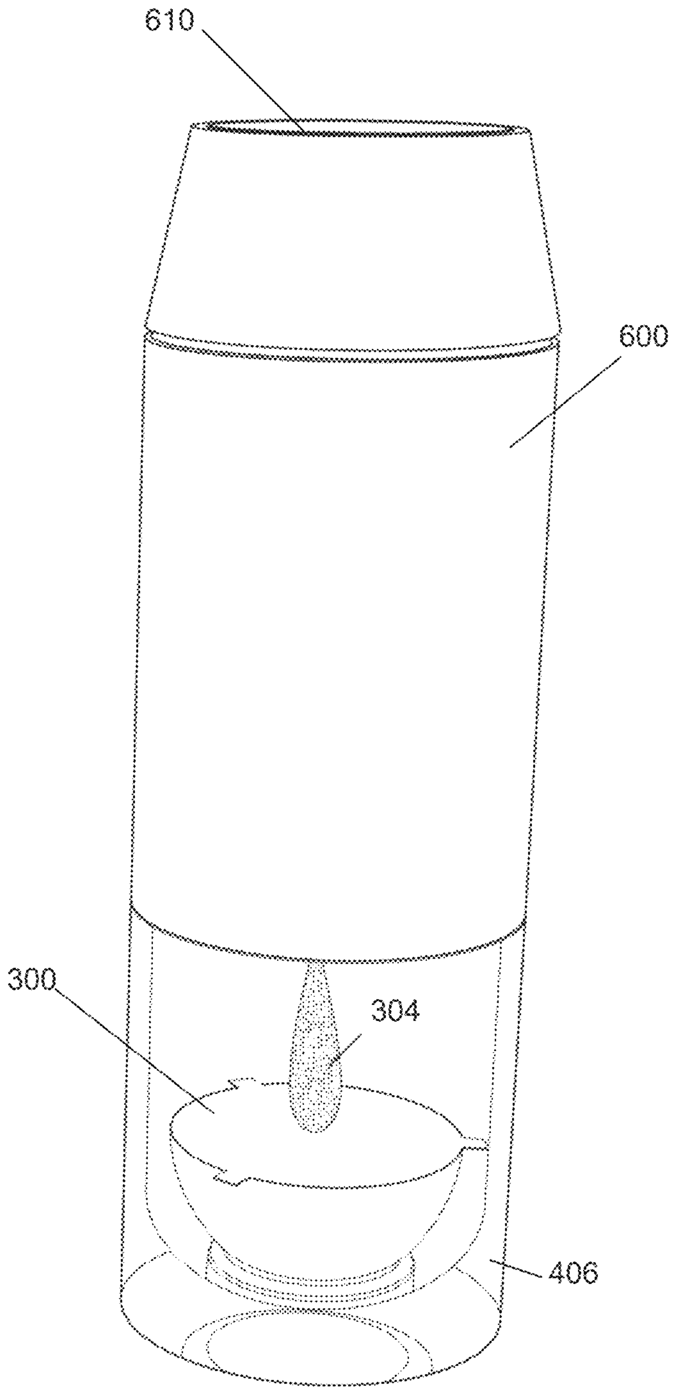
FIG. 65 is perspective view of a pendant fixture embodiment of the present technology suitable for randomized motion of an artificial flame.
Figure 66:
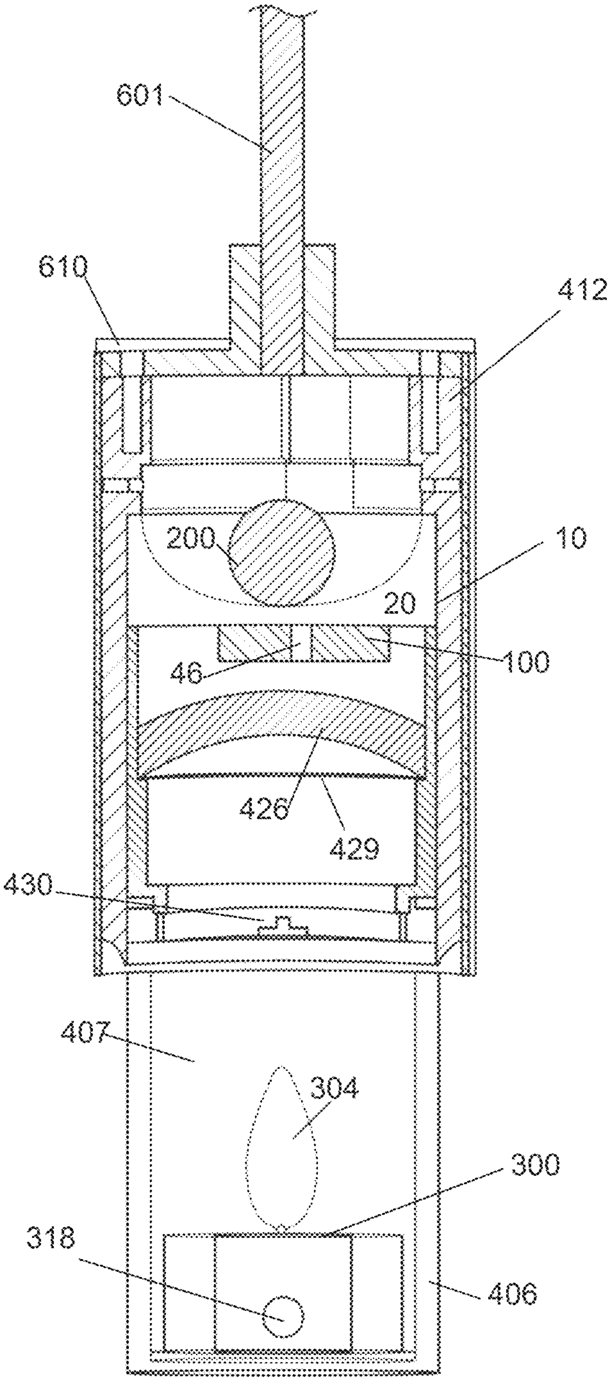
FIG. 66 is a partial sectional side view of a pendant fixture embodiment of the type shown in FIG. 65.
Figure 67:
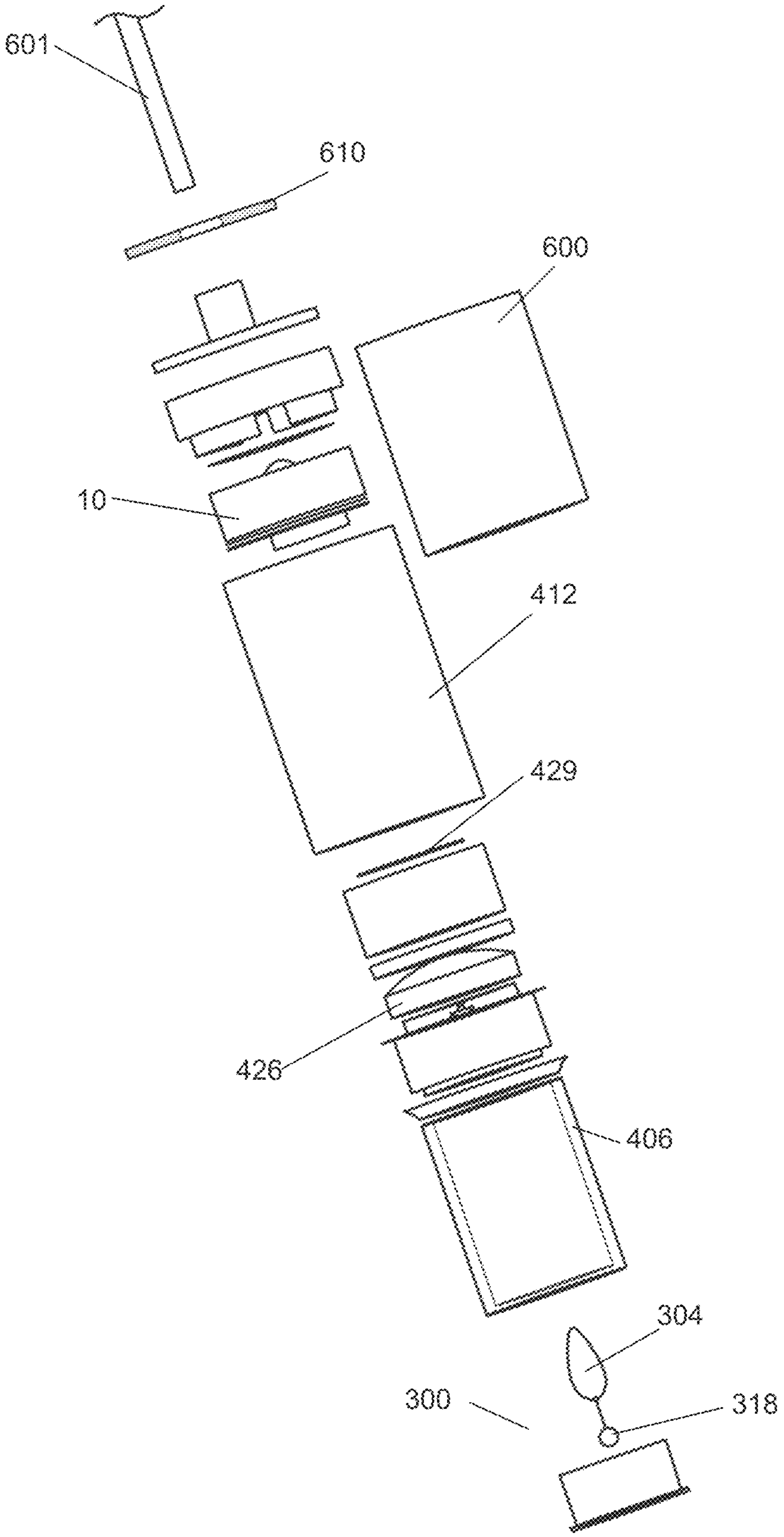
FIG. 67 is an exploded view of a pendant fixture embodiment of the type shown in FIG. 65.

With reference to FIGS. 65-67, an example embodiment of a pendant fixture having a motion generator 10, screen assembly 300, and encasement 600 is illustrated. In this example, a pole or a rod 601 for hanging the fixture is coupled to a top part of the body 412. A motion generator 10 is positioned within the body 412 and above the screen apparatus 300. The motion generator 10 comprises a magnetically reactive object 200 within a boundary of a container, base or housing 20. The motion generator 10 also comprises electromagnetic coil 100 coupled to a bottom of the container via a retainer 46. The screen apparatus 300 is positioned within a transparent or translucent cover 406 that is coupled to a bottom part of the body 412. The screen apparatus comprises a magnet 318 that is responsive to a change in the magnetic field emanating from the motion generator 10 and/or a change in the magnetic field emanating from object 200.

In some embodiments, a reflective surface 426 is positioned between the motion generator 10 and the screen assembly 300. The incident light from the screen apparatus 300 below can be reflected downwards back to the screen apparatus 300. In some embodiments, the reflective surface 426 is configured to reflect the light to a specific position within the chamber 407 defined by cover 406 to provide a desired illumination of screen 304. For example, screen 304 may be between light source and specific location such that a desired illumination pattern, such as a conical or triangular illumination pattern, can illuminate at least a portion of screen 304. In the case of screen 304 exhibiting an appearance of a flame, the illumination pattern created by the arrangement and configuration of light source (not shown) and reflective surface 426 may enhance such appearance by mimicking the illuminated boundary of the flame.

In some embodiments, a pigmented region of reflective surface 426 may act as a color filter to adjust a visible wavelength spectrum of light incident to the pigmented region and reflected from reflected surface 426 superimposed by the pigmented region. Such an arrangement may enhance the appearance of the flame illusion by creating an amber-colored region of illumination at screen 304. In some embodiments, a separate color filter 429 can be provided and be positioned between the reflective surface and the screen apparatus 300 to adjust the visible wavelength spectrum of the light (e.g., color of the light). In some embodiments, a shield 430 having a curved shape can be positioned close to the bottom of the body 412 to scatter or reflect light from the illumination apparatus 300. Doing so further enhances the light effect of the illumination apparatus 300.

In some embodiments, a controller (not shown) can be positioned within the body. The controller is coupled to the motion generator 10 and one or more batteries to control the operation of the fixture (e.g., movement of the screen in response to movement of the object in the motion generator 10). In some embodiments, features of the pendant fixture are tunable, including but not limited to the input signal provided by the controller, the electromagnetic coil, the magnet of the screen assembly, magnetically reactive object, and the container of the motion generator. In some embodiments, a lighting fixture disclosed herein further includes a remote control receiving unit connected to the control module configured to a remote control signal. The remote control signal is transmitted by an external remote control transmission unit. The remote control receiving unit outputs the received remote control signal to the control module, and the remote control signal can enable the control module to output one of the turning-on command, the turning-off command, the working mode command, and the timing command.

In some embodiments, the disclosed lighting fixture includes a plurality of sensors (not shown). The plurality of sensors comprises at least a touch sensor configured to turn-on/off the lighting fixture. For example, the side surface of the encasement 600 can include a touch region in which one or more touch sensors are positioned. The touch sensors are connected to the controller to send an electrical signal when the touch region is touched by the user, and to switch the lighting fixture to a different mode in response to the electrical signal from the touch sensor. The mode of operation includes turning on the lighting fixture, turning off the lighting fixture, or setting a timer for the lighting fixture to operate.

Figure 68:
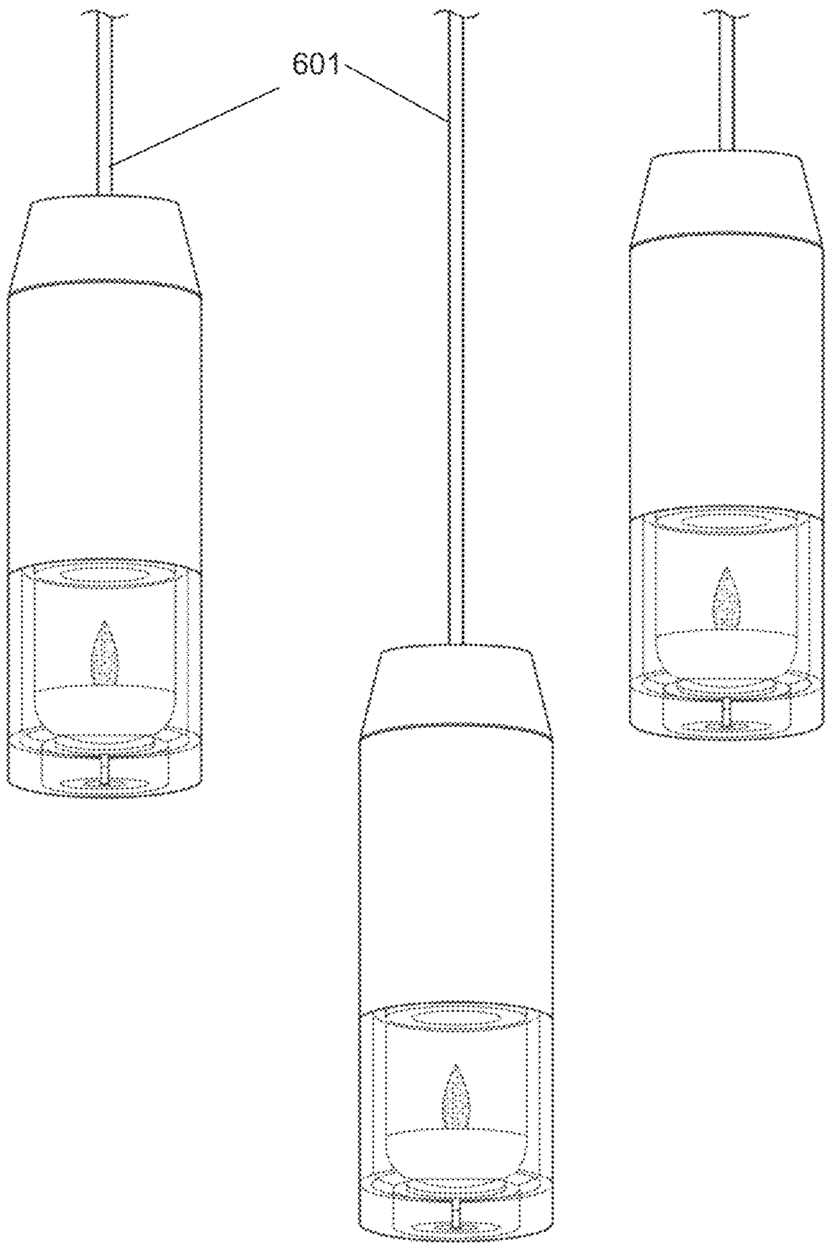
FIG. 68 illustrates an example group of pendant fixture embodiment of the present technology suitable for randomized motion of an artificial flame.

FIG. 68 illustrates an example group of pendant fixture embodiment of the present technology suitable for randomized motion of an artificial flame. As shown in FIG. 68, multiple pendant fixtures can be hung from the ceiling. The length of the pole or rod 601 can be adjusted to achieve the desire aesthetic appearance. The example group of lighting fixtures shown in FIG. 68 can similarly be used both as indoor and outdoor lighting features. This example group can be hung at various locations to provide various types of lighting effects. For example, for indoor operations, the pole or rod 601 can be connected to external power source to provide power for the operation of the group of pendant fixtures. In some embodiments, for outdoor operations, each fixture includes a solar panel (e.g., 610 as shown in FIG. 67) configured to provide renewable energy for storage within each fixture. At nighttime, the group of fixtures can use the stored power from the renewable source for the operation of the fixtures.

The disclosed techniques can be implemented in at least the following solutions.

1. A pendant lighting fixture, comprising: an outer casing; a hollow body positioned within the outer casing, wherein an upper part of the hollow body is configured to be coupled to a hanging mechanism, and wherein a lower part of the hollow body is coupled to a cover; a motion generator positioned within the hollow body, wherein the motion generator comprises: a container, a magnetic coil configured to generate a magnetic field, and an object within the container and configured move within the container responsive to the magnetic field; an illumination assembly within a chamber formed by the cover, wherein the illumination assembly is coupled to the lower part of the hollow body and positioned below the motion generator, wherein the illumination assembly comprises: a lighting source configured to emit a light beam, and a magnetic body that is movable in response to a movement of the object of the motion generator by the magnetic field, wherein a movement of the magnetic body is configured to affect an illumination of the light beam.
2. The pendant lighting fixture of solution 1, wherein the container includes a non-planar container surface, and wherein the object includes a rounded outer surface and moves by rolling along the non-planar container surface.
3. The pendant lighting fixture of solution 1, wherein the lower part of the hollow body is removably coupled to the cover.
4. The pendant lighting fixture of solution 1, comprising: a reflective surface positioned between the motion generator and the illumination assembly, configured to reflect part of the light beam back to the chamber.
5. The pendant lighting fixture of solution 4, comprising: a color filter positioned above the illumination assembly, configured to adjust a visible wavelength of the light beam within the chamber by filtering the reflected part of the light beam back to the chamber.
6. The pendant lighting fixture of solution 1, comprising: a shield positioned at the lower part of the hollow body, wherein the shield is configured to absorb, diffuse, scatter, or reflect part of the light beam leaving the chamber and entering the hollow body.

7. The pendant lighting fixture of solution 1, wherein the illumination assembly comprises: a pivot plate; a sheet shaped as a flame, wherein the sheet is movably supported by the pivot plate and positioned so that the light beam is emitted onto the sheet, wherein the sheet is coupled to the magnetic body via a connector such that the movement of the magnetic body affects an appearance of the light beam emitted onto the sheet.
8. The pendant lighting fixture of solution 7, wherein the illumination assembly comprises: a support structure, wherein the lighting source and the magnetic body are positioned within the support structure, wherein the sheet is at least partially outside of the support structure, and wherein the pivot plate is sized to fit a top surface of the support structure.
9. The pendant lighting fixture of solution 1, wherein the cover comprises a transparent or translucent material.
10. The pendant lighting fixture of solution 1, configured to be an outdoor lighting fixture by being coupled via the hanging mechanism.
11. A lighting fixture, comprising: a frame, wherein a lower portion of the frame is formed as a support structure; a first lighting component coupled to one side of the frame via the support structure; and a second lighting component coupled to an opposite side of the frame via the support structure, wherein each of the first lighting component and the second lighting component comprises: an outer casing; a hollow body positioned within the outer casing, wherein a lower part of the hollow body is configured to be coupled to the support structure of the frame, and wherein an upper part of the hollow body is removably coupled to a cover; a motion generator positioned within the hollow body, wherein the motion generator comprises: a container, a magnetic coil configured to generate a magnetic field, and an object movably responsive to the magnetic field move within the container; an illumination assembly within a chamber formed by the cover, wherein the illumination assembly is coupled to the lower part of the hollow body and positioned above the motion generator, wherein the illumination assembly comprises: a lighting source configured to emit a light beam, and a magnetic body that is movable in response to a movement of the object of the motion generator by the magnetic field, wherein a movement of the magnetic body is configured to affect an illumination effect of the light beam.
12. The lighting fixture of solution 11, wherein the container of the first lighting component or the second lighting component includes a non-planar container surface, and wherein the object includes a rounded outer surface and moves by rolling along the non-planar container surface.
13. The lighting fixture of solution 11, wherein at least one of the first lighting component or the second lighting component is removably coupled to the frame.
14. The lighting fixture of solution 11, wherein each of the first lighting component or the second lighting component comprises: a reflective surface positioned between the motion generator and the illumination assembly, configured to reflect part of the light beam back to the chamber.
15. The lighting fixture of solution 14, wherein each of the first lighting component or the second lighting component comprises: a color filter positioned below the illumination assembly, configured to adjust a visible wavelength of the light beam within the chamber by filtering the reflected part of the light beam back to the chamber.
16. The lighting fixture of solution 11, wherein each of the first lighting component or the second lighting component comprises: a shield positioned at the upper part of the hollow body, wherein the shield is configured to absorb, diffuse, scatter, or reflect part of the light beam leaving the chamber and entering the hollow body.
17. The lighting fixture of solution 11, wherein the illumination assembly comprises: a pivot plate; a sheet shaped as a flame, wherein the sheet is movably supported by the pivot plate and positioned so that the light beam is emitted onto the sheet, wherein the sheet is coupled to the magnetic body via a connector such that the movement of the magnetic body affects an appearance of the light beam emitted onto the sheet.
18. The lighting fixture of solution 17, wherein the illumination assembly comprises: a support structure, wherein the lighting source and the magnetic body are positioned within the support structure, wherein the sheet is at least partially outside of the support structure, and wherein the pivot plate is sized to fit a top surface of the support structure.
19. The lighting fixture of solution 18, wherein the support structure has a bowl shape.
20. The lighting fixture of solution 11, wherein the cover comprises a transparent or translucent material.
21. The lighting fixture of solution 11, wherein the frame is configured to be positioned outdoor to provide an outdoor lighting fixture.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

I claim:

1. A pendant lighting fixture, comprising:
an outer casing;
a hollow body positioned within the outer casing, a motion generator positioned within the hollow body,
wherein the motion generator comprises:
a container,
a magnetic coil configured to generate a magnetic field, and
an object within the container and configured move within the container responsive to the magnetic field;
a controller positioned within the hollow body and coupled to the motion generator, wherein the controller is configured to receive an electrical signal and control an operation of the pendant lighting fixture in response to the electrical signal; and
a plurality of sensors coupled to the controller and positioned on a side surface of the outer casing, wherein the plurality of sensors comprises at least one sensor configured to send the electrical signal to the controller, wherein the container includes a non-planar container surface, and wherein the object includes a rounded outer surface and is configured to move by rolling along the non- planar container surface.

2. The pendant lighting fixture of claim 1, wherein the at least one sensor is a touch sensor comprising an activation region, wherein the touch sensor is configured to send the electrical signal to the controller when the activation region is touched.

3. The pendant lighting fixture of claim 1, wherein the operation comprises: changing an illumination of the pendant lighting fixture, changing an operational mode of the pendant lighting fixture, or setting a timer for the pendant lighting fixture to operate.

4. The pendant lighting fixture of claim 1, comprising:

a remote control receiving unit configured to receive a remote control signal and to communicate with the controller, wherein the remote control receiving unit is configured to provide the remote control signal to the controller to cause the controller to output a control command, wherein the operation of the pendant lighting fixture is based on the control command.

5. The pendant lighting fixture of claim 1, wherein the hollow body comprises an upper part, wherein the upper part of the hollow body is configured to be coupled to a hanging mechanism.

6. The pendant lighting fixture of claim 1, comprising a screen assembly coupled to a lower part of the hollow body and positioned below the motion generator, wherein the screen assembly comprises a screen, wherein the screen is configured to exhibit randomized motion responsive to the magnetic field.

7. The pendant lighting fixture of claim 1, wherein a lower part of the hollow body is coupled to a cover.

8. The pendant lighting fixture of claim 7, comprising:

an illumination assembly within a chamber formed by the cover, wherein the illumination assembly is coupled to the lower part of the hollow body and positioned below the motion generator, wherein the illumination assembly comprises:

a lighting source configured to emit a light beam, and a magnetic body that is movable in response to a movement of the object of the motion generator by the magnetic field, wherein a movement of the magnetic body is configured to affect an illumination of the light beam.

9. A pendant lighting fixture, comprising:

an outer casing;

a hollow body positioned within the outer casing, a motion generator positioned within the hollow body, wherein the motion generator comprises:

a container, a magnetic coil configured to generate a magnetic field, and an object within the container and configured move within the container responsive to the magnetic field;

a controller positioned within the hollow body and coupled to the motion generator, wherein the controller is configured to receive an electrical signal and control an operation of the pendant lighting fixture in response to the electrical signal; and a plurality of sensors coupled to the controller and positioned on a side surface of the outer casing, wherein the plurality of sensors comprises at least one sensor configured to send the electrical signal to the controller, wherein a lower part of the hollow body is coupled to a cover, wherein the pendant lighting fixture further includes:

an illumination assembly within a chamber formed by the cover, wherein the illumination assembly is coupled to the lower part of the hollow body and positioned below the motion generator, wherein the illumination assembly comprises:

a lighting source configured to emit a light beam, and a magnetic body that is movable in response to a movement of the object of the motion generator by the magnetic field, wherein a movement of the magnetic body is configured to affect an illumination of the light beam.

10. The pendant lighting fixture of claim 9, wherein the at least one sensor is a touch sensor comprising an activation region, wherein the touch sensor is configured to send the electrical signal to the controller when the activation region is touched.

11. The pendant lighting fixture of claim 9, wherein the operation comprises:

changing an illumination of the pendant lighting fixture, changing an operational mode of the pendant lighting fixture, or setting a timer for the pendant lighting fixture to operate.

12. The pendant lighting fixture of claim 9, comprising:

a remote control receiving unit configured to receive a remote control signal and to communicate with the controller, wherein the remote control receiving unit is configured to provide the remote control signal to the controller to cause the controller to output a control command, and wherein the operation of the pendant lighting fixture is based on the control command.

13. The pendant lighting fixture of claim 9, wherein the hollow body comprises an upper part, wherein the upper part of the hollow body is configured to be coupled to a hanging mechanism.

14. The pendant lighting fixture of claim 9, comprising a screen assembly coupled to a lower part of the hollow body and positioned below the motion generator, wherein the screen assembly comprises a screen, wherein the screen is configured to exhibit randomized motion responsive to the magnetic field.

* * * * *